United States Patent
Iuchi et al.

(10) Patent No.: US 10,324,559 B2
(45) Date of Patent: Jun. 18, 2019

(54) DISPLAY DEVICE UNIT, CONTROL DEVICE, AND IMAGE DISPLAY PANEL

(71) Applicant: Japan Display Inc., Tokyo (JP)

(72) Inventors: Shinya Iuchi, Tokyo (JP); Hayato Kurasawa, Tokyo (JP); Masahiro Togashi, Tokyo (JP); Tsutomu Harada, Tokyo (JP); Yuji Suzuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 162 days.

(21) Appl. No.: 15/243,309

(22) Filed: Aug. 22, 2016

(65) Prior Publication Data
US 2017/0061930 A1 Mar. 2, 2017

(30) Foreign Application Priority Data

Sep. 1, 2015 (JP) .................... 2015-172141

(51) Int. Cl.
*G06F 3/041* (2006.01)
*G06F 3/044* (2006.01)
*G06F 3/14* (2006.01)

(52) U.S. Cl.
CPC ............ *G06F 3/0416* (2013.01); *G06F 3/044* (2013.01); *G06F 3/1446* (2013.01); *G06F 2203/04101* (2013.01); *G09G 2320/0693* (2013.01); *G09G 2340/0464* (2013.01); *G09G 2356/00* (2013.01)

(58) Field of Classification Search
CPC ...... G06F 3/1446; G06F 3/044; G06F 3/0416; G06F 2203/04101; G09G 2320/0693; G09G 2356/00; G09G 2340/0464
See application file for complete search history.

(56) References Cited

U.S. PATENT DOCUMENTS

| | | | |
|---|---|---|---|
| 2005/0231474 A1* | 10/2005 | Su | G06F 1/1626 345/158 |
| 2005/0285811 A1* | 12/2005 | Kawase | G02F 1/13336 345/1.1 |
| 2007/0247422 A1 | 10/2007 | Vertegaal et al. | |
| 2011/0267293 A1* | 11/2011 | Noguchi | G06F 3/0416 345/173 |

(Continued)

FOREIGN PATENT DOCUMENTS

| | | |
|---|---|---|
| JP | 2005-301131 | 10/2005 |
| JP | 2012-128186 A | 7/2012 |
| JP | 2015-097090 | 5/2015 |

OTHER PUBLICATIONS

Japanese Office Action dated Dec. 11, 2018 in corresponding Japanese Application No. 2015-172141.

*Primary Examiner* — Towfiq Elahi
(74) *Attorney, Agent, or Firm* — K&L Gates LLP

(57) ABSTRACT

A display device unit includes a plurality of image display panels in such a manner that display surfaces of the plurality of image display panels are orderly arranged on a flat surface, and is configured to display an image using the plurality of display surfaces as a single screen. The image display panel includes a drive electrode unit to which an application voltage is applied and a detection electrode unit at which a detection voltage is generated in accordance with the application voltage. The application voltage is applied solely to the drive electrode unit included in an application image display panel which is a part of the image display panels.

9 Claims, 33 Drawing Sheets

(56) References Cited

U.S. PATENT DOCUMENTS

| | | |
|---|---|---|
| 2012/0133674 A1 | 5/2012 | Takishita et al. |
| 2012/0218482 A1* | 8/2012 | Hwang .................. G06F 3/044 |
| | | 349/12 |
| 2013/0328757 A1* | 12/2013 | Matsumoto .......... G09G 3/3696 |
| | | 345/87 |
| 2014/0132534 A1* | 5/2014 | Kim ...................... G06F 3/0412 |
| | | 345/173 |
| 2014/0199944 A1 | 7/2014 | Ran et al. |
| 2015/0213782 A1 | 7/2015 | Yan et al. |
| 2015/0338943 A1 | 11/2015 | Donnelly et al. |

* cited by examiner

FIG.10

FIRST TIMING INFORMATION

|  | CONTROLLER 20 | IMAGE DISPLAY PANEL 32A | IMAGE DISPLAY PANEL 32B | IMAGE DISPLAY PANEL 32C |
|---|---|---|---|---|
| UNIQUE TIME [s] | 100 | 320 | 250 | 720 |
| TIMING DELAY INTERVAL [ms] | 16 | 16 | 16 | 24 |

SECOND TIMING INFORMATION

|  | CONTROLLER 20 | IMAGE DISPLAY PANEL 32A | IMAGE DISPLAY PANEL 32B | IMAGE DISPLAY PANEL 32C |
|---|---|---|---|---|
| UNIQUE TIME [s] | 132 | 352 | 282 | 752 |
| TIMING DELAY INTERVAL [ms] | 16 | 16 | 16 | 24 |

THIRD TIMING INFORMATION

|  | CONTROLLER 20 | IMAGE DISPLAY PANEL 32A | IMAGE DISPLAY PANEL 32B | IMAGE DISPLAY PANEL 32C |
|---|---|---|---|---|
| UNIQUE TIME [s] | 164 | 385 | 314 | 785 |
| TIMING DELAY INTERVAL [ms] | 16 | 17 | 17 | 25 |

TIMING SYNCHRONIZATION INFORMATION

|  | CON-TROLLER 20 | IMAGE DISPLAY PANEL 32A | IMAGE DISPLAY PANEL 32B | IMAGE DISPLAY PANEL 32C |
|---|---|---|---|---|
| TIME SYNCHRONIZATION INFORMATION [s] | 0 | 220 | 150 | 620 |
| DELAY INTERVAL INFORMATION [ms] | - | 8.16 | 8.16 | 12.16 |

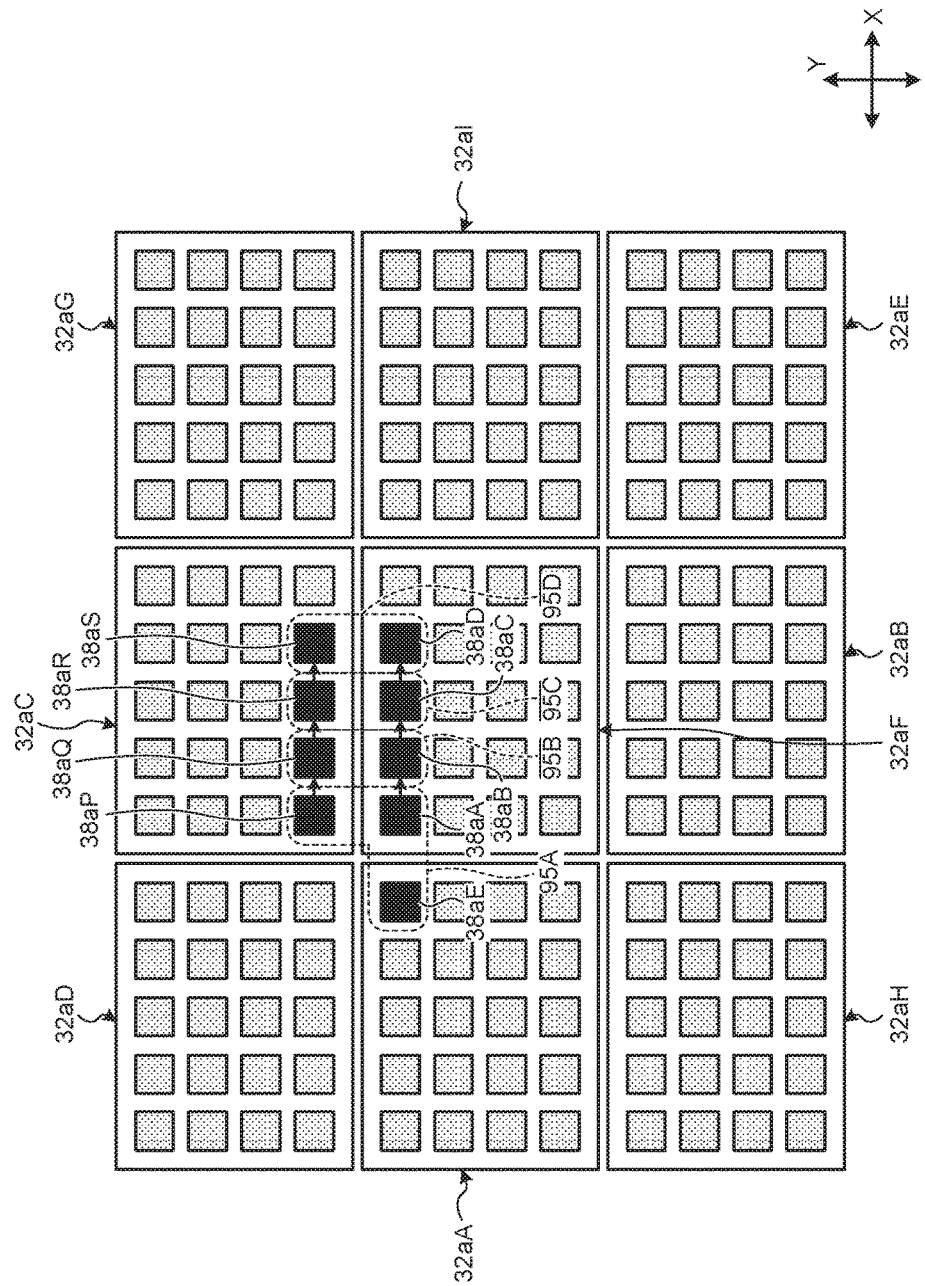

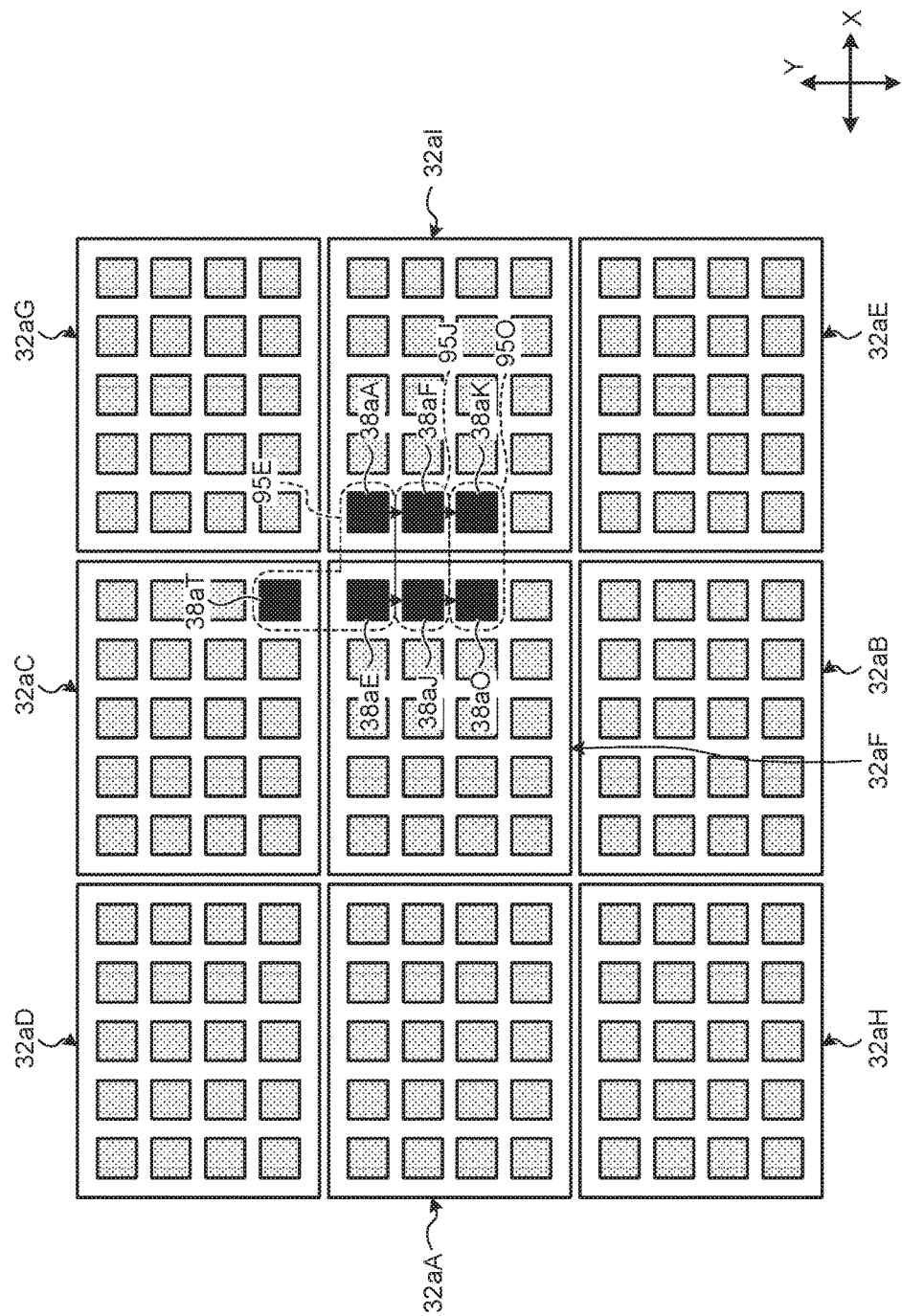

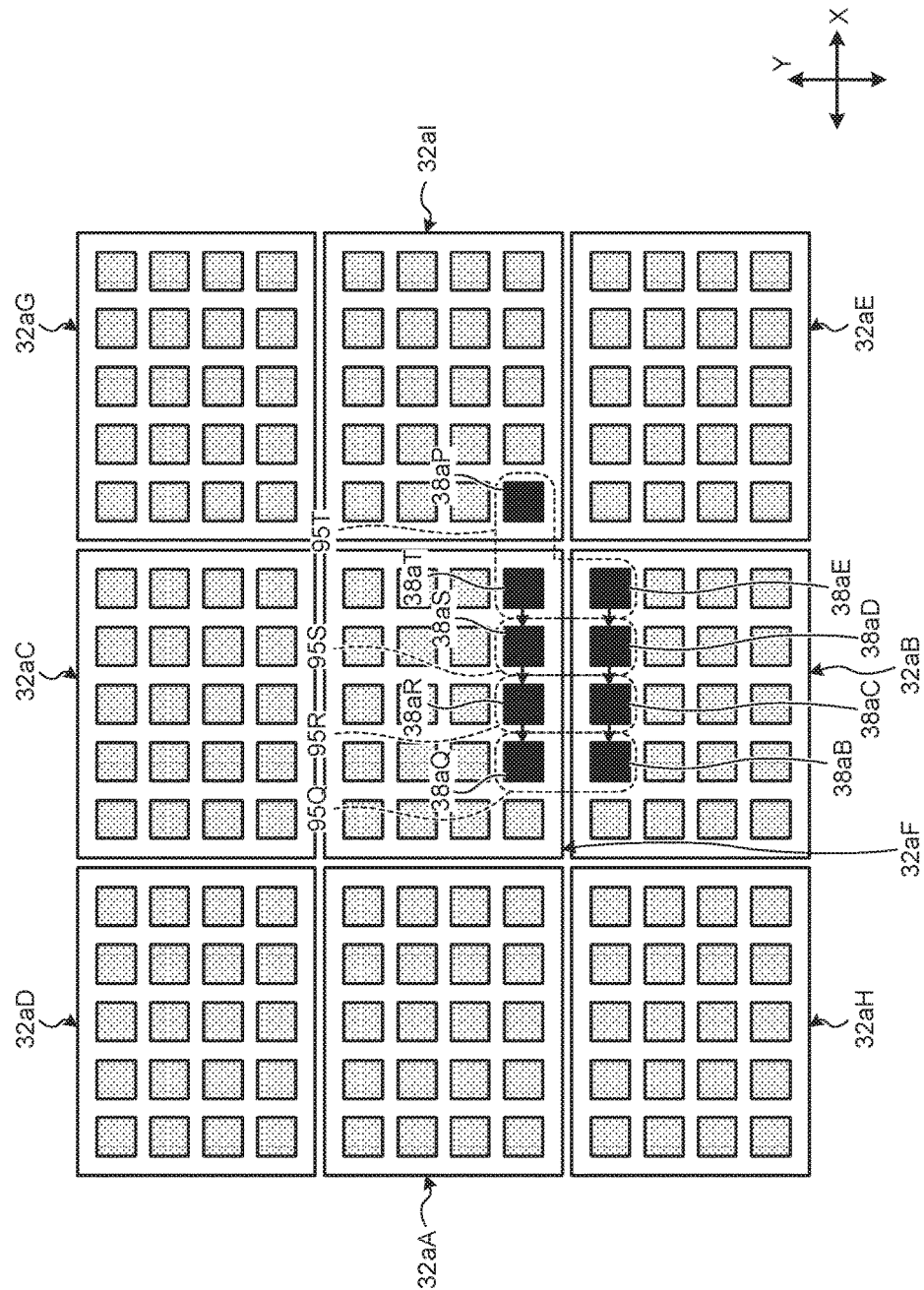

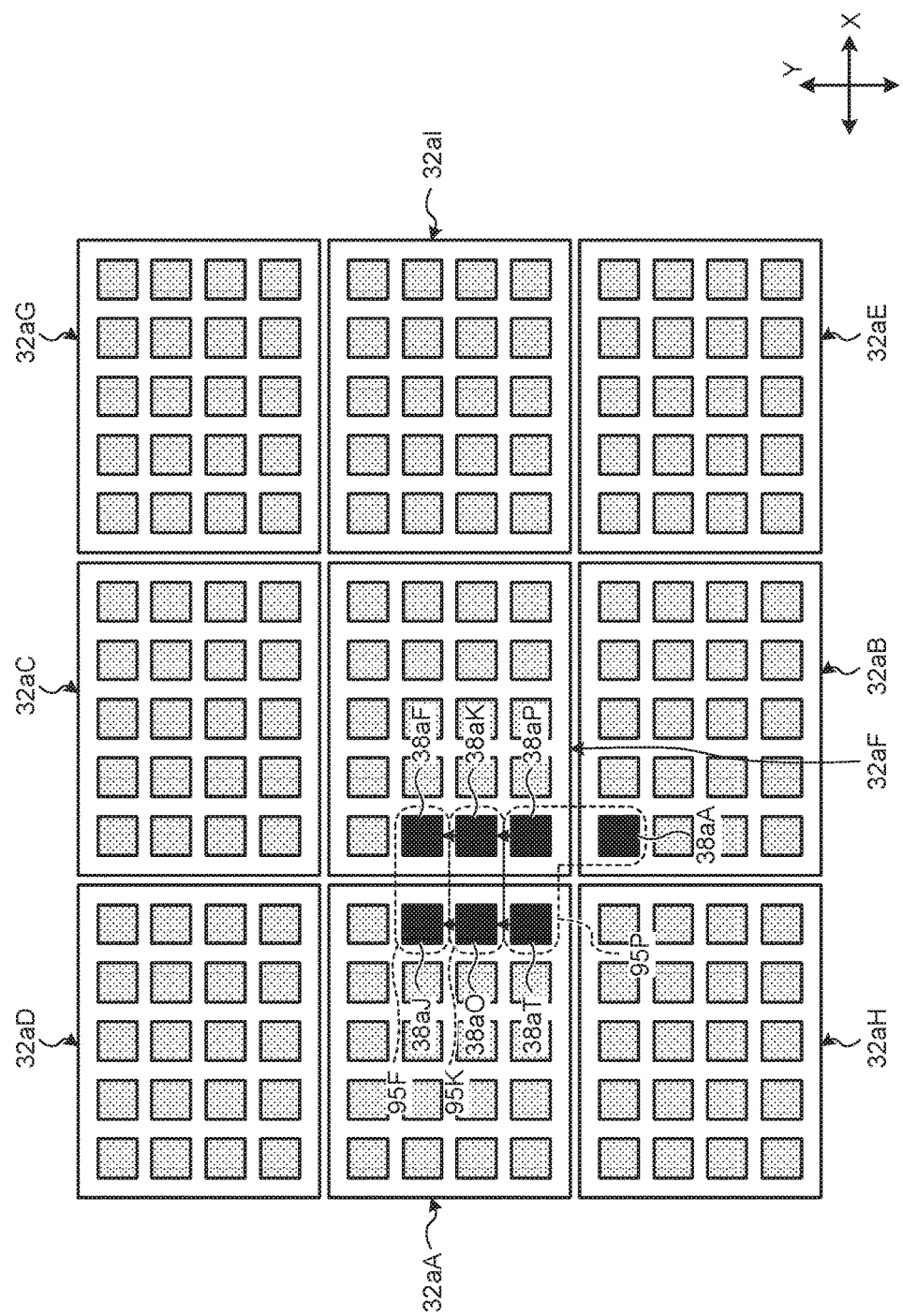

FIG.29
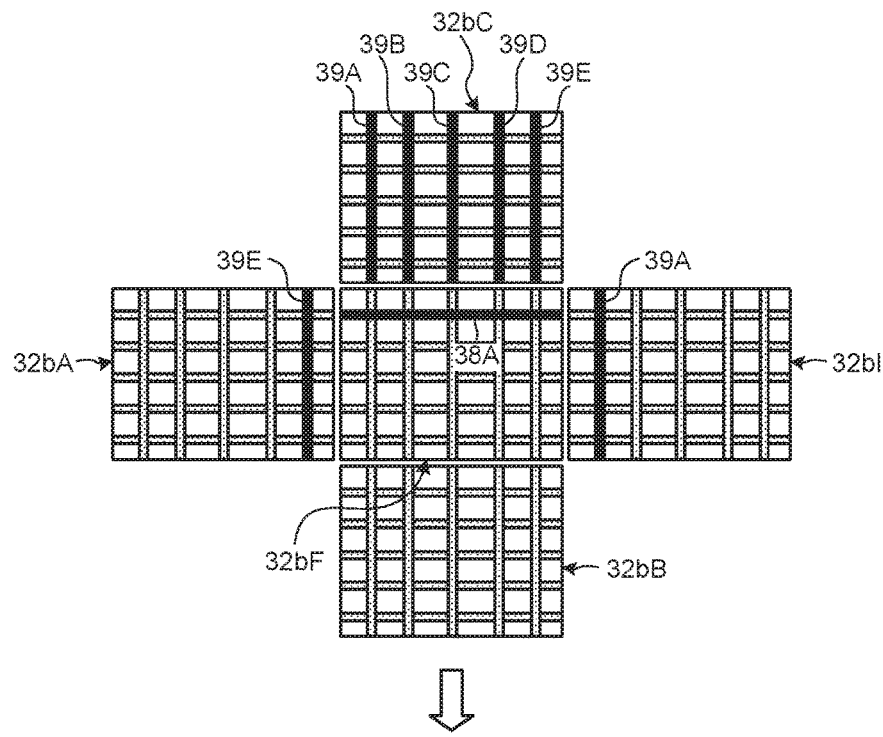
APPLICATION VOLTAGE AND DETECTION VOLTAGES
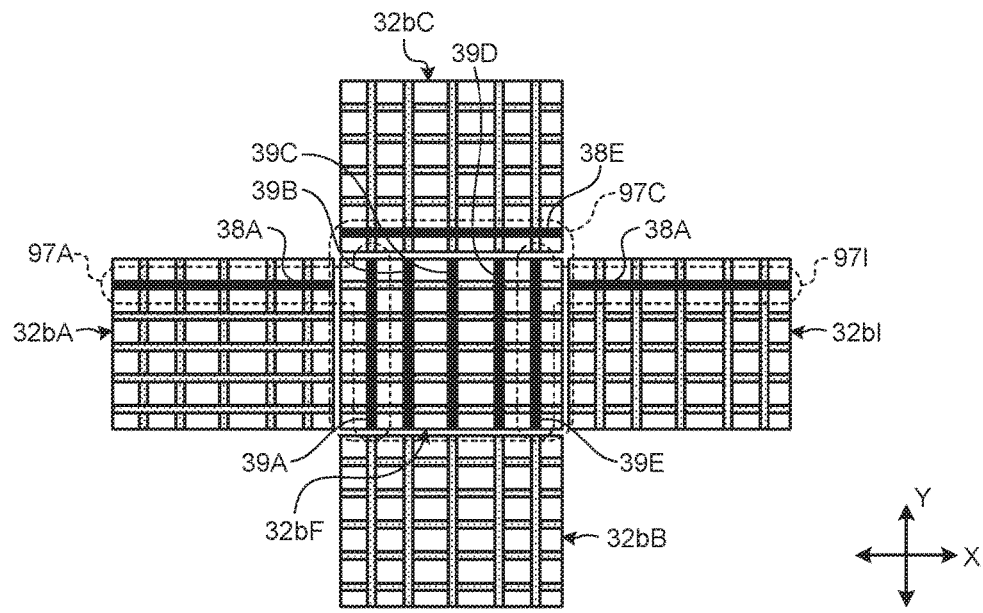
RETURN VOLTAGES AND RETURN DETECTION VOLTAGES FIG.30
APPLICATION VOLTAGE AND DETECTION VOLTAGES
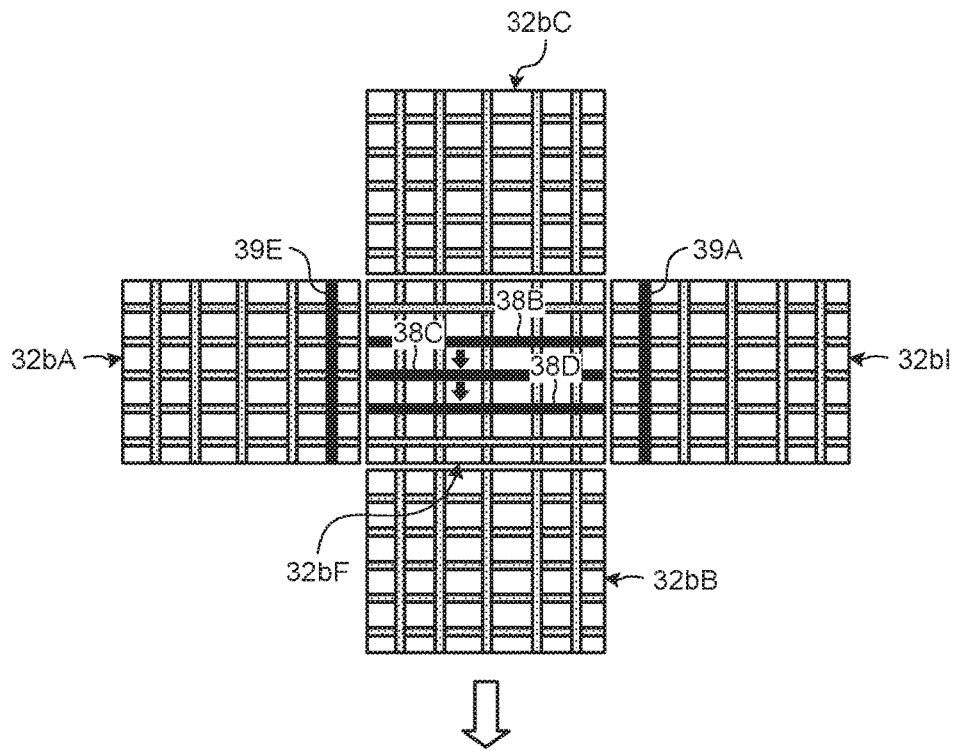
RETURN VOLTAGES AND RETURN DETECTION VOLTAGES
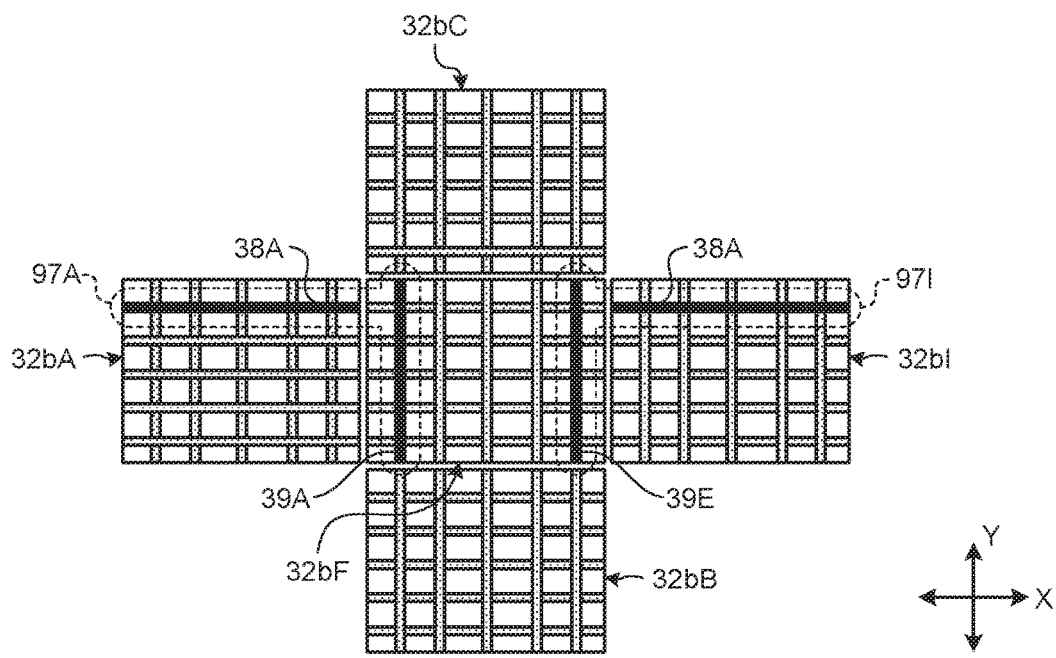

FIG.31
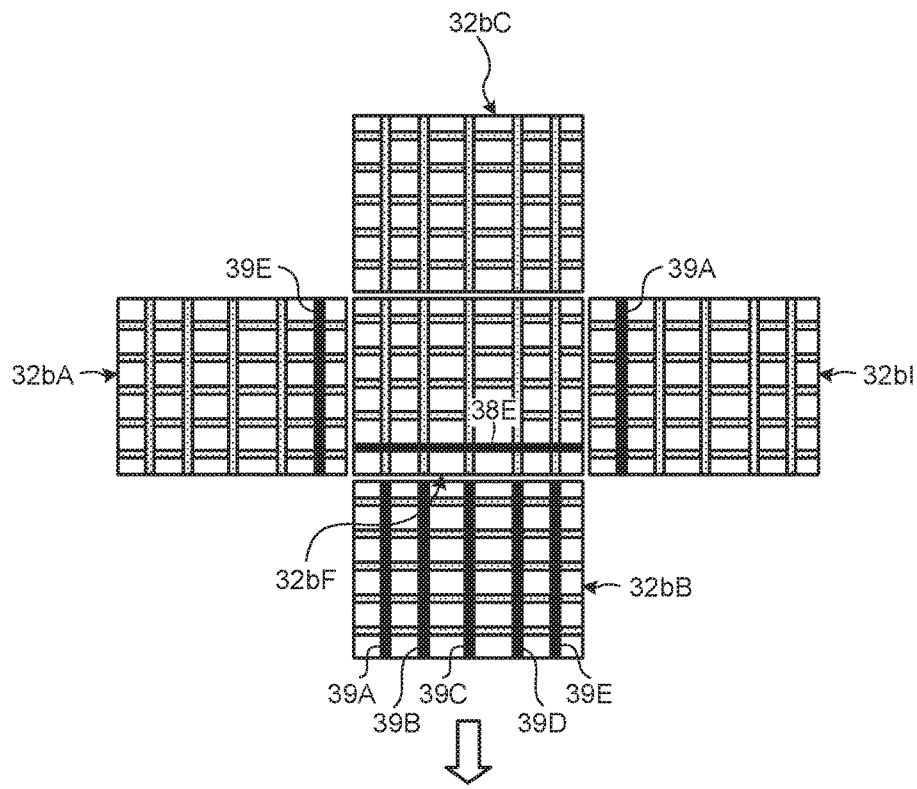
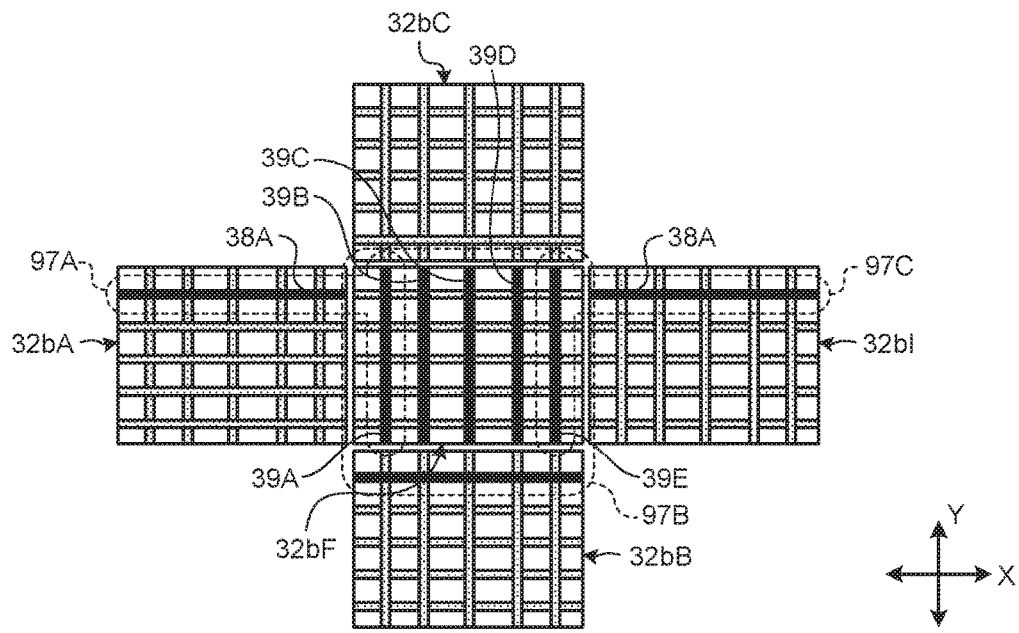

DISPLAY DEVICE UNIT, CONTROL DEVICE, AND IMAGE DISPLAY PANEL

CROSS-REFERENCE TO RELATED APPLICATION

This application claims priority from Japanese Application No. 2015-172141, filed on Sep. 1, 2015, the contents of which is incorporated by reference herein in its entirety.

BACKGROUND

1. Technical Field

The present disclosure relates to a display device unit including a plurality of image display panels, a control device, and the image display panel.

2. Description of the Related Art

When it is required to display an image on a large screen, for example, for public viewing, a technique called a tiling display is used. For example, the tiling display is a display device unit in which a plurality of image display panels such as liquid crystal displays is arrayed in a flat surface shape such that the plurality of image display panels displays a single image.

In order to display a proper image on the tiling display, it is necessary to understand an array pattern of the image display panels and transmit video signals to the respective image display panels in accordance with this array pattern. For example, the case of a tiling display in which four image display panels are arranged in two rows and two columns is considered. In this case, the identification of an image display panel arranged at first row and first column is needed to transmit, to that image display panel, a video signal of an image corresponding to an upper left part (first row and first column) of an entire image displayed as a whole. When an image corresponding to an upper right part (first row and second column) of the entire image is displayed on the image display panel arranged at the first row and first column, for example, the intended entire image cannot be properly displayed.

As described above, it is required in the tiling display to recognize the array pattern of the image display panels. However, the recognition of the array pattern of the image display panels is difficult in some cases, for example, when the number of the image display panels increases.

For the foregoing reasons, there is a need to provide a display device unit, a control device, and an image display panel capable of easily recognizing the array pattern of the image display panels.

SUMMARY

According to an aspect, a display device includes a plurality of image display panels in such a manner that display surfaces of the plurality of image display panels are orderly arranged on a flat surface, and configured to display an image using the plurality of display surfaces as a single screen. The image display panel includes a drive electrode unit to which an application voltage is applied and a detection electrode unit at which a detection voltage is generated in accordance with the application voltage, and the application voltage is applied solely to the drive electrode unit included in an application image display panel which is a part of the image display panels.

According to another aspect, a control device causes an image display panel unit to display an image. The image display panel unit includes a plurality of image display panels, each of which includes a drive electrode unit and a detection electrode unit, in such a manner that display surfaces of the plurality of image display panels are orderly arranged in a flat surface shape, and configured to display an image using the plurality of display surfaces as a single screen, the control device is configured to apply an application voltage solely to the drive electrode unit included in an application image display panel which is a part of the image display panels; acquire a detection voltage generated at the detection electrode unit in accordance with the application voltage, the detection electrode unit included in a standby image display panel which is the image display panel other than the application image display panel; and confirm an array pattern among the plurality of image display panels based on the detection voltage.

According to another aspect, an image display panel includes a drive electrode unit to which an application voltage is applied; a detection electrode unit at which a detection voltage is generated in accordance with the application voltage; and a panel controller that controls operation of the drive electrode unit and the detection electrode unit. The panel controller puts the detection electrode unit into a state in which the detection voltage is not generated while applying the application voltage to the drive electrode unit, and puts the detection electrode unit into a state in which the detection voltage is enabled to be generated while not applying the application voltage to the drive electrode unit.

BRIEF DESCRIPTION OF THE DRAWINGS

FIG. 10 is a diagram for explaining exemplary timing information;

FIG. 25A is an explanatory diagram for explaining the generation of the detection voltage when the application voltage is applied in the third embodiment;

FIG. 25B is an explanatory diagram for explaining the generation of the detection voltage when the application voltage is applied in the third embodiment;

FIG. 25C is an explanatory diagram for explaining the generation of the detection voltage when the application voltage is applied in the third embodiment;

FIG. 25D is an explanatory diagram for explaining the generation of the detection voltage when the application voltage is applied in the third embodiment;

FIG. 29 is an explanatory diagram for explaining the application of the application voltage and the generation of the return detection voltage;

FIG. 30 is an explanatory diagram for explaining the application of the application voltage and the generation of the return detection voltage; and FIG. 31 is an explanatory diagram for explaining the application of the application voltage and the generation of the return detection voltage.

DETAILED DESCRIPTION

Figure 1:
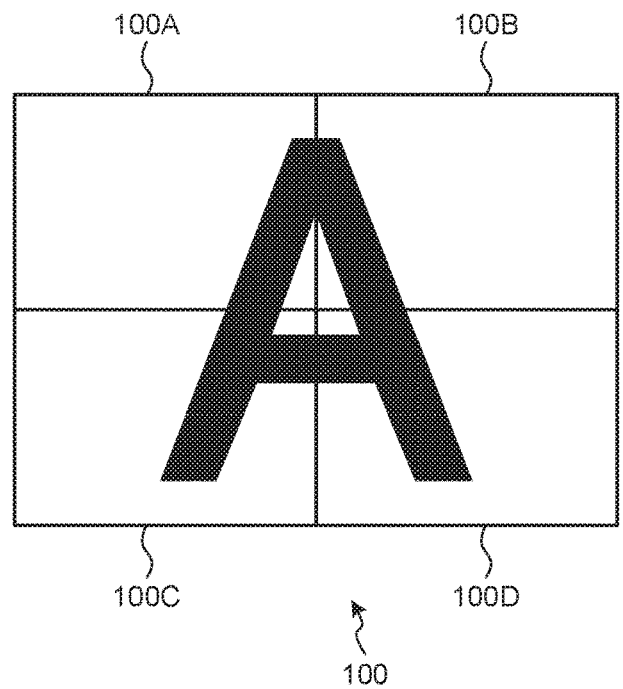
FIG. 1 is an explanatory diagram for explaining a tiling display.

Hereinafter, embodiments according to the invention will be described with reference to the drawings. The disclosure simply gives examples. Accordingly, appropriate modifications in accordance with the spirit of the invention are of course included within the scope of the invention as long as those skilled in the art can easily conceive such modifications. For clearer description, the drawings in some cases express widths, thicknesses, shapes, and the like of respective units more schematically than those in the actual modes. Merely serving as examples, the drawings are not construed to limit the interpretation of the invention. In the present specification and the respective drawings, components similar to those described earlier in relation with the drawings that have been already mentioned are denoted by the same reference numerals and detailed description thereof is omitted in some cases as necessary.

First Embodiment

First, a first embodiment will be described. A display device unit 10 according to the first embodiment includes an image display panel unit 30 in which a plurality of image display panels is arrayed in a flat surface shape. The display device unit 10 includes the plurality of image display panels 32 in such a manner that display surfaces of the plurality of image display panels 32 are orderly arranged on a flat surface, whereby the display device unit 10 is configured to display an image using the plurality of display surfaces as a single screen. That is, the display device unit 10 is a so-called tiling display.

Figure 2:
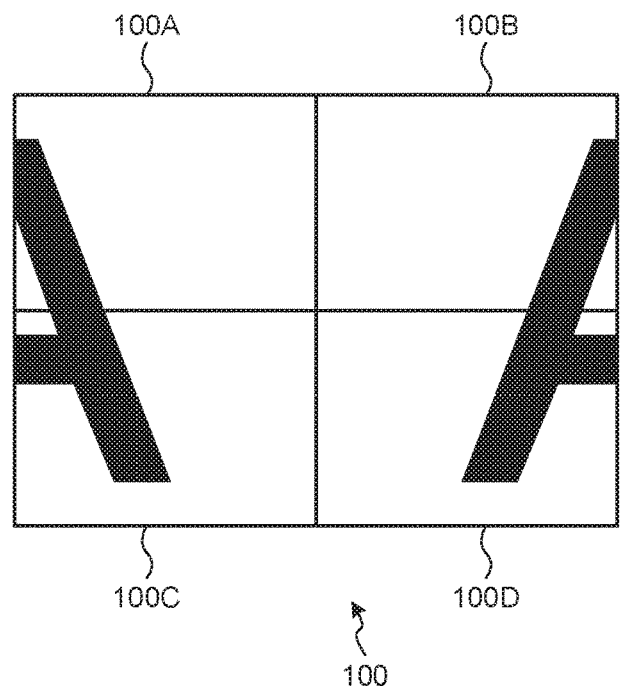
FIG. 2 is an explanatory diagram for explaining the tiling display.

Hereinafter, an example of a typical tiling display will be described with reference to FIG. 1 and FIG. 2. FIG. 1 and FIG. 2 are explanatory diagrams for explaining the tiling display. Each of FIG. 1 and FIG. 2 illustrates a tiling display 100 in which display surfaces (surfaces on which images are displayed) of image display panels 100A, 100B, 100C, and 100D are arrayed on a flat surface. The image display panel 100A is arranged at the upper left, the image display panel 100B is arranged at the upper right, the image display panel 100C is arranged at the lower left, and the image display panel 100D is arranged at the lower right.

The tiling display 100 displays an image using the respective display surfaces of the image display panels 100A, 100B, 100C, and 100D as a single screen. A case is considered where the tiling display 100 is caused to display a single image of an alphabetical letter "A" as illustrated in FIG. 1. In the case, the tiling display 100 causes the image display panel 100A to display a partial image corresponding to an upper left part of "A". The tiling display 100 causes the image display panel 100B to display a partial image corresponding to an upper right part of "A". The tiling display 100 causes the image display panel 100C to display a partial image corresponding to a lower left part of "A". The tiling display 100 causes the image display panel 100D to display a partial image corresponding to a lower right part of "A".

Meanwhile, when the tiling display 100 cannot recognize an array pattern for each of the image display panels, there is a risk that the tiling display 100 cannot transmit an image signal corresponding to a position at which each of the image display panel is arranged. Accordingly, there is a risk where each of the image display panels cannot display a partial image corresponding to a position at which that image display panel is arranged. In such a case, as illustrated in FIG. 2 as an example, the tiling display 100 can cause the image display panel 100A to display the partial image corresponding to the upper right part of "A". The tiling display 100 can cause the image display panel 100B to display the partial image corresponding to the upper left part of "A". The tiling display 100 can cause the image display panel 100C to display the partial image corresponding to the lower right part of "A". The tiling display 100 can cause the image display panel 100D to display the partial image corresponding to the lower left part of "A".

As described above, the tiling display needs to recognize information regarding at which position each of the image display panels is arranged among all of the image display panels (array pattern) to transmit, to each of the image display panels, an image signal of a partial image corresponding to the position of that image display panel. The display device unit 10 according to the first embodiment is capable of detecting the array pattern for each of the image display panels 32.

(Overall Configuration of Display Device Unit)

Figure 3:
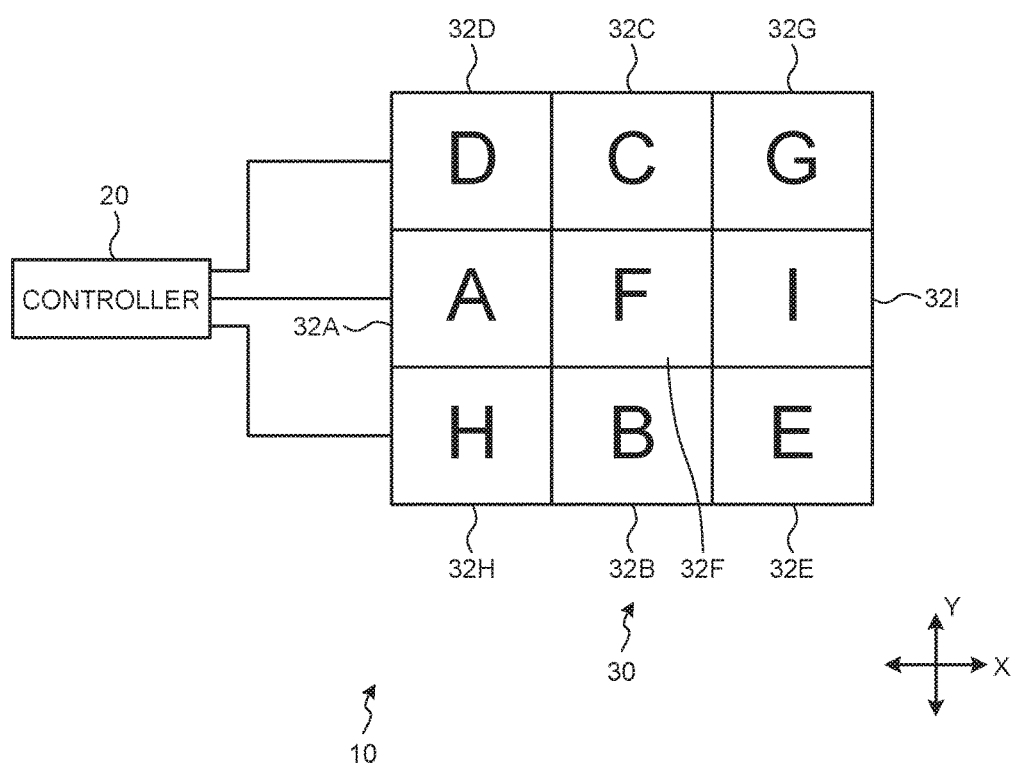
FIG. 3 is a block diagram illustrating a configuration of a display device unit according to a first embodiment.

FIG. 3 is a block diagram illustrating a configuration of the display device unit according to the first embodiment. As illustrated in FIG. 3, the display device unit 10 includes a controller 20 and the image display panel unit 30. The image display panel unit 30 includes image display panels 32A, 32B, 32C, 32D, 32E, 32F, 32G, 32H, and 32I. Hereinafter, the image display panels 32A, 32B, 32C, 32D, 32E, 32F, 32G, 32H, and 32I are noted as the image display panels 32 when these image display panels are not distinguished from one another. The controller 20 is connected to all of the image display panels 32 and configured to control driving of the respective image display panels 32. Detailed description thereof will be given later.

(Configuration of Image Display Panel Unit)

In the image display panel unit 30, the display surfaces of the plurality of image display panels 32 are orderly arranged on a flat surface, whereby the image display panel unit 30 displays an image using the plurality of display surfaces as a single screen. As illustrated in FIG. 3, the image display panels 32 are arrayed in a two-dimensional matrix form in an X direction and a Y direction in the image display panel unit 30. The X direction represents a row direction, serving as a column direction perpendicularly intersecting with the Y direction. However, the X direction and the Y direction are not limited thereto. In the image display panel unit 30, the plurality of image display panels 32 is arrayed in three rows and three columns, specifically, three columns along the X direction and three rows along the Y direction. In the first embodiment, the image display panel 32A is arranged at second row and first column. The image display panel 32B is arranged at third row and second column. The image display panel 32C is arranged at first row and second column. The image display panel 32D is arranged at first row and first column. The image display panel 32E is arranged at third row and third column. The image display panel 32F is arranged at second row and second column. The image display panel 32G is arranged at first row and third column. The image display panel 32H is arranged at third row and first column. The image display panel 32I is arranged at second row and third column. However, the number of the image display panels 32 is arbitrary in the image display panel unit 30 as long as the plurality of image display panels 32 is arrayed in a flat surface shape. The image display panel unit 30 is not limited to an array such as one illustrated in FIG. 3 as long as the plurality of image display panels 32 are arrayed in a flat surface shape. For example, the plurality of image display panels 32 may be arrayed in one column, or alternatively, arrayed in a step shape.

(Configuration of Image Display Panel)

Figure 4:
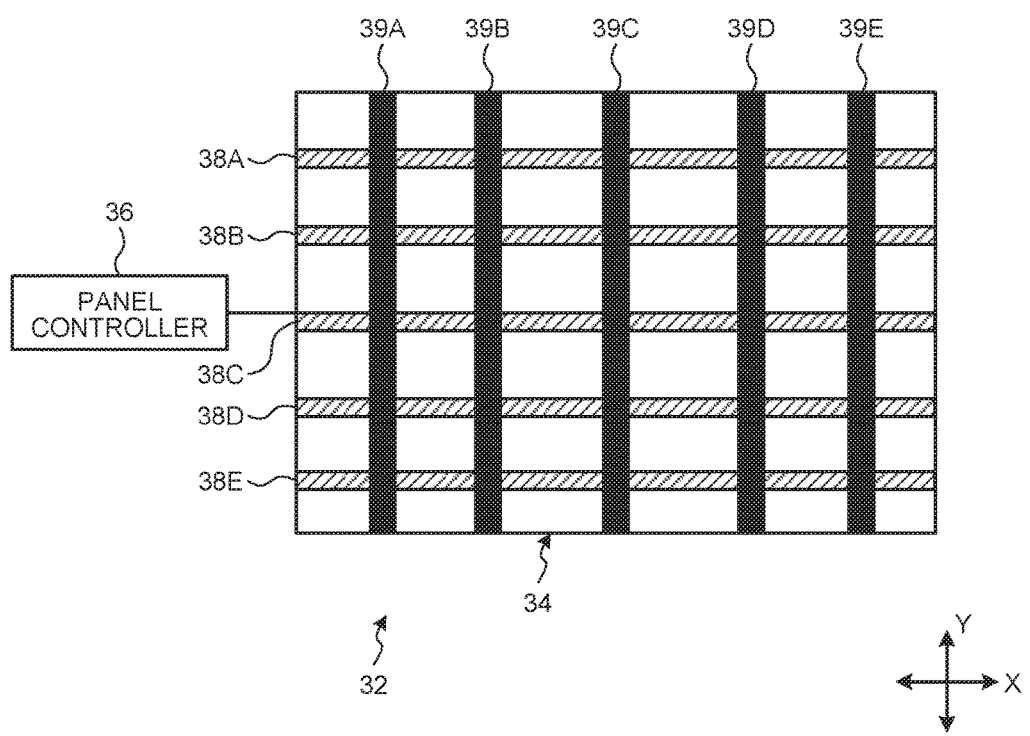
FIG. 4 is an explanatory diagram for explaining a configuration of an image display panel.

Next, a configuration of the image display panel 32 will be described. FIG. 4 is an explanatory diagram for explaining the configuration of the image display panel. The image display panel 32 is an image display panel with a touch detection function (so-called touch panel). As illustrated in FIG. 4, the image display panel 32 includes a panel unit 34 and a panel controller 36. The panel unit 34 includes a display surface on which an image is displayed and also detects an object in the proximity to the display surface. The panel controller 36 controls operation of the panel unit 34.

As illustrated in FIG. 4, the panel unit 34 includes drive electrode units 38A, 38B, 38C, 38D, and 38E and detection electrode units 39A, 39B, 39C, 39D, and 39E. The drive electrode units 38A, 38B, 38C, 38D, and 38E, each of which is disposed extending along the Y direction, are electrodes arranged in the X direction in this order. The detection electrode units 39A, 39B, 39C, 39D, and 39E are electrodes provided so as to oppose the drive electrode units 38A, 38B, 38C, 38D, and 38E. The detection electrode units 39A, 39B, 39C, 39D, and 39E, each of which is disposed extending along the X direction, are arranged in the Y direction in this order. Hereinafter, the drive electrode units 38A, 38B, 38C, 38D, and 38E are noted as drive electrode units 38 when these drive electrode units are not distinguished from one another. Likewise, the detection electrode units 39A, 39B, 39C, 39D, and 39E are noted as detection electrode units 39 when these detection electrode units are not distinguished from one another. Shapes, array orders, and the numbers of the drive electrode units 38 and the detection electrode units 39 are not limited to the example in FIG. 4.

An application voltage $V_A$ is applied to the drive electrode units 38 at respective timings when the array pattern among the plurality of image display panels 32 is confirmed. A detection voltage $V_D$ is generated at the detection electrode unit 39 depending on the application voltage $V_A$ at the drive electrode unit 38 in another image display panel 32 (the image display panel other than the image display panel 32 of its own). The drive electrode unit 38 also has a function as a drive electrode in the touch detection that detects a proximity object. Similarly, the detection electrode unit 39 also has a function as an electrode for detecting a touch in the touch detection.

Figure 5:
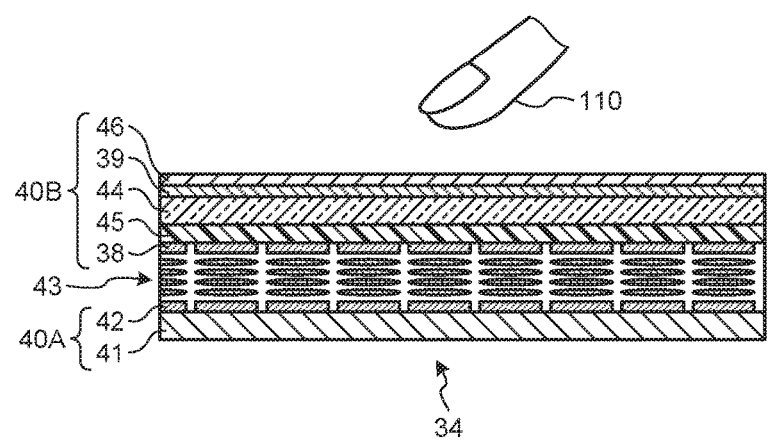
FIG. 5 is a diagram illustrating a layered structure of an image display panel according to the first embodiment.

FIG. 5 is a diagram illustrating a layered structure of the image display panel according to the first embodiment. As illustrated in FIG. 5, the panel unit 34 includes a pixel substrate 40A, a counter substrate 40B arranged facing the pixel substrate 40A, and a liquid crystal layer 43 provided between the pixel substrate 40A and the counter substrate 40B. The pixel substrate 40A includes a TFT substrate 41 serving as a circuit substrate and a plurality of pixel electrodes 42 disposed at respective positions in a two-dimensional matrix form on this TFT substrate 41. Wiring (not illustrated) is formed on the TFT substrate 41, including a thin film transistor (TFT) for each of pixels, a pixel signal line SGL that supplies the image signal to the pixel electrode 42, and a scanning signal line GCL that drives each of the TFTs.

The counter substrate 40B includes a glass substrate 44, a color filter 45 formed on one surface of this glass substrate 44, and the plurality of the drive electrode units 38 formed on this color filter 45. The color filter 45 is configured by color filter layers of three colors of, for example, red (R), green (G), and blue (B) cyclically arrayed, where the three colors of R, G, and B are associated with each of display pixels as one set. The drive electrode unit 38 has functions as a common drive electrode when displaying an image, a drive electrode in carrying out the touch detection, and a drive electrode during the confirmation of the array pattern of the image display panels 32. The drive electrode unit 38 is made of, for example, indium tin oxide (ITO). The drive electrode unit 38 is coupled to the TFT substrate 41 using a contact conducting cylinder (not illustrated) such that a voltage such as the application voltage $V_A$ is applied thereto from the TFT substrate 41 through this contact conducting cylinder.

The plurality of detection electrode units 39 is formed on another surface of the glass substrate 44. The detection electrode unit 39 has functions as a detection electrode in carrying out the touch detection and a detection electrode during the confirmation of the array pattern of the image display panels 32. As in the drive electrode unit 38, the detection electrode unit 39 is made of ITO, for example. Additionally, a polarizing plate 46 is disposed on these detection electrode units 39.

The liquid crystal layer 43 is configured to modulate light passing through an electric field depending on a state of the electric field, where liquid crystals in various types of modes are used, including a twisted nematic (TN) mode, a vertical orientation (VA) mode, and an electrically controlled birefringence (ECB) mode. Orientation films are individually disposed between the liquid crystal layer 43 and the pixel substrate 40A and between the liquid crystal layer 43 and the counter substrate 40B, while an incident-side polarizing plate is arranged on a lower surface side of the pixel substrate 40A, but the illustration thereof is omitted on the drawing.

As described above, the drive electrode unit 38 has functions as a drive electrode in carrying out the touch detection and a drive electrode during the confirmation of the array pattern of the image display panels 32. Likewise, the detection electrode unit 39 has functions as a detection electrode in carrying out the touch detection and a detection electrode during the confirmation of the array pattern of the image display panels 32. However, the configuration of the image display panel 32 is not limited to the one described above. The confirmation of the array pattern of the image display panels 32 will be described later and hereinafter, the touch detection is described.

Figure 6:
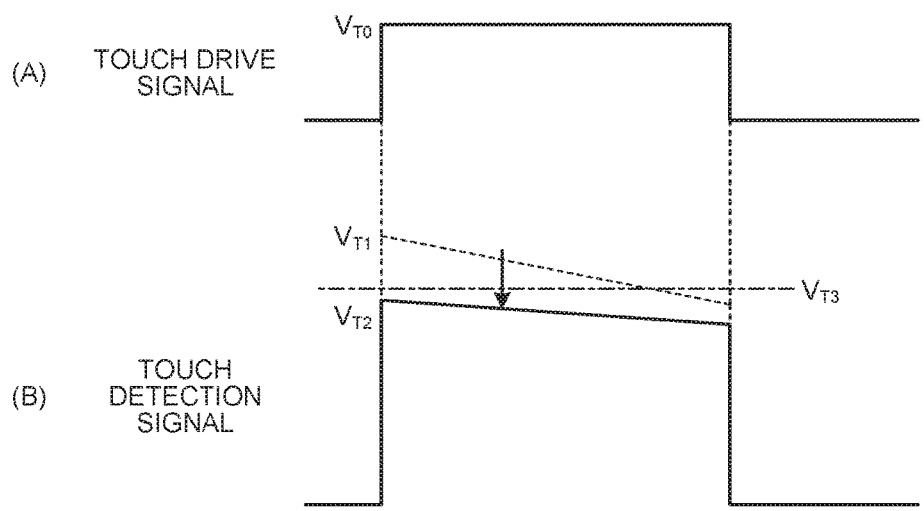
FIG. 6 is an explanatory diagram for explaining touch detection according to the first embodiment.

FIG. 6 is an explanatory diagram for explaining the touch detection according to the first embodiment. As illustrated in FIG. 4 and FIG. 5, the drive electrode unit 38 and the detection electrode unit 39 according to the embodiment are separate electrodes provided so as to face each other. The image display panel 32 according to the embodiment is a capacitance type touch panel, in more detail, a mutual capacitance sensing-type touch panel in which the drive electrode unit 38 and the detection electrode unit 39 form a capacitance. Specifically, as illustrate in a graph (A) of FIG. 6, a touch drive signal is applied to the drive electrode unit 38 when the touch detection is carried out. The touch drive signal is an alternating current signal at a predetermined frequency, whose maximum voltage serves as a touch drive voltage $V_{T0}$. When the touch drive signal is applied thereto, the detection electrode unit 39 facing thereto generates a touch detection signal corresponding to the touch drive signal. While the proximity object such as a finger 110 is not in the proximity to or in touch with the image display panel 32 or the like, the maximum voltage of the touch detection signal is a touch detection voltage $V_{T1}$ corresponding to the touch drive voltage $V_{T0}$.

On the other hand, while the proximity object such as the finger 110 is in the proximity to or in touch with the image display panel 32, the proximity object and the detection electrode unit 39 form a capacitive component, in addition to a capacitive component formed by the drive electrode unit 38 and the detection electrode unit 39. This capacitive component formed by the drive electrode unit 38 and the detection electrode unit 39 and this capacitive component formed by the proximity object and the detection electrode unit 39 are in serial in an equivalent circuit. Accordingly, in a case where the proximity object is in the proximity to the image display panel 32, the maximum voltage of the touch detection signal is a touch detection voltage $V_{T2}$ whose value is smaller than that of the touch detection voltage $V_{T1}$. The embodiment determines that the proximity object such as the finger 110 is in the proximity to or in touch with the image display panel 32 when the maximum voltage of the touch detection signal is smaller than a touch voltage threshold $V_{T3}$ serving as a predetermined threshold. The image display panel 32 carries out the touch detection in this manner.

(Configuration of Controller)

Figure 7:
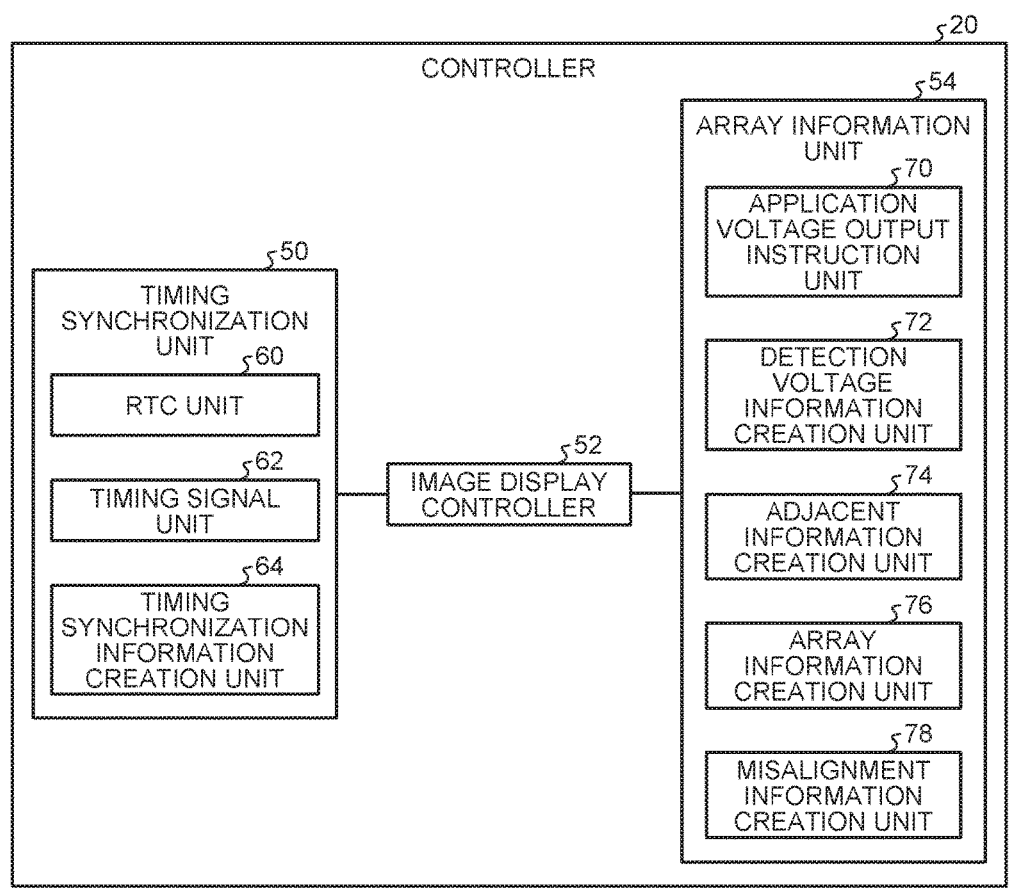
FIG. 7 is a block diagram for explaining a configuration of a controller according to the first embodiment.

Next, a configuration of the controller 20 will be described. The controller 20 constitutes a control device that controls the image display panel 32. FIG. 7 is a block diagram for explaining the configuration of the controller according to the first embodiment. The controller 20 includes a timing synchronization unit 50, an image display controller 52, and an array information unit 54. The timing synchronization unit 50 generates timing synchronization information for synchronizing operation timings between the controller 20 and the image display panel 32. The image display controller 52 is configured to control image display of the respective image display panels 32. The array information unit 54 is configured to generates array information serving as information regarding at which position each of the image display panels 32 is arranged among all of the image display panels 32 (array pattern).

The timing synchronization unit 50 includes an RTC unit 60, a timing signal unit 62, and a timing synchronization information creation unit 64. The RTC unit 60 acts as a real time clock (RTC) for the controller 20 to clock time unique to the controller 20. Although the RTC unit 60 has accuracy of a one-second order, the accuracy of time clocking is arbitrary and a high-accuracy RTC unit having accuracy of a more accurate millisecond order may be employed.

The timing signal unit 62 is configured to output a timing signal to each of the image display panels 32. The timing signal according to the embodiment is a ping.

The timing synchronization information creation unit 64 creates the timing synchronization information based on the timing signal, a return timing signal which is a return signal to the timing signal, and unique time of the controller 20 and unique time of the image display panel 32. The timing synchronization information is information regarding a delay interval until a command issued from the controller 20 reaches each of the image display panels 32. Details of generation processing for the timing synchronization information will be described later.

Based on the timing synchronization information from the timing synchronization unit 50, the array information from the array information unit 54, and the like, the image display controller 52 transmits, to each of the image display panels 32, the image signal for causing each of the image display panels 32 to display a predetermined image.

The array information unit 54 includes an application voltage output instruction unit 70, a detection voltage information creation unit 72, an adjacent information creation unit 74, an array information creation unit 76, and a misalignment information creation unit 78.

The application voltage output instruction unit 70 instructs the image display panel 32 to apply the application voltage $V_A$ to the drive electrode unit 38 of the image display panel 32.

The detection voltage information creation unit 72 acquires the detection voltage $V_D$ generated at another image display panel 32 (the image display panel other than the image display panel 32 of its own) in accordance with the application voltage $V_A$ to create detection voltage information A1. The detection voltage information A1 will be described later.

Based on the detection voltage information A1, the adjacent information creation unit 74 creates adjacent information B serving as information indicating the image display panels 32 adjacent to each other. The adjacent information B will be described later.

Based on the adjacent information B, the array information creation unit 76 creates array information C indicating the array pattern among the plurality of image display panels 32. The array information C will be described later.

Based on the detection voltage information A1, the misalignment information creation unit 78 creates misalignment information D serving as information regarding misalignment among the adjacent image display panels 32. The misalignment information D will be described later.

The controller 20 has the configuration described above.

(Configuration of Panel Controller)

Figure 8:
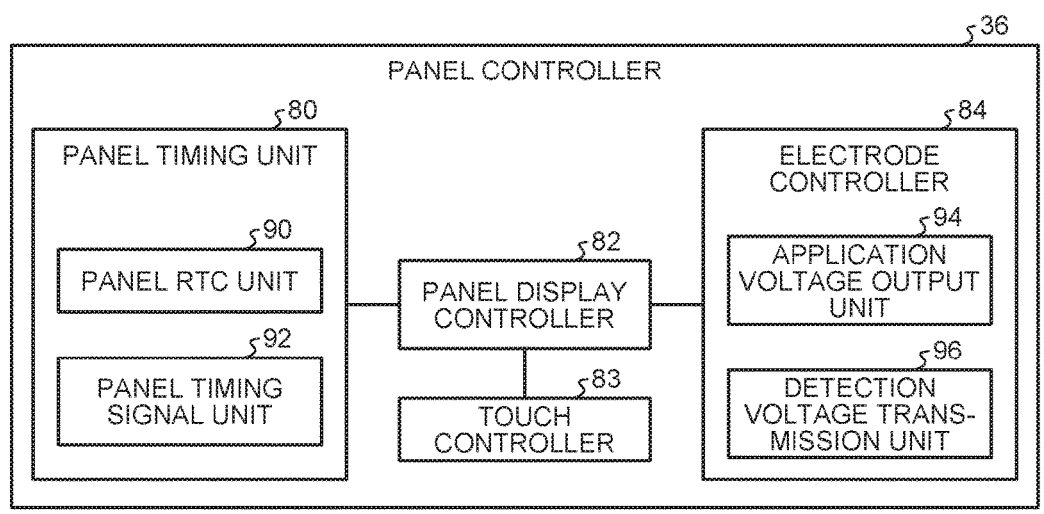
FIG. 8 is a block diagram for explaining a configuration of a panel controller according to the first embodiment.

Next, a configuration of the panel controller 36 will be described. FIG. 8 is a block diagram for explaining the configuration of the panel controller according to the first embodiment. As illustrated in FIG. 8, the panel controller 36 includes a panel timing unit 80, a panel display controller 82, a touch controller 83, and an electrode controller 84. The panel timing unit 80 receives the timing signal from the timing synchronization unit 50 of the controller 20 to output the return timing signal. Based on the image signal from the image display controller 52 of the controller 20, the panel display controller 82 causes the panel unit 34 to display an image. The touch controller 83 controls the touch detection on the panel unit 34. The electrode controller 84 applies the application voltage $V_A$ based on the instruction from the application voltage output instruction unit 70 of the controller 20 and outputs the detection voltage $V_D$ to the detection voltage information creation unit 72 of the controller 20.

The panel timing unit 80 includes a panel RTC unit 90 and a panel timing signal unit 92. The panel RTC unit 90 acts as an RTC for the image display panel 32 to clock time unique to the image display panel 32 of its own. Although the panel RTC unit 90 has accuracy of a one-second order, the accuracy of time clocking is arbitrary and a high-accuracy RTC unit having accuracy of a more accurate millisecond order may be employed.

The panel timing signal unit 92 receives the timing signal from the timing signal unit 62 to output the return timing signal to the timing signal unit 62.

The electrode controller 84 includes an application voltage output unit 94 and a detection voltage transmission unit 96. Based on the instruction from the application voltage output instruction unit 70 of the controller 20, the application voltage output unit 94 applies the application voltage $V_A$ to the drive electrode unit 38 of its own. The detection voltage transmission unit 96 transmits, to the detection voltage information creation unit 72 of the controller 20, the detection voltage $V_D$ generated at the detection electrode unit 39 in its own image display panel 32.

The panel controller 36 has the configuration as described above.

(Processing Content)

Figure 9:
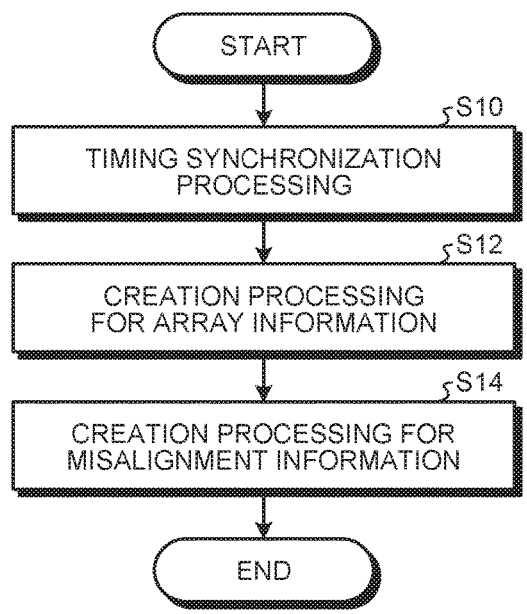
FIG. 9 is a flowchart for explaining content of detection processing for an array pattern by the controller.

Next, the content of the processing by the controller 20 for detecting the array pattern of the image display panels 32 will be described. FIG. 9 is a flowchart for explaining the content of the detection processing for the array pattern by the controller. As illustrated in FIG. 9, the controller 20 first carries out timing synchronization processing (step S10) to create the timing synchronization information used for detecting the array pattern. After carrying out the timing synchronization processing, the controller 20 carries out creation processing for the array information indicating the array pattern of the image display panels 32 (step S12). After carrying out the creation processing for the array information, the controller 20 creates the misalignment information serving as information regarding misalignment among the adjacent image display panels 32 (step S14). With this, the processing for detecting the array pattern of the image display panels 32 is completed. Based on a result of this processing, the controller 20 transmits, to each of the image display panels 32, the image signal corresponding to a position at which that image display panel 32 is arranged. The image display panel 32 displays an image corresponding to a position at which that image display panel 32 is arranged based on this proper pixel signal. Hereinafter, details of the processing at respective steps S10, S12, and S14 will be described.

(Timing Synchronization Processing)

First, the timing synchronization processing at step S10 in FIG. 9 will be described. The timing synchronization processing is processing that detects in advance a delay interval until a command issued from the controller 20 reaches each of the image display panels 32. The controller 20 carries out control in consideration of this delay interval during the detection of the array pattern of the image display panels 32 such that the operation among the respective image display panels 32 can be synchronized. As a result, the array pattern can be properly detected.

In the timing synchronization unit 50 of the controller 20, the timing signal unit 62 outputs the timing signals to all of the image display panels 32. The timing synchronization unit 50 also outputs the timing signal to the controller 20 itself.

Upon acquiring the timing signal, in the image display panel 32, the panel timing signal unit 92 generates the return timing signal, namely, the return signal to the timing signal and then outputs the generated return timing signal to the timing synchronization information creation unit 64 of the controller 20. The panel timing signal unit 92 also acquires, from the panel RTC unit 90, unique time information serving as information regarding the unique time at the point of outputting the return timing signal. The panel timing signal unit 92 outputs the unique time information to the timing synchronization information creation unit 64 of the controller 20. Likewise, when the timing synchronization unit 50 of the controller 20 acquires the timing signal to itself, the timing synchronization unit 50 generates the return timing signal to output to the timing synchronization information creation unit 64. The timing synchronization unit 50 also acquires, from the RTC unit 60, unique time information serving as information regarding the unique time at the point of outputting the return timing signal. The timing synchronization unit 50 outputs the unique time information to the timing synchronization information creation unit 64.

The timing synchronization information creation unit 64 detects a timing delay interval based on the unique time of the controller 20 at the point of outputting the timing signal and the unique time of the controller 20 at the point of acquiring the return timing signal. Because the return timing signal is output from each of the image display panels 32, the timing delay interval is detected for each of the image display panels 32. The timing delay interval represents a difference between the time at the point of outputting the timing signal and the time at the point of acquiring the return timing signal. The timing delay interval corresponds to a delay interval until a command issued from the controller 20 reaches each of the image display panels 32. Because the return timing signal is also output from the controller 20 itself, the timing delay interval is also detected for the controller 20 itself. The timing delay interval for the controller 20 itself represents a delay interval within the controller 20 in controlling. The timing synchronization information creation unit 64 acquires the unique time information of the respective image display panels 32 at the point of outputting the return timing signal and the unique time information of the controller 20 at the point of outputting the return timing signal.

The timing synchronization information creation unit 64 stores, as timing information, the timing signal delay intervals for the respective image display panels 32 and the controller 20, and the unique time information of the respective image display panels 32 and the controller 20. The timing synchronization unit 50 of the controller 20 repeats this creation processing for the timing information a plurality of times to create a plurality of sets of the timing information.

FIG. 10 is a diagram for explaining exemplary timing information. FIG. 10 illustrates first timing information indicating an initial timing, second timing information serving as the subsequent timing information, and third timing information serving as the further subsequent timing information. According to the first timing information in FIG. 10, the unique time of the controller 20 at the point of outputting the return timing signal is 100 (s). Similarly, the unique time of the image display panel 32A is 320 (s), the unique time of the image display panel 32B is 250 (s), and the unique time of the image display panel 32C is 720 (s). This information indicates the time of the respective units at the same timing, representing that, for example, when the controller 20 is at the time of 100 (s), the image display panel 32A is at the time of 320 (s).

According to the first timing information in FIG. 10, the timing delay interval for the controller 20 itself is 16 (ms). The timing delay interval for the image display panel 32A is 16 (ms), the timing delay interval for the image display panel 32B is 16 (ms), and the timing delay interval for the image display panel 32C is 24 (ms). This information indicates that, for example, the delay interval when the controller 20 issues a command to itself is 16 (ms), while the delay interval when the controller 20 issues a command to the image display panel 32A is also 16 (ms).

As illustrated in FIG. 10, the timing synchronization information creation unit 64 acquires the above-described first timing information, along with the second timing information and the third timing information serving as the subsequent timing information. For example, the second timing information represents processing carried out 32 seconds after the first timing information. Accordingly, the unique time of the controller 20 in the second timing information is 132 (s). Although FIG. 10 simply illustrates information regarding the image display panels 32A, 32B, and 32C out of the image display panels 32, the actual timing information contains information regarding all of the image display panels 32.

Based on the plurality of sets of timing information created as described above, the timing synchronization information creation unit 64 creates the timing synchronization information. The timing synchronization information contains time synchronization information and delay interval information. The time synchronization information is served as information regarding a corresponding relationship between the unique time of the controller 20 and the unique time of each of the image display panels 32. The delay interval information is an interval until a command issued from the controller 20 reaches each of the image display panels 32. The timing synchronization information creation unit 64 creates the time synchronization information based on a difference between the unique time of the controller 20 and the unique time of each of the image display panels 32. The timing synchronization information creation unit 64 also creates the delay interval information based on information regarding the delay interval for each of the image display panels 32. The timing synchronization information creation unit 64 may create the timing synchronization information based on at least one set of the timing information.

Figures 11, 12:
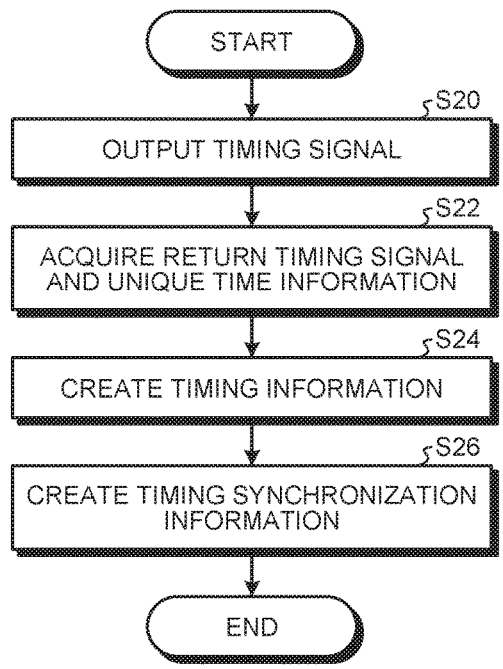
FIG. 11 is an explanatory diagram for explaining exemplary timing synchronization information.
FIG. 12 is a flowchart for explaining a processing flow of timing synchronization processing.

FIG. 11 is an explanatory diagram for explaining exemplary timing synchronization information. FIG. 11 illustrates timing synchronization information created based on the first timing information, the second timing information, and the third timing information in FIG. 10. According to FIG. 11, the time synchronization information indicates that the unique time of the image display panel 32A is 220 (s) ahead of the unique time of the controller 20. Likewise, the unique time of the image display panel 32B is 150 (s) ahead of the unique time of the controller 20, whereas the unique time of the image display panel 32C is 620 (s) ahead of the unique time of the controller 20. This time synchronization information represents a value of a difference between the unique time of the controller 20 and the unique time of each of the image display panels 32 in each set of the timing information.

According to FIG. 11, the delay interval information indicates that the delay interval for the image display panel 32A, that is, an interval until a command from the controller 20 reaches the image display panel 32A (an interval for one direction) is 8.16 (ms). This delay interval information represents a value obtained by dividing an average value of the timing delay intervals for the image display panel 32A in the first timing information, the second timing information, and the third timing information by two. Likewise, the delay interval for the image display panel 32B is 8.16 (ms), whereas the delay interval for the image display panel 32C is 12.16 (ms). However, the delay interval information may be a value obtained by dividing a maximum value of the timing delay intervals for the image display panel 32A in the first timing information, the second timing information, and the third timing information by two.

The timing synchronization information creation unit 64 creates the timing synchronization information as described above. Based on this timing synchronization information, the controller 20 controls, for example, creation of array pattern information later. For example, based on the time synchronization information, the controller 20 can control each of the image display panels 32 by specifying the unique time thereof. When causing the image display panel 32 to carry out processing at predetermined unique time, the controller 20 outputs a command earlier than that unique time at least by an amount equivalent to the delay interval, thereby making it possible to cause the image display panel 32 to carry out the processing without being late for that predetermined unique time.

A processing flow of the above-described timing synchronization processing will be described with reference to a flowchart. FIG. 12 is a flowchart for explaining a processing flow of the timing synchronization processing. First, as illustrated in FIG. 12, the controller 20 uses the timing signal unit 62 to output the timing signals to the controller 20 and the respective image display panels 32 (step S20). After outputting the timing signals, the controller 20 uses the timing synchronization information creation unit 64 to acquire the return timing signals and the unique time information from the controller 20 and the respective image display panels 32 (step S22).

After acquiring the return timing signals and the unique time information, the controller 20 uses the timing synchronization information creation unit 64 to create the timing information (step S24). The timing information is information containing the timing signal delay intervals for the respective image display panels 32 and the controller 20, and the unique time information of the respective image display panels 32 and the controller 20. After creating the timing information, the controller 20 uses the timing synchronization information creation unit 64 to create the timing synchronization information (step S26). The timing synchronization information is information containing the time synchronization information serving as information regarding a corresponding relationship between the unique time of the controller 20 and the unique time of each of the image display panels 32, and delay interval information until a command issued from the controller 20 reaches each of the image display panels 32. In the embodiment, the timing synchronization information creation unit 64 creates the timing synchronization information based on the plurality of sets of timing information. This processing is terminated at step S26 at which the timing synchronization information is created.

(Creation Processing for Array Information)

Next, the creation processing for the array information at step S12 in FIG. 9 will be described. The controller 20 does not display images on the image display panels 32 during the creation processing for the array information described below. First, in the array information unit 54 of the controller 20, the application voltage output instruction unit 70 selects, as an application image display panel, one of the image display panels 32A, 32B, 32C, 32D, 32E, 32F, 32G, 32H, and 32I. The application voltage output instruction unit 70 instructs this application image display panel to apply the application voltage $V_A$ to the drive electrode unit 38 of its own. The application voltage output instruction unit 70 then instructs standby image display panels which are all of the image display panels 32 other than the application image display panel to put the detection electrode units 39 into a standby state. The standby state is a state in which the application voltage $V_A$ can be detected to generate the detection voltage $V_D$.

For example, in a case where the image display panel 32F is selected as the application image display panel, the application voltage output instruction unit 70 outputs an instruction to the application voltage output unit 94 included in the panel controller 36 of the image display panel 32F to apply the application voltage $V_A$. The application voltage output instruction unit 70 may select the image display panel 32 other than the image display panel 32F as the application image display panel or alternatively, may select the plurality of image display panels 32 simultaneously as the application image display panels. However, the array information unit 54 selects, as the application image display panel, solely part of the image display panels 32 from all of the image display panels 32 at the same timing.

The application voltage output unit 94 of the image display panel 32F selected as the application image display panel applies the application voltage $V_A$ to the drive electrode unit 38 of its own based on the instruction from the application voltage output instruction unit 70. The application voltage output unit 94 sequentially applies the application voltage $V_A$ to the respective drive electrode units 38 in the order of the drive electrode units 38A, 38B, 38C, 38D, and 38E. The application voltage output unit 94 applies the application voltage $V_A$ to one drive electrode unit 38 only at the same time and accordingly, the voltage is not applied to the other drive electrode units 38 in this state. The order in which the application voltage output unit 94 applies the application voltage $V_A$ is not limited thereto. The application voltage output unit 94 of the image display panel 32F selected as the application image display panel puts the detection electrode units 39 of its own into a baseline drive mode. The baseline drive mode is a mode in which the application voltage $V_A$ is not detected (the detection voltage $V_D$ is not generated).

When the application voltage $V_A$ is applied to the drive electrode unit 38 of the image display panel 32F selected as the application image display panel, the detection voltage $V_D$ corresponding to that application voltage $V_A$ is generated at the detection electrode unit 39 in at least part of the standby image display panels which are the image display panels 32 other than the application image display panel. In a case where the detection electrode unit 39 of the standby image display panel is located at a position where that detection electrode unit 39 and the drive electrode unit 38 of the application image display panel constitute the capacitive component, the detection voltage $V_D$ is generated. Specifically, the detection electrode unit 39 of part of the standby image display panels forms a capacitor by acting as a pair of electrodes with the drive electrode unit 38 of the application image display panel. Therefore, the detection voltage $V_D$ is generated at this detection electrode unit 39 due to the application voltage $V_A$ to the drive electrode unit 38 acting as the other electrode. In the embodiment, the detection voltage $V_D$ is generated at the detection electrode unit 39 in the standby image display panel adjacent to the application image display panel in the X direction or the Y direction, of which details will be described later.

Figure 13:
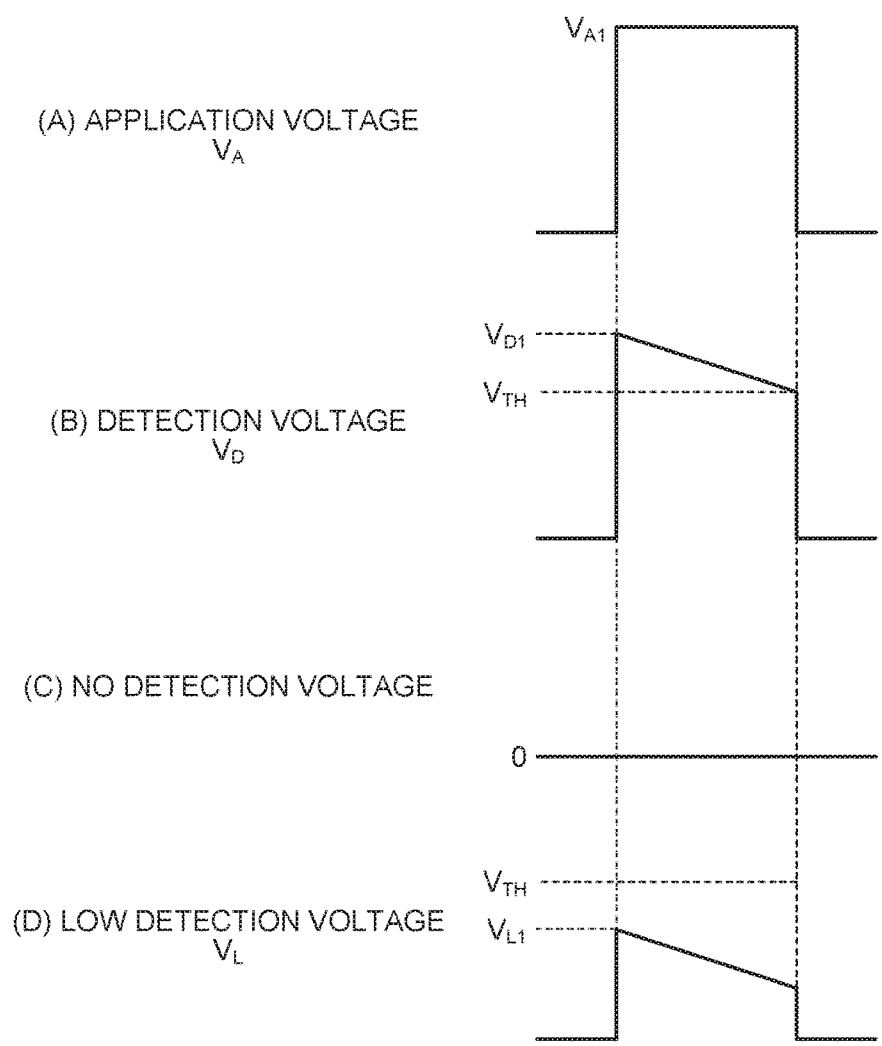
FIG. 13 is a diagram illustrating an exemplary application voltage and exemplary detection voltages.

FIG. 13 is a diagram illustrating an exemplary application voltage and exemplary detection voltages. As illustrated in a graph (A) in FIG. 13, the application voltage $V_A$ is a voltage signal at a predetermined frequency having a maximum voltage value $V_{A1}$. Likewise, as illustrated in a graph (B) in FIG. 13, the detection voltage $V_D$ is a voltage signal at a frequency corresponding (similar) to the application voltage $V_A$, having a maximum voltage value $V_{D1}$. In the embodiment, the detection voltage $V_D$ is generated at the detection electrode unit 39 included in the standby image display panel adjacent to the application image display panel in the X direction or the Y direction, as long as that detection electrode unit 39 is positioned on the application image display panel side. In other words, according to the embodiment, the detection voltage $V_D$ is generated at the detection electrode unit 39 adjacent to, in the X direction or the Y direction, the drive electrode unit 38 to which the application voltage $V_A$ is applied. The voltage generated at the detection electrode unit 39 due to the application voltage $V_A$ attenuates gradually as a distance between the detection electrode unit 39 and the drive electrode unit 38 to which the application voltage $V_A$ is applied increases. According to the embodiment, a case is considered where of the detection electrode unit 39 not adjacent to, in the X direction or the Y direction, the drive electrode unit 38 to which the application voltage $V_A$ is applied. In this case, the voltage is not generated at the detection electrode unit 39 as illustrated in graph (C) in FIG. 13, from a reason that a distance from the drive electrode unit 38 is larger than the case of the detection electrode unit 39 that has generated the detection voltage $V_D$.

However, even in the case of the detection electrode unit 39 not adjacent to, in the X direction or the Y direction, the drive electrode unit 38 to which the application voltage $V_A$ is applied, when this detection electrode unit 39 is located at a position where the capacitive component is constituted by this detection electrode unit 39 and the drive electrode unit 38 to which the application voltage $V_A$ is applied, a low detection voltage $V_L$ (maximum voltage value $V_{L1}$) is generated in some cases as illustrated in a graph (D) in FIG. 13. The low detection voltage $V_L$ is a voltage of which the maximum voltage value is smaller than that of the detection voltage $V_D$. The low detection voltage $V_L$ is generated at the detection electrode unit 39 when that detection electrode unit 39 is located at a position more away from the drive electrode unit 38 to which the application voltage $V_A$ is applied than the detection electrode unit 39 that generates the detection voltage $V_D$ and at the same time, located at a position where the capacitive component is constituted by that detection electrode unit 39 and the drive electrode unit 38 to which the application voltage $V_A$ is applied. In this case, the controller 20 stores a detection voltage threshold $V_{TH}$ having a predetermined threshold in advance. The controller 20 then determines a voltage signal having a maximum voltage value larger than the detection voltage threshold $V_{TH}$ as the detection voltage $V_D$. The controller 20 determines a voltage signal having a maximum voltage value smaller than the detection voltage threshold $V_{TH}$ as the low detection voltage $V_L$. As described above, the voltage generated at the detection electrode unit 39 attenuates gradually as a distance between the detection electrode unit 39 and the standby image display panel increases. When the plurality of detection voltage thresholds $V_{TH}$ is provided, the controller 20 can detect positions of the image display panels 32 located farther.

Figure 14:
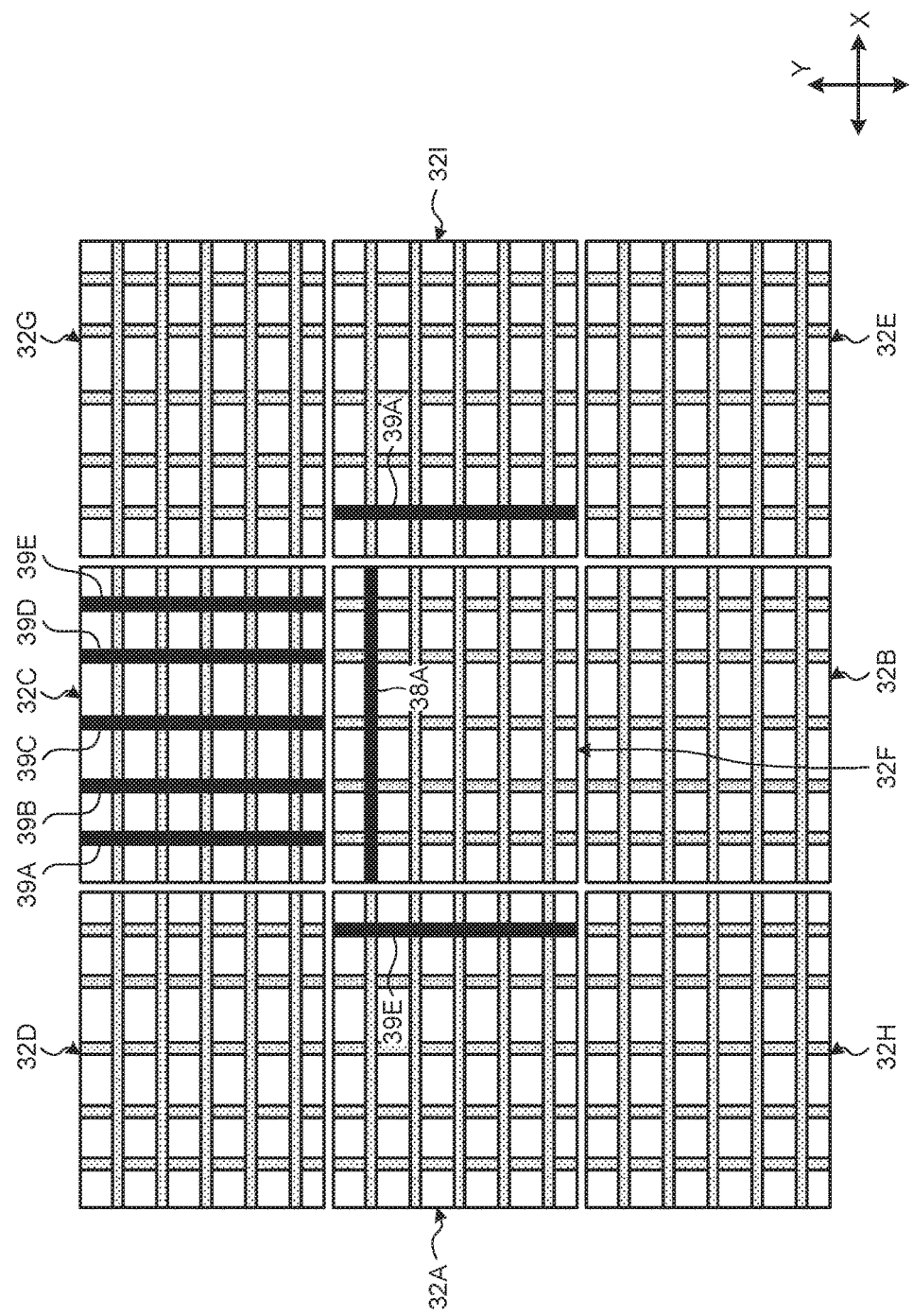
FIG. 14 is an explanatory diagram for explaining the generation of the detection voltage when the application voltage is applied.
Figure 15:
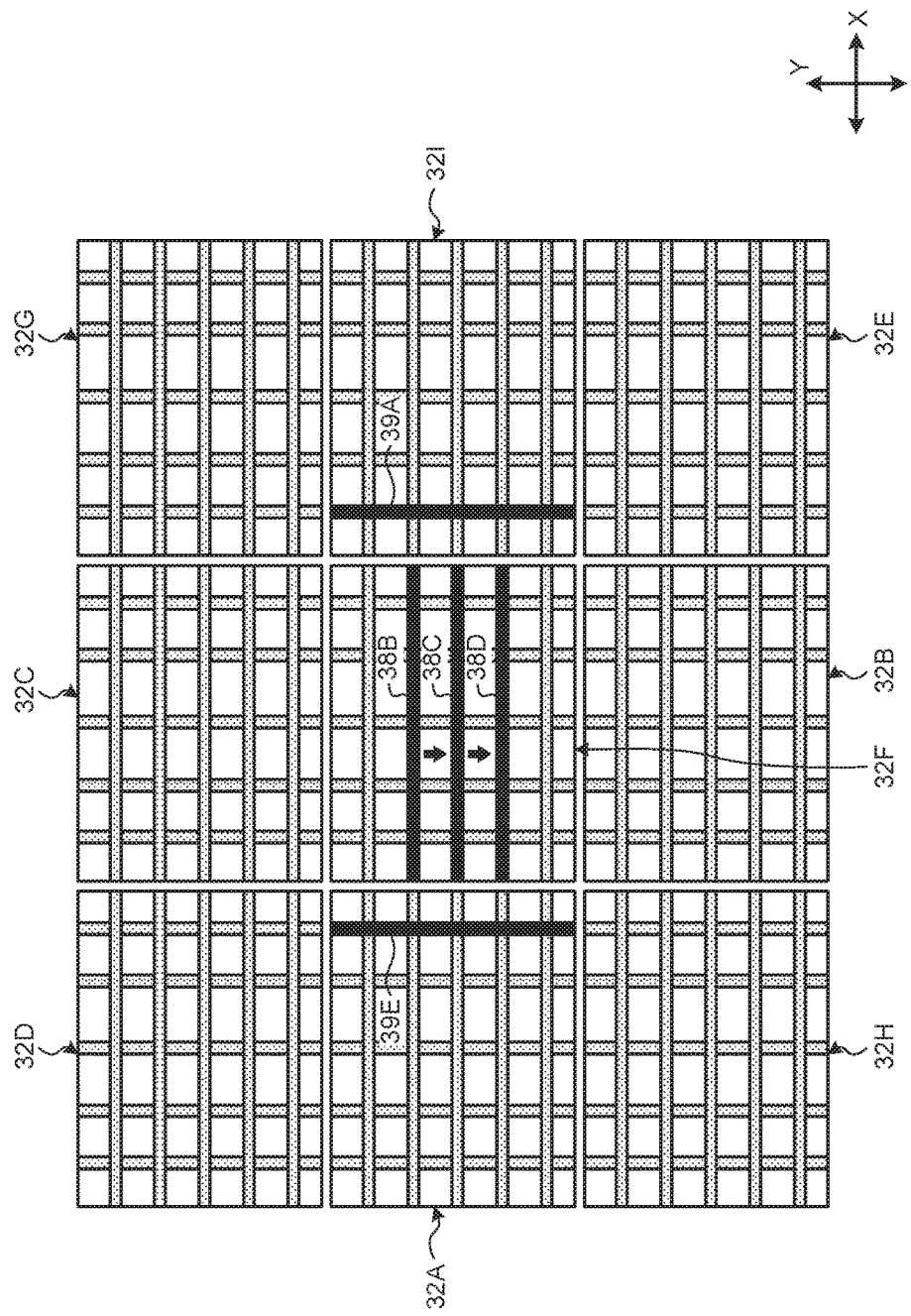
FIG. 15 is an explanatory diagram for explaining the generation of the detection voltage when the application voltage is applied.
Figure 16:
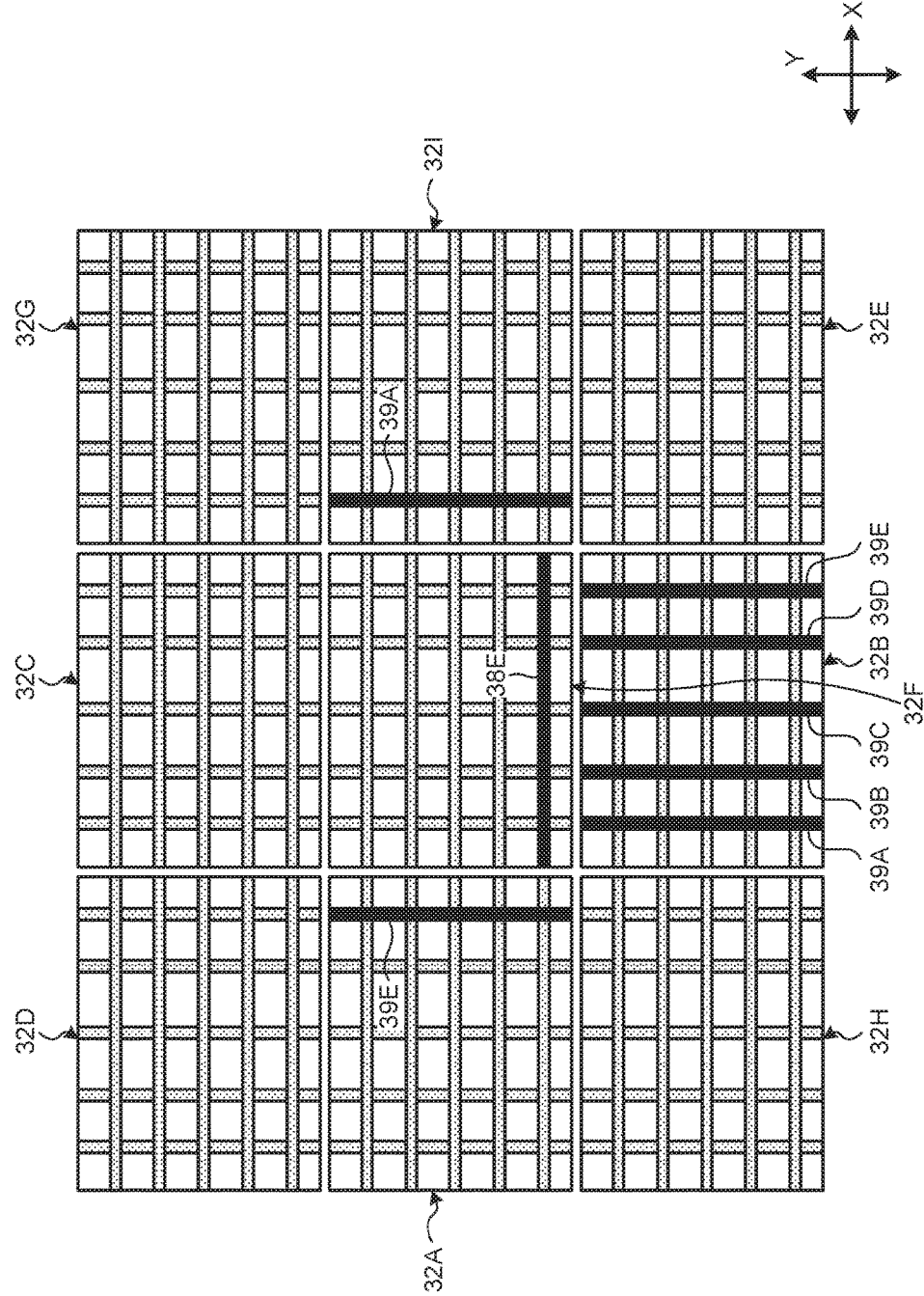
FIG. 16 is an explanatory diagram for explaining the generation of the detection voltage when the application voltage is applied.

Hereinafter, the generation of the detection voltage $V_D$ when the application voltage $V_A$ is sequentially applied to the drive electrode units 38 of the image display panel 32F will be described. FIG. 14 to FIG. 16 are explanatory diagrams for explaining the generation of the detection voltage when the application voltage is applied. As described above, the image display panel 32F serving as the application image display panel sequentially applies the application voltage $V_A$ to the drive electrode units 38A, 38B, 38C, 38D, and 38E. FIG. 14 illustrates the detection electrode units 39 at which the detection voltages $V_D$ are generated at a timing when the application voltage $V_A$ is applied to the drive electrode unit 38A of the image display panel 32F. FIG. 15 illustrates the detection electrode units 39 at which the detection voltages $V_D$ are generated at a timing when the application voltage $V_A$ is sequentially applied to the drive electrode units 38B, 38C, and 38D of the image display panel 32F. FIG. 16 illustrates the detection electrode units 39 at which the detection voltages $V_D$ are generated at a timing when the application voltage $V_A$ is applied to the drive electrode unit 38E of the image display panel 32F.

As illustrated in FIG. 14, when the application voltage $V_A$ is applied to the drive electrode unit 38A of the image display panel 32F, the detection voltages $V_D$ are generated at the detection electrode units 39 adjacent to the drive electrode unit 38A of the image display panel 32F in the X direction or the Y direction. Specifically, in the image display panel 32A, the detection voltage $V_D$ is generated at the detection electrode unit 39E adjacent to the drive electrode unit 38A of the image display panel 32F on a left side in the X direction. In the image display panel 32I, the detection voltage $V_D$ is generated at the detection electrode unit 39A adjacent to the drive electrode unit 38A of the image display panel 32F on a right side in the X direction. In the image display panel 32C, the detection voltages $V_D$ are generated at the detection electrode units 39A, 39B, 39C, 39D, and 39E adjacent to the drive electrode unit 38A of the image display panel 32F on an upper side in the Y direction. The detection electrode units 39 other than the aforementioned detection electrode units 39 are not adjacent to the drive electrode unit 38A of the image display panel 32F and thus, the detection voltage $V_D$ is not generated therein at this timing.

As illustrated in FIG. 15, when the application voltage $V_A$ is applied to the drive electrode units 38B, 38C, and 38D of the image display panel 32F, the detection voltages $V_D$ are generated at the detection electrode units 39 adjacent to the drive electrode units 38B, 38C, and 38D of the image display panel 32F in the X direction or the Y direction. Specifically, in the image display panel 32A, the detection voltage $V_D$ is generated at the detection electrode unit 39E adjacent to the drive electrode units 38B, 38C, and 38D of the image display panel 32F on the left side in the X direction. In the image display panel 32I, the detection voltage $V_D$ is generated at the detection electrode unit 39A adjacent to the drive electrode units 38B, 38C, and 38D of the image display panel 32F on the right side in the X direction. The detection electrode units 39 other than the aforementioned detection electrode units 39 are not adjacent to the drive electrode units 38B, 38C, and 38D of the image display panel 32F and thus, the detection voltage $V_D$ is not generated therein at this timing.

As illustrated in FIG. 16, when the application voltage $V_A$ is applied to the drive electrode unit 38E of the image display panel 32F, the detection voltages $V_D$ are generated at the detection electrode units 39 adjacent to the drive electrode unit 38E of the image display panel 32F in the X direction or the Y direction. Specifically, in the image display panel 32A, the detection voltage $V_D$ is generated at the detection electrode unit 39E adjacent to the drive electrode unit 38E of the image display panel 32F on the left side in the X direction. In the image display panel 32I, the detection voltage $V_D$ is generated at the detection electrode unit 39A adjacent to the drive electrode unit 38E of the image display panel 32F on the right side in the X direction. In the image display panel 32B, the detection voltages $V_D$ are generated at the detection electrode units 39A, 39B, 39C, 39D, and 39E adjacent to the drive electrode unit 38F of the image display panel 32F on a lower side in the Y direction. The detection electrode units 39 other than the aforementioned detection electrode units 39 are not adjacent to the drive electrode unit 38E of the image display panel 32F and thus, the detection voltage $V_D$ is not generated therein at this timing. In any states described in FIG. 14 to FIG. 16, the detection electrode units 39 of the image display panel 32F serving as the application image display panel have been put into the baseline drive mode and thus, the detection voltage $V_D$ is not generated.

As described above, the detection electrode units 39 at which the detection voltages $V_D$ are generated vary depending on the drive electrode unit 38 in the application image display panel to be applied to. The detection voltage transmission unit 96 of the standby image display panel successively outputs, to the detection voltage information creation unit 72 of the controller 20, the detection voltage $V_D$ generated at the detection electrode unit 39 of its own. The detection voltage information creation unit 72 of the controller 20 creates the detection voltage information A1 containing panel type information A2, detection electrode type information A3, detection electrode timing information A4 based on these detection voltages $V_D$. The panel type information A2 is information indicating which image display panel 32 is the standby image display panel that has transmitted the detection voltage $V_D$. The detection electrode type information A3 is information indicating at which detection electrode unit 39 the detection voltage $V_D$ has been generated, among all of the detection electrode units 39 included in the image display panel 32 that has transmitted the detection voltage $V_D$. The detection electrode timing information A4 is information indicating at which timing the detection voltage $V_D$ has been generated at that detection electrode unit 39, among the timings when the application voltage $V_A$ has been sequentially applied. In other words, accordingly, the detection voltage information A1 is information indicating to which drive electrode unit 38 the application voltage $V_A$ has been applied among the plurality of drive electrode units 38 and at that time, and at which detection electrode unit 39 the detection voltage $V_D$ has been generated. The detection voltage transmission unit 96 may output the detection voltage $V_D$ to the panel controller 36 such that the panel controller 36 outputs the detection voltage $V_D$ to the detection voltage information creation unit 72 of the controller 20.

The detection voltage information creation unit 72 acquires the panel type information A2 using different network codes assigned to the respective image display panels 32 by the controller 20. However, for example, the detection voltage information creation unit 72 can acquire the panel type information A2 when the detection voltage transmission unit 96 of each of the image display panels 32 outputs the detection voltage $V_D$ coded for the identification of the respective image display panels 32. For example, the detection voltage transmission unit 96 outputs, to the controller 20, a signal obtained by adding a signal at a specific frequency to a signal of the detection voltage $V_D$. As a result, an amplitude waveform of this signal becomes different for each of the image display panels 32. By analyzing this signal of the detection voltage $V_D$, the detection voltage transmission unit 96 can recognize from which image display panel 32 this detection voltage information A1 is output.

The adjacent information creation unit 74 of the controller 20 creates the adjacent information B based on the detection voltage information A1. The adjacent information B is information indicating which image display panel 32 is the standby image display panel adjacent to the application image display panel in the X direction and which image display panel 32 is the standby image display panel adjacent to the application image display panel in the Y direction. Hereinafter, a method for creating the adjacent information B will be described.

First, a method for detecting the image display panel 32 adjacent in the X direction will be described. The standby image display panel adjacent to the image display panel 32F serving as the application image display panel on the left side in the X direction is the image display panel 32A. In the image display panel 32A as illustrated in FIG. 14 to FIG. 16, at all timings when the application voltage $V_A$ is sequentially applied to the drive electrode units 38A, 38B, 38C, 38D, and 38E of the image display panel 32F, the detection voltage $V_D$ is generated at the detection electrode unit 39E. The detection electrode unit 39E in the image display panel 32A is adjacent to the image display panel 32F in the X direction. The adjacent information creation unit 74 of the controller 20 detects the image display panel 32 in which the detection voltage $V_D$ has been generated at the detection electrode unit 39E which is a detection electrode located rightmost therein at all timings when the application voltage $V_A$ has been sequentially applied. Then the adjacent information creation unit 74 recognizes the detected image display panel 32 as the image display panel 32 adjacent to the application image display panel on the left side in the X direction.

The standby image display panel adjacent to the image display panel 32F serving as the application image display panel on the right side in the X direction is the image display panel 32I. In the image display panel 32I as illustrated in FIG. 14 to FIG. 16, at all timings when the application voltage $V_A$ is sequentially applied to the drive electrode units 38A, 38B, 38C, 38D, and 38E of the image display panel 32F, the detection voltage $V_D$ is generated at the detection electrode unit 39A. The detection electrode unit 39A in the image display panel 32I is adjacent to the image display panel 32F in the X direction. The adjacent information creation unit 74 of the controller 20 detects the image display panel 32 in which the detection voltage $V_D$ has been generated at the detection electrode unit 39A which is a detection electrode located leftmost therein at all timings when the application voltage $V_A$ has been sequentially applied. Then the adjacent information creation unit 74 recognizes the detected image display panel 32 as the image display panel 32 adjacent to the application image display panel on the right side in the X direction.

Next, a method for detecting the image display panel 32 adjacent in the Y direction will be described. The standby image display panel adjacent to the image display panel 32F serving as the application image display panel on the upper side in the Y direction is the image display panel 32C. In the image display panel 32C as illustrated in FIG. 14 to FIG. 16, at a timing when the application voltage $V_A$ is applied to the drive electrode unit 38A of the image display panel 32F, the detection voltages $V_D$ are generated at the detection electrode units 39A, 39B, 39C, 39D, and 39E. The detection electrode units 39A, 39B, 39C, 39D, and 39E in the image display panel 32C are adjacent to the image display panel 32F in the Y direction. The adjacent information creation unit 74 of the controller 20 detects the image display panel 32 in which the detection voltages $V_D$ have been generated at all of the detection electrode units 39 at a timing when the application voltage $V_A$ has been applied to the drive electrode unit 38A. Then the adjacent information creation unit 74 recognizes the detected image display panel 32 as the image display panel 32 adjacent to the application image display panel on the upper side in the Y direction.

The standby image display panel adjacent to the image display panel 32F serving as the application image display panel on the lower side in the Y direction is the image display panel 32B. In the image display panel 32B as illustrated in FIG. 14 to FIG. 16, at a timing when the application voltage $V_A$ is applied to the drive electrode unit 38E of the image display panel 32F, the detection voltages $V_D$ are generated at the detection electrode units 39A, 39B, 39C, 39D, and 39E. The detection electrode units 39A, 39B, 39C, 39D, and 39E in the image display panel 32B are adjacent to the image display panel 32F in the Y direction. The adjacent information creation unit 74 of the controller 20 detects the image display panel 32 in which the detection voltages $V_D$ have been generated at all of the detection electrode units 39 at a timing when the application voltage $V_A$ has been applied to the drive electrode unit 38E. Then adjacent information creation unit 74 recognizes the detected image display panel 32 as the image display panel 32 adjacent to the application image display panel on the lower side in the Y direction.

The adjacent information creation unit 74 of the controller 20 uses the above-described methods to create, based on the detection voltage information A1, the adjacent information B indicating which image display panel is the image display panel 32 adjacent to the application image display panel in the X direction or the Y direction.

After creating the adjacent information B, in the controller 20, the application voltage output instruction unit 70 selects, as the application image display panel, another image display panel different from the one that has been already selected from among the image display panels 32A, 32B, 32C, 32D, 32E, 32F, 32G, 32H, and 32I. The application voltage output instruction unit 70 then continues to create the adjacent information B by repeating the similar processing. For example, the controller 20 selects the image display panel 32G as the application image display panel subsequently to the image display panel 32F. The controller 20 repeats the similar processing, thereby creating the adjacent information B indicating which image display panel is the image display panel 32 adjacent to the image display panel 32G in the X direction or the Y direction. The controller 20 repeats the similar processing until all of the image display panels 32 have been selected as the application image display panel to create the adjacent information B of each of the image display panels 32 serving as information regarding the image display panel 32 adjacent to that image display panel 32.

After creating the adjacent information B for all of the image display panels 32, in the controller 20, the array information creation unit 76 creates the array information C serving as information regarding the array pattern of the image display panels 32, based on the adjacent information B of all of the image display panels 32. The array information C is information regarding at which position each of the image display panels 32 is arranged among all of the image display panels 32. For example, the array information C is information indicating that the image display panel 32D is arranged at the first row and first column, the image display panel 32C is arranged at the first row and second column, and so forth.

Figure 17:
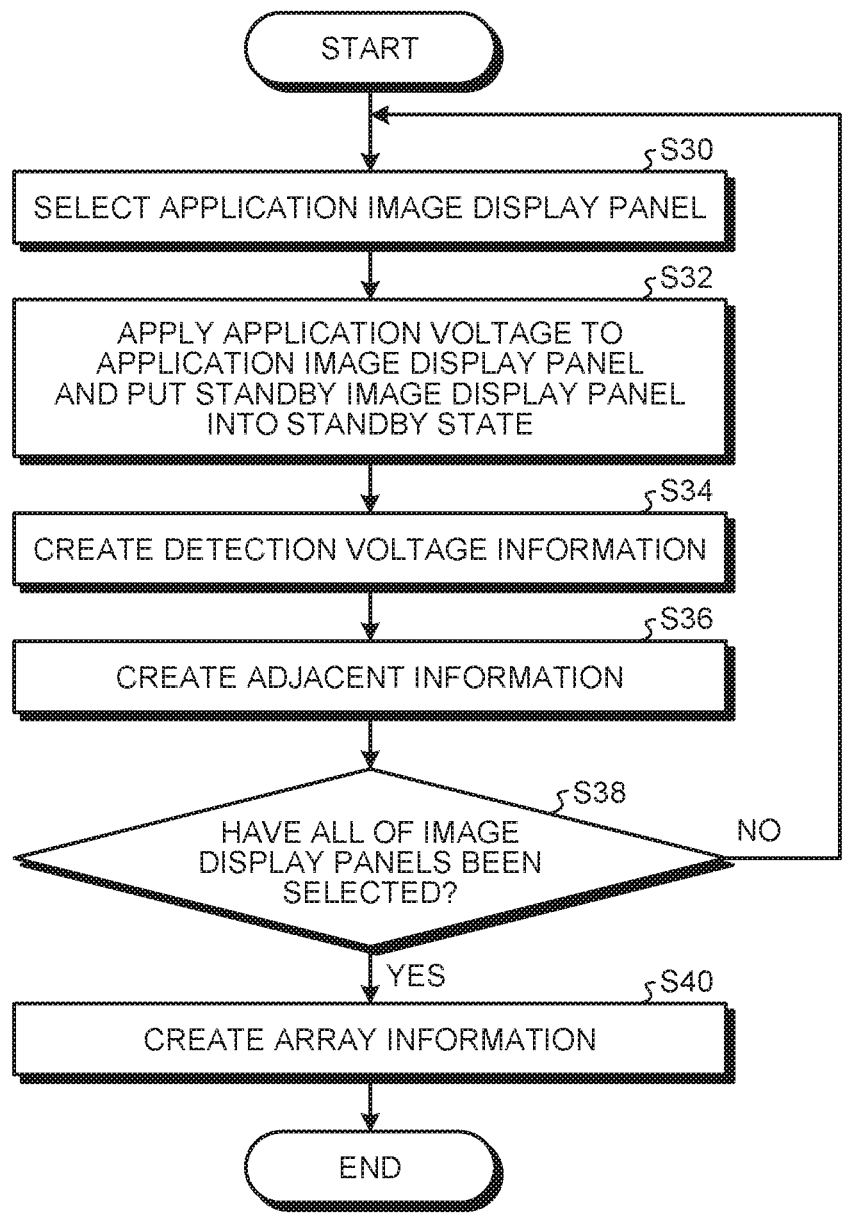
FIG. 17 is a flowchart for explaining a processing flow of creation processing for array information.

A processing flow of the above-described creation processing for the array information C will be described based on a flowchart. FIG. 17 is a flowchart for explaining the processing flow of the creation processing for the array information. As illustrated in FIG. 17, in the controller 20, the application voltage output instruction unit 70 first selects, as the application image display panel, one of the image display panels 32A, 32B, 32C, 32D, 32E, 32F, 32G, 32H, and 32I (step S30).

After selecting the application image display panel, in the controller 20, the application voltage output instruction unit 70 applies the application voltage $V_A$ to the application image display panel, and puts the standby image display panels other than the application image display panel into the standby state (step S32). Thereafter, the application voltage output unit 94 of the application image display panel sequentially applies the application voltage $V_A$ to the respective drive electrode units 38. The application voltage output unit 94 of the standby image display panel puts the respective detection electrode units 39 into the standby state (a state in which the application voltage $V_A$ can be detected and can generate the detection voltage $V_D$). In the standby image display panels adjacent to the application image display panel in the X direction or the Y direction among the standby image display panels, the detection electrode units 39 on a side of the drive electrode unit 38 to which the application voltage $V_A$ is applied sequentially generate the detection electrodes $V_D$. The detection voltage transmission unit 96 of the standby image display panel that has generated detection voltage $V_D$ outputs the detection voltage $V_D$ to the controller 20.

After acquiring the detection voltage $V_D$ from the detection voltage transmission unit 96 of the standby image display panel at step S32, in the controller 20, the detection voltage information creation unit 72 creates the detection voltage information A1 (step S34). The detection voltage information A1 is information regarding to which drive electrode unit 38 the application voltage $V_A$ has been applied among the plurality of drive electrode units 38 and at that time, and at which detection electrode unit 39 the detection voltage $V_D$ has been generated.

After creating the detection voltage information A1, in the controller 20, the adjacent information creation unit 74 creates the adjacent information B based on the detection voltage information A1 (step S36). The adjacent information B is information indicating which image display panel 32 is the standby image display panel adjacent to the application image display panel in the X direction and which image display panel 32 is the standby image display panel adjacent to the application image display panel in the Y direction.

After creating the adjacent information B, the controller 20 determines whether all of the image display panels 32 have been selected as the application image display panel (step S38). When all of the image display panels 32 have not been selected as the application image display panel (step S38: No), the controller 20 returns to step S30. The controller 20 selects, as the application image display panel, the image display panel 32 other than the image display panel 32 that has been already selected as the application image display panel and then carries out the subsequent processing. When all of the image display panels 32 have been selected as the application image display panel (step S38: Yes), in the controller 20, the array information creation unit 76 creates the array information C based on the adjacent information B of all of the image display panels 32 (step S40). The array information C is information regarding at which position each of the image display panels 32 is arranged among all of the image display panels 32. The creation processing for the array information C is terminated at step S40. The controller 20 can recognize which image display panel 32 is arranged at which position using this array information C. The controller 20 thus is possible to transmit, to each of the image display panels 32, the image signal of the partial image corresponding to the position of that image display panel 32.

(Creation Processing for Misalignment Information)

Next, the creation processing for the misalignment information D at step S14 in FIG. 9 will be described. The misalignment information D is information regarding whether the positions of the image display panels 32 adjacent to each other are misaligned. In the controller 20, the misalignment information creation unit 78 creates misalignment information D among the adjacent image display panels 32 based on the detection voltage $V_D$. For example, when it is determined that positions of lateral portions of the adjacent image display panels 32 on the same side are shifted away from each other by a predetermined value or larger in the X direction or the Y direction, the misalignment information creation unit 78 deems that the positions of these image display panels 32 are misaligned. Alternatively, for example, when it is determined that a distance between lateral surfaces facing each other in the image display panels 32 adjacent to each other is larger than a predetermined value, the misalignment information creation unit 78 deems that the positions of these adjacent image display panels 32 are misaligned. Hereinafter, an exemplary method for detecting misalignment will be specifically described.

Figure 18A:
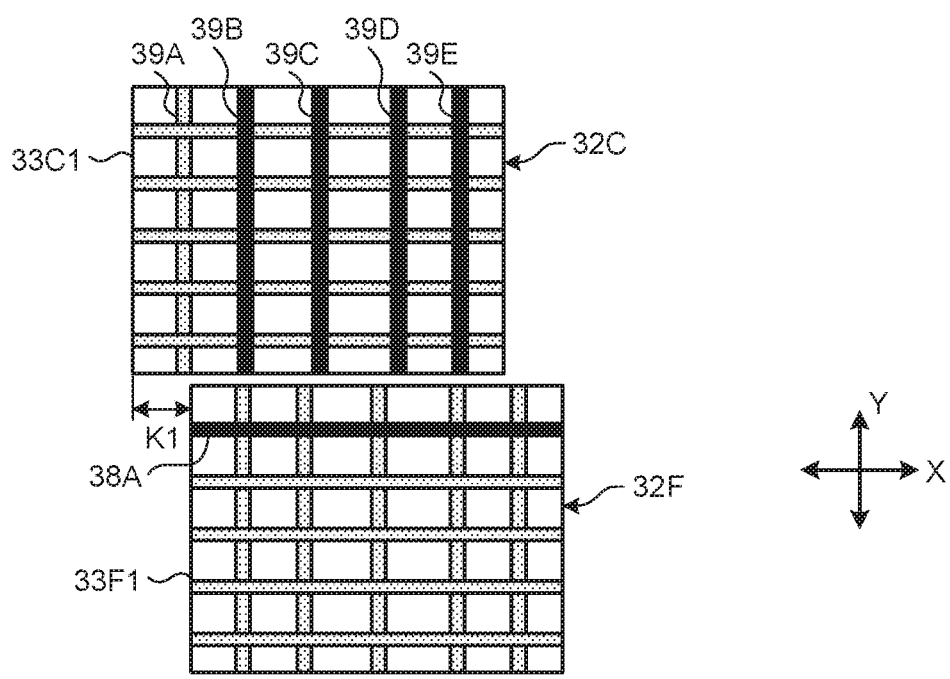
FIG. 18A is a diagram for explaining exemplary detection processing for misalignment information.

FIG. 18A to FIG. 18D are diagrams for explaining exemplary detection processing for the misalignment information. In the example in FIG. 18A, a lateral portion 33F1 of the image display panel 32F on the left side in the X direction is shifted to the right side in the X direction by a distance K1 relative to a lateral portion 33C1 of the image display panel 32C on the left side in the X direction. The distance K1 is a distance larger than a width of the detection electrode unit 39 along the X direction. In this case, the detection electrode unit 39A of the image display panel 32C is no longer adjacent to the drive electrode unit 38A of the image display panel 32F in the Y direction. Accordingly, even when the drive electrode unit 38A of the image display panel 32F is driven, the detection electrode unit 39A of the image display panel 32C does not generate the detection voltage $V_D$. Meanwhile, when the drive electrode unit 38A of the image display panel 32F is driven, the detection electrode units 39B, 39C, 39D, and 39E of the image display panel 32C generate the detection electrodes $V_D$. In a case where the detection electrode unit 39A does not generate the detection voltage $V_D$ at a timing when the drive electrode unit 38A of the image display panel 32F is driven, while the detection electrode units 39B, 39C, 39D, and 39E generate the detection electrodes $V_D$, the misalignment information creation unit 78 detects that the position of the image display panel 32C is displaced to the right side in the X direction as illustrated in FIG. 18A.

Figure 18B:
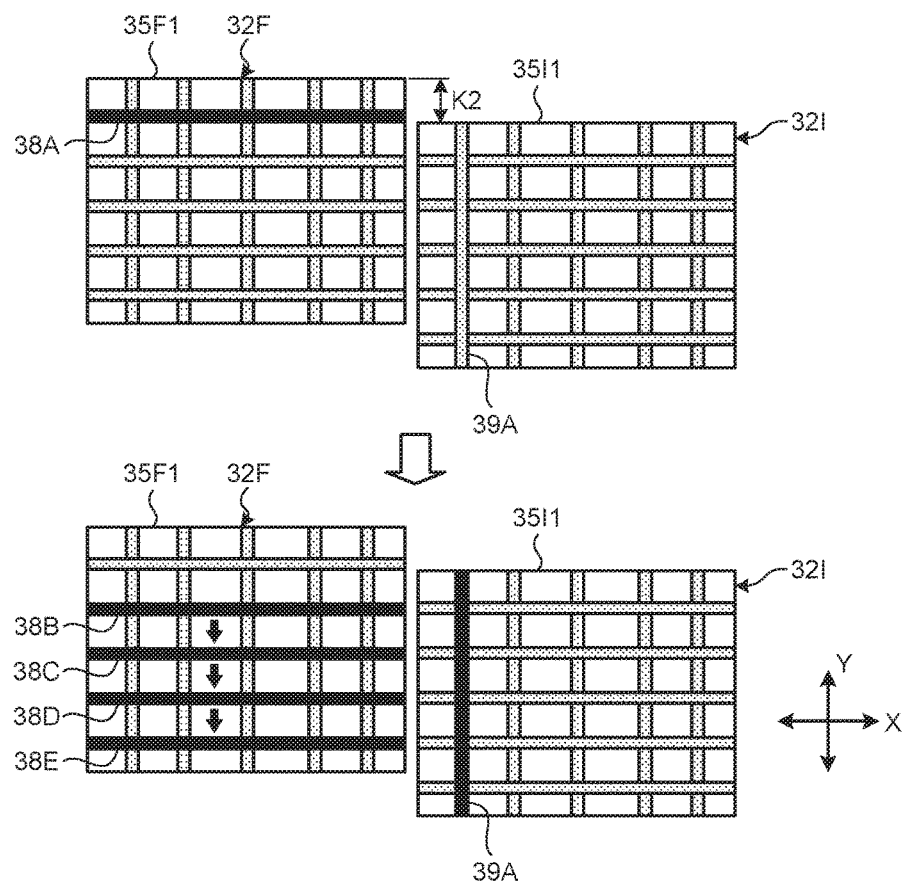
FIG. 18B is a diagram for explaining exemplary detection processing for the misalignment information.

In the example in FIG. 18B, a lateral portion 35F1 of the image display panel 32F is shifted to the upper side in the Y direction by a distance K2 from a lateral portion 35I1 of the image display panel 32I. The distance K2 is a distance larger than a width of the drive electrode unit 38 along the Y direction. In this case, the detection electrode unit 39A of the image display panel 32I is no longer adjacent to the drive electrode unit 38A of the image display panel 32F in the X direction. Accordingly, when the drive electrode unit 38A of the image display panel 32F is driven, the detection electrode unit 39A of the image display panel 32I does not generate the detection voltage $V_D$. However, when the drive electrode units 38B, 38C, 38D, and 38E of the image display panel 32F are driven, the detection electrode unit 39A of the image display panel 32I generates the detection voltage $V_D$. In a case where the detection electrode unit 39A does not generate the detection voltage $V_D$ during the driving of the drive electrode unit 38A of the image display panel 32F, while the detection electrode unit 39A generates the detection voltage $V_D$ during the driving of the drive electrode units 38B, 38C, 38D, and 38E of the image display panel 32F, the misalignment information creation unit 78 detects that the position of the image display panel 32I is displaced in the Y direction as illustrated in FIG. 18B.

Figure 18C:
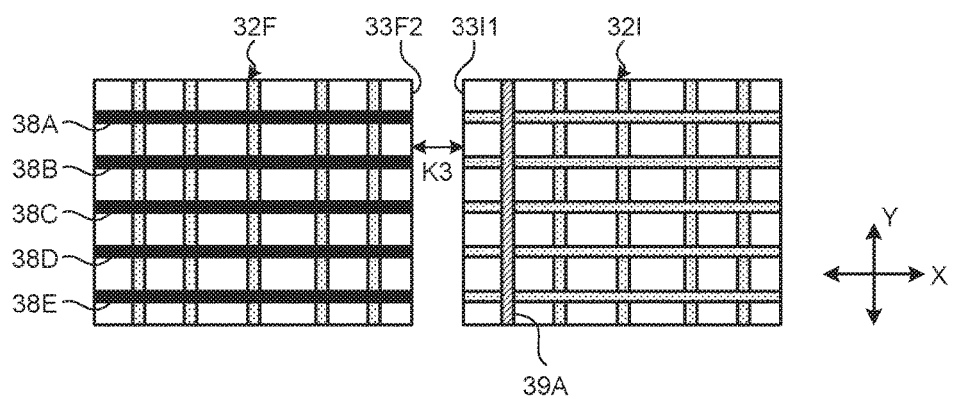
FIG. 18C is a diagram for explaining exemplary detection processing for the misalignment information.

In the example in FIG. 18C, a lateral portion 33F2 of the image display panel 32F on the right side in the X direction and a lateral portion 33I1 of the image display panel 32I on the left side in the X direction faces each other and at the same time, are located away from each other in the X direction with a distance K3 interposed therebetween. The distance K3 is a distance longer than a distance within which the detection electrode unit 39A of the image display panel 32I generates the detection voltage $V_D$ due to the driving of the drive electrode unit 38 of the image display panel 32F. In this case, the detection electrode unit 39A of the image display panel 32I generates the low detection voltage $V_L$ whose voltage value is smaller than that of the detection voltage $V_D$ when the drive electrode unit 38 of the image display panel 32F is driven. The misalignment information creation unit 78 determines in this case that the positions of the lateral portion of the image display panel 32F and the lateral portion of the image display panel 32I facing each other are misaligned.

Figure 18D:
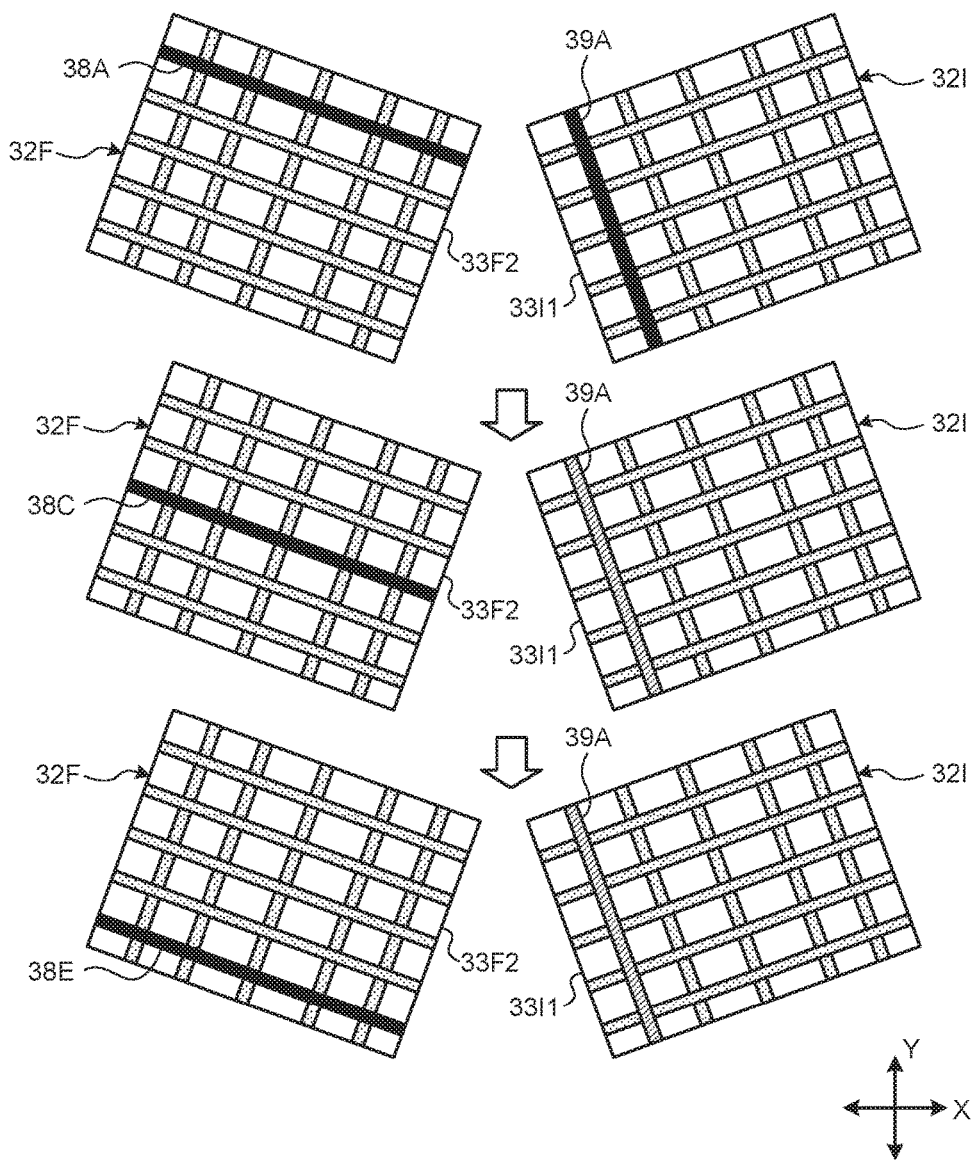
FIG. 18D is a diagram for explaining exemplary detection processing for the misalignment information.

The example in FIG. 18D illustrates a case where a distance between the lateral portion 33F2 of the image display panel 32F and the lateral portion 33I1 of the image display panel 32I varies along the Y direction (diagonally-arrayed state). In this case, distances along the X direction between the detection electrode unit 39A of the image display panel 32I and the respective drive electrode units 38 of the image display panel 32F vary along the Y direction. For example, a distance between the detection electrode unit 39A of the image display panel 32I and the drive electrode unit 38E of the image display panel 32F is larger than a distance between the detection electrode unit 39A of the image display panel 32I and the drive electrode unit 38A of the image display panel 32F. In the example in FIG. 18D, the voltage generated by the detection electrode unit 39A of the image display panel 32I when the drive electrode unit 38C of the image display panel 32F is driven is smaller than the voltage generated by the detection electrode unit 39A of the image display panel 32I when the drive electrode unit 38A of the image display panel 32F is driven. Meanwhile, the voltage generated by the detection electrode unit 39A of the image display panel 32I when the drive electrode unit 38E of the image display panel 32F is driven is smaller than the voltage generated by the detection electrode unit 39A of the image display panel 32I when the drive electrode unit 38C of the image display panel 32F is driven. The voltage value of the voltage generated by the detection electrode unit 39A of the image display panel 32I varies in this manner depending on the driving of the drive electrode units 38A, 38B, 38C, 38D, and 38E of the image display panel 32F. In this case, the misalignment information creation unit 78 determines that the adjacent image display panels 32 are diagonally arrayed and accordingly, the positions thereof are misaligned.

As described above, the misalignment information creation unit 78 detects the misalignment information based on the detection voltage information A1 and the adjacent information B. The controller 20 notifies an operator or the like of this misalignment information, whereby the operator can be informed of the adjacent image display panels 32 of which the positions are misaligned. The operator can correct the misalignment among the adjacent image display panels 32 based on this misalignment information.

As described thus far in the first embodiment, the display device unit 10 is configured in such a manner that the display surfaces of the plurality of image display panels 32 are orderly arranged on a flat surface and an image is displayed using the plurality of display surfaces as a single screen. Each of the image display panels 32 includes the drive electrode unit 38 to which the application voltage $V_A$ serving as a predetermined voltage is applied and the detection electrode unit 39 at which the detection voltage $V_D$ is generated in accordance with the application voltage $V_A$. Additionally, in the display device unit 10, the application voltage $V_A$ is applied solely to the drive electrode unit 38 included in the application image display panel. The application image display panel is a part of the image display panels 32. This display device unit 10 applies the application voltage $V_A$ solely to part of the image display panels 32. The detection voltage $V_D$ in accordance with this application voltage $V_A$ is then generated at the detection electrode 39. Because this detection voltage $V_D$ is in accordance with the application voltage $V_A$, the position of the application image display panel can be detected by detecting this detection voltage $V_D$. As a result, the array pattern of the image display panels 32 can be recognized with ease in this display device unit 10. Consequently, according to this display device unit 10, each of the image display panels 32 is caused to display a proper partial image corresponding to the position of that image display panel 32, whereby the entire image displayed by all of the image display panels 32 as a whole can be appropriately displayed.

The application image display panel applies the application voltage $V_A$ to the drive electrode unit 38 in order to confirm the array pattern. Specifically, when confirming the array pattern, this display device unit 10 does not apply the application voltage $V_D$ to other image display panels than the application image display panel, namely, part of the image display panels 32. In other words, this display device unit 10 does not apply the application voltage $V_A$ to all of the image display panels 32 at the same timing. Accordingly, only the detection electrode unit 39 corresponding to the part of the image display panels 32 to which the application voltage $V_A$ is applied generates the detection voltage $V_D$. The array pattern among the image display panels can be confirmed based on this detection voltage $V_D$ in this display device unit 10. As a result, according to the display device unit 10, the array pattern of the image display panels can be recognized with ease.

In the display device unit 10, the detection voltage $V_D$ in accordance with the application voltage $V_A$ is generated at the detection electrode unit 39 included in the standby image display panel. The standby image display panel is the image display panel 32 other than the application image display panel. Because the detection voltage $V_D$ is generated at the standby image display panel, namely, the image display panel 32 other than the application image display panel, this display device unit 10 can detect the array pattern between the application image display panel and the standby image display panel based on this detection voltage $V_D$. As a result, the display device unit 10 can recognize the array pattern of the image display panels with ease.

The detection voltage $V_D$ is generated at the standby image display panel by applying the application voltage $V_A$ to the application image display panel adjacent thereto. Because the detection voltage $V_D$ is generated at the standby image display panel adjacent to the application image display panel, this display device unit 10 can detect the standby image display panel adjacent to the application image display panel based on this detection voltage $V_D$. As a result, the display device unit 10 can recognize the array pattern of the image display panels with more ease.

The image display panel 32 includes the plurality of drive electrode units 38 and the detection electrode units 39. The application image display panel applies the application voltage $V_A$ to the plurality of drive electrode units 38 in sequence. This display device unit 10 applies the application voltage $V_A$ in sequence and thus can detect the image display panels 32 adjacent to one another more precisely.

In the standby image display panel, the detection voltage $V_D$ is generated at the detection electrode unit 39 arranged adjacent to the application image display panel. Because the detection voltage $V_D$ is generated at the detection electrode unit 39 arranged on a side adjacent to the application image display panel, this display device unit 10 can detect the image display panels 32 adjacent to each other more precisely.

The standby image display panel is configured to convert the detection voltage $V_D$ to a signal having an amplitude waveform different for each of the image display panels 32 to output. Because the detection voltage $V_D$ that has been converted to a signal (e.g., the detection voltage information A1) is different for each of the image display panels 32, it is made possible for this display device unit 10 to easily recognize from which image display panel 32 this detection voltage $V_D$ has been generated. As a result, this display device unit 10 can detect the image display panels 32 adjacent to one another with more ease.

In the detection electrode unit 39, a capacitance of its own varies depending on an object in the proximity to the image display panel 32. Accordingly, the detection electrode unit 39 has a touch detection function and a detection function for the array pattern. As a result, this display device unit 10 can suppress an increase in size of a circuit of the image display panel 32.

The display device unit 10 further includes the controller 20 that controls the image display panel 32. The controller 20 detects the array pattern among the plurality of image display panels 32 based on the detection voltage $V_D$. This display device unit 10 uses the controller 20 to detect the array pattern among the image display panels 32 and thus can properly recognize the array pattern of the image display panels.

The controller 20 detects a positional relationship between the application image display panel and the standby image display panel that has generated the detection voltage $V_D$. The controller 20 then detects the array pattern based on that positional relationship. This controller 20 detects the positional relationship between the application image display panel and the standby image display panel in which the detection voltage $V_D$ has been generated and thus can properly recognize the array pattern of the image display panels.

The controller 20 determines the application image display panel and the standby image display panel in which the detection voltage $V_D$ has been generated as the image display panels 32 adjacent to each other. The controller 20 determines the positional relationship between the application image display panel and the standby image display panel in which the detection voltage $V_D$ has been generated as an adjacency relationship with each other (adjacent information B). As a result, this controller 20 can properly recognize the array pattern of the image display panels.

The controller 20 sequentially switches the application image display panel to another image display panel 32 to detect the array pattern. This controller 20 sequentially switches the application image display panel to another image display panel 32 and thus can sequentially detect the positions of the respective image display panels 32. As a result, this controller 20 can properly recognize the array pattern of the image display panels.

The controller 20 detects the misalignment among the adjacent image display panels 32 based on the detection voltage $V_D$. As a result, the operator can correct the misalignment between the adjacent image display panels 32 based on this detection result of the misalignment.

The image display panel 32 (display device) according to the embodiment includes the drive electrode unit 38 to which the application voltage $V_A$ is applied, the detection electrode unit 39 at which the detection voltage $V_D$ is generated in accordance with the application voltage $V_A$, and the panel controller 36 that controls the operation of the drive electrode unit 38 and the detection electrode unit 39. While applying the application voltage $V_A$ to the drive electrode unit 38 (in the case of the application image display panel), the panel controller 36 puts the detection electrode unit 39 into a state in which the detection voltage $V_D$ is not generated (baseline drive mode). While not applying the application voltage $V_A$ to the drive electrode unit 38 (in the case of the image display panel other than the application image display panel), the panel controller 36 puts the detection electrode unit 39 into a state in which the detection voltage $V_D$ can be generated (standby state). When this image display panel 32 is applied to the tiling display, the array pattern of the image display panels 32 can be recognized with ease by detecting the detection voltage $V_D$ generated at the detection electrode unit 39.

The display device unit 10 according to the embodiment can obtain functional effects other than the effects described thus far.

Second Embodiment

Next, a second embodiment will be described. A display device unit 10 according to the second embodiment is different from the display device unit 10 according to the first embodiment in that all of image display panels 32 are not selected as the application image display panel. In the display device unit 10 according to the second embodiment, description of portions of configuration common to those of the first embodiment will be omitted.

Figure 19:
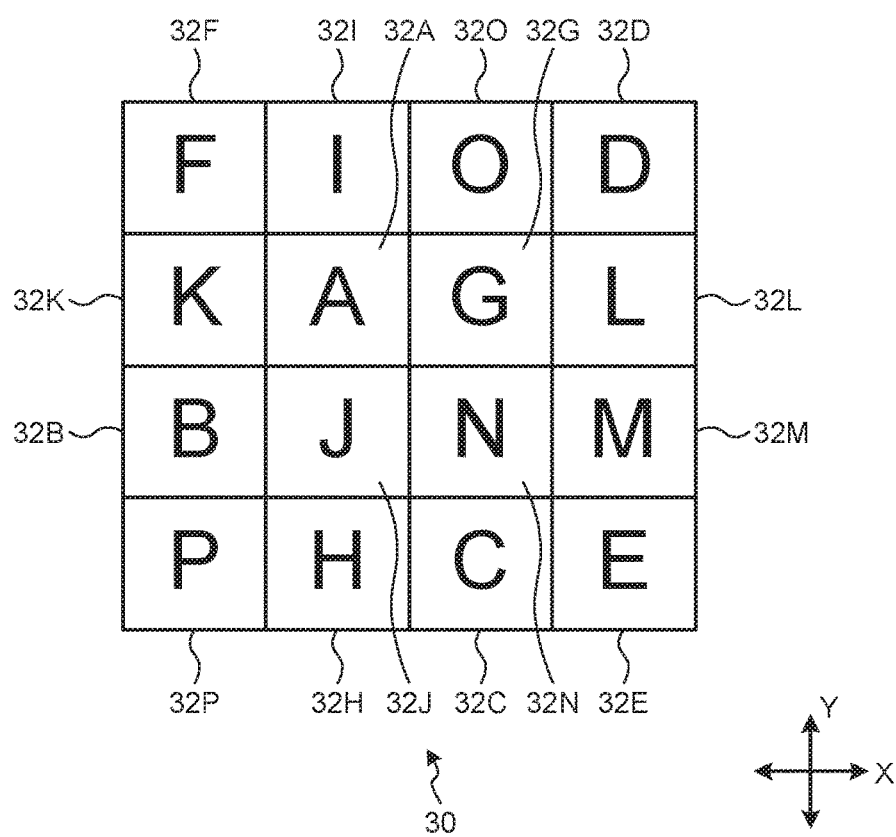
FIG. 19 is a schematic diagram illustrating a configuration of an image display panel unit according to a second embodiment.

FIG. 19 is a schematic diagram illustrating a configuration of an image display panel unit according to the second embodiment. In the image display panel unit 30 according to the second embodiment as illustrated in FIG. 19, unlike the first embodiment, the image display panels 32 are arrayed in four rows and four columns, specifically, four columns along the X direction and four rows along the Y direction. In the second embodiment, specifically, an image display panel 32A is arranged at second row and second column. An image display panel 32B is arranged at third row and first column. An image display panel 32C is arranged at fourth row and third column. An image display panel 32D is arranged at first row and fourth column. An image display panel 32E is arranged at fourth row and fourth column. An image display panel 32F is arranged at first row and first column. An image display panel 32G is arranged at second row and third column. An image display panel 32H is arranged at fourth row and second column. An image display panel 32I is arranged at first row and second column. An image display panel 32J is arranged at third row and second column. An image display panel 32K is arranged at second row and first column. An image display panel 32L is arranged at second row and fourth column. An image display panel 32M is arranged at third row and fourth column. An image display panel 32N is arranged at third row and third column. An image display panel 32O is arranged at first row and third column. An image display panel 32P is arranged at fourth row and first column. However, this array order and the number of arrays have been set for convenience of description and thus are arbitrary.

In the second embodiment, in a case where the same image display panel has been determined as the adjacent image display panel repeatedly based on the plurality of sets of adjacent information B, a controller 20 combines these sets of repeated adjacent information B to create array information C. The controller 20 according to the second embodiment combines the repeated adjacent information B to make the total number of the image display panels 32 to be selected as the application image display panel smaller than the number of all of the image display panels 32. Hereinafter, a method for creating this array information C according to the second embodiment will be specifically described.

Figure 20:
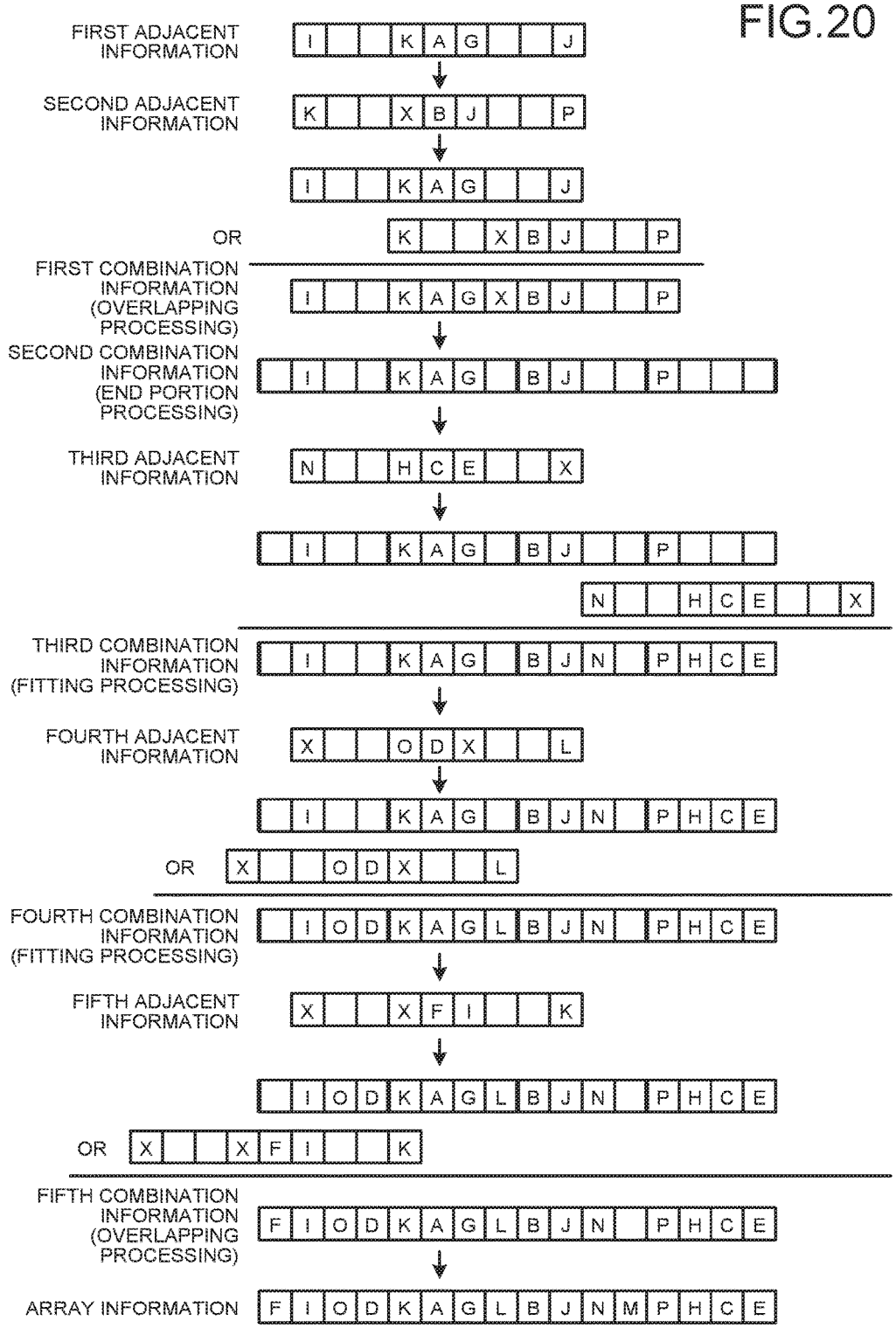
FIG. 20 is an explanatory diagram for explaining an exemplary method for creating array information according to the second embodiment.

FIG. 20 is an explanatory diagram for explaining an exemplary method for creating the array information according to the second embodiment. As illustrated in FIG. 20, the controller 20 first selects the image display panel 32A as the application image display panel and then uses an adjacent information creation unit 74 to create the adjacent information B (first adjacent information B1 in FIG. 20) in which the image display panel 32A is set as the application image display panel.

As described above, the adjacent information B is configured to indicate the image display panel 32 adjacent to the application image display panel in the X direction or the Y direction. In the following description, the adjacent information B will be converted to one-dimensional information constituted by one row alone from two-dimensional information including row and column Specifically, the image display panel adjacent to the image display panel 32A on the upper side in the Y direction is the image display panel 32I. The image display panel adjacent thereto on the left side in the X direction is the image display panel 32K. The image display panel adjacent thereto on the right side in the X direction is the image display panel 32G. The image display panel adjacent thereto on the lower side in the Y direction is the image display panel 32J. When the adjacent information B is converted to the one-dimensional information constituted by one row alone, it can be considered that the image display panel 32I is present four positions ahead of the image display panel 32A (at a fourth position toward the left side). Likewise, it can be considered that the image display panel 32K is present one position ahead of the image display panel 32A (at a first position toward the left side). It can be considered that the image display panel 32G is present one position behind the image display panel 32A (at a first position toward the right side). It can be considered that the image display panel 32J is present four positions behind the image display panel 32A (at a fourth position toward the right side).

After creating the first adjacent information B1, in the controller 20, the adjacent information creation unit 74 creates second adjacent information B2 in which the image display panel 32B is set as the application image display panel. As illustrated in the second adjacent information B2, the image display panel 32K is present four positions ahead of the image display panel 32B, the image display panel 32J is present one position behind the image display panel 32B, and the image display panel 32P is present four positions behind the image display panel 32B. There is no image display panel 32 on the left side of the image display panel 32B in the X direction and accordingly, the image display panel 32 on the left side of the image display panel 32B in the X direction is not detected. In this case, the adjacent information creation unit 74 adds, to the second adjacent information B2, information indicating that the image display panel 32B is located at an end portion on the left side in the X direction (first column). In the description in FIG. 20, X is noted one position ahead of the image display panel 32B for convenience.

The image display panels 32 (the image display panels 32K and 32J) are detected as being adjacent repeatedly in the first adjacent information B1 and the second adjacent information B2. Accordingly, in the controller 20, an array information creation unit 76 carries out combination processing for combining the first adjacent information B1 with the second adjacent information B2, thereby creating combination information Y (first combination information Y1 in FIG. 20). Specifically, the array information creation unit 76 creates the first combination information Y1 illustrated in FIG. 20 by taking the logical disjunction (OR) between the first adjacent information B1 and the second adjacent information B2, and carrying out the combination processing for combining information regarding the image display panels 32 adjacent to the image display panels 32 which were detected repeatedly.

The second adjacent information B2 contains the information indicating that the image display panel 32B is located at the end portion on the left side in the X direction (first column). Based on this information, the array information creation unit 76 carries out end portion processing for calculating which of the image display panels 32 is located at the first column to create second combination information Y2 illustrated in FIG. 20. In the example in FIG. 20, in addition to the image display panel 32B, the image display panel 32K four positions behind the image display panel 32B and the image display panel 32P eight positions behind the image display panel 32B are calculated as being located at the first column. The left sides of frames of the image display panels 32 at the first column are expressed as bold lines in the example in FIG. 20. The end portion processing is not limited to the processing for the first column and may be processing for detecting the fourth column.

Thereafter, in the controller 20, the adjacent information creation unit 74 creates third adjacent information B3 in which the image display panel 32C is set as the application image display panel. As illustrated in the third adjacent information B3, the image display panel 32N is present four positions ahead of the image display panel 32C, the image display panel 32H is present one position ahead of the image display panel 32C, and the image display panel 32E is present one position behind the image display panel 32C. There is no image display panel 32 on the lower side of the image display panel 32C in the Y direction and accordingly, X is noted four positions behind the image display panel 32C in FIG. 20.

The image display panel 32 is not detected as being adjacent repeatedly between the second combination information Y2 and the third adjacent information B3. However, the third adjacent information B3 contains three successive image display panels 32 (the image display panels 32H, 32C, and 32E). Additionally, in the second combination information Y2, successive three sections for which the image display panels 32 have not been detected (blank sections) are solely three positions behind the image display panel 32P. Accordingly, the array information creation unit 76 deems that the successive image display panels 32H, 32C, and 32E in the third adjacent information B3 are the adjacent image display panels behind the image display panel 32P and thus carries out fitting processing for combining these items of the information to create third combination information Y3.

Subsequently, the controller 20 uses the adjacent information creation unit 74 to create fourth adjacent information B4 in which the image display panel 32D is set as the application image display panel. As illustrated in the fourth adjacent information B4, the image display panel 32O is present one position ahead of the image display panel 32D, and the image display panel 32L is present four positions behind the image display panel 32B. The image display panel 32D does not have the image display panel 32 adjacent thereto on the right side in the X direction or on the upper side in the Y direction. Accordingly, Xs are noted four positions ahead of the image display panel 32D and one position behind the image display panel 32D.

Combination processing cannot be carried out between the third combination information Y3 and the fourth adjacent information B4 but the fitting processing can be carried out therebetween. Specifically, the array information creation unit 76 deems that two successive image display panels 32 (the image display panels 32O and 32D) in the fourth adjacent information B4 are the adjacent image display panels behind the image display panel 32I in the third combination information Y3 and thus carries out the fitting processing for combining these items of the information to create fourth combination information Y4.

Subsequently, the controller 20 uses the adjacent information creation unit 74 to create fifth adjacent information B5 in which the image display panel 32F is set as the application image display panel. Because the adjacent information creation unit 74 has already detected information regarding the image display panel 32 adjacent to the image display panel 32E, the image display panel 32F is set as the application image display panel. As illustrated in the fifth adjacent information B5, the image display panel 32I is present one position behind the image display panel 32F, and the image display panel 32K is present four positions behind the image display panel 32F. The image display panel 32F does not have the image display panel 32 adjacent thereto on the left side in the X direction or on the upper side in the Y direction. Accordingly, Xs are noted four positions ahead of the image display panel 32D and one position ahead of the image display panel 32D.

The image display panels 32 (the image display panels 32I and 32K) are detected as being adjacent repeatedly between the fifth adjacent information B5 and the fourth combination information Y4. The array information creation unit 76 carries out the combination processing between the fifth adjacent information B5 and the fourth combination information Y4 to create fifth combination information Y5.

As illustrated in FIG. 20, the fifth combination information Y5 contains only one blank section, that is, a section for which the adjacent image display panel 32 has not been detected yet. Meanwhile, the image display panel 32 that has not been listed in the fifth combination information Y5 is the image display panel 32M. Accordingly, the array information creation unit 76 substitutes the image display panel 32M for the section for which the adjacent image display panel 32 has not been detected yet in the fifth combination information Y5 to create the array information C.

Figure 21:
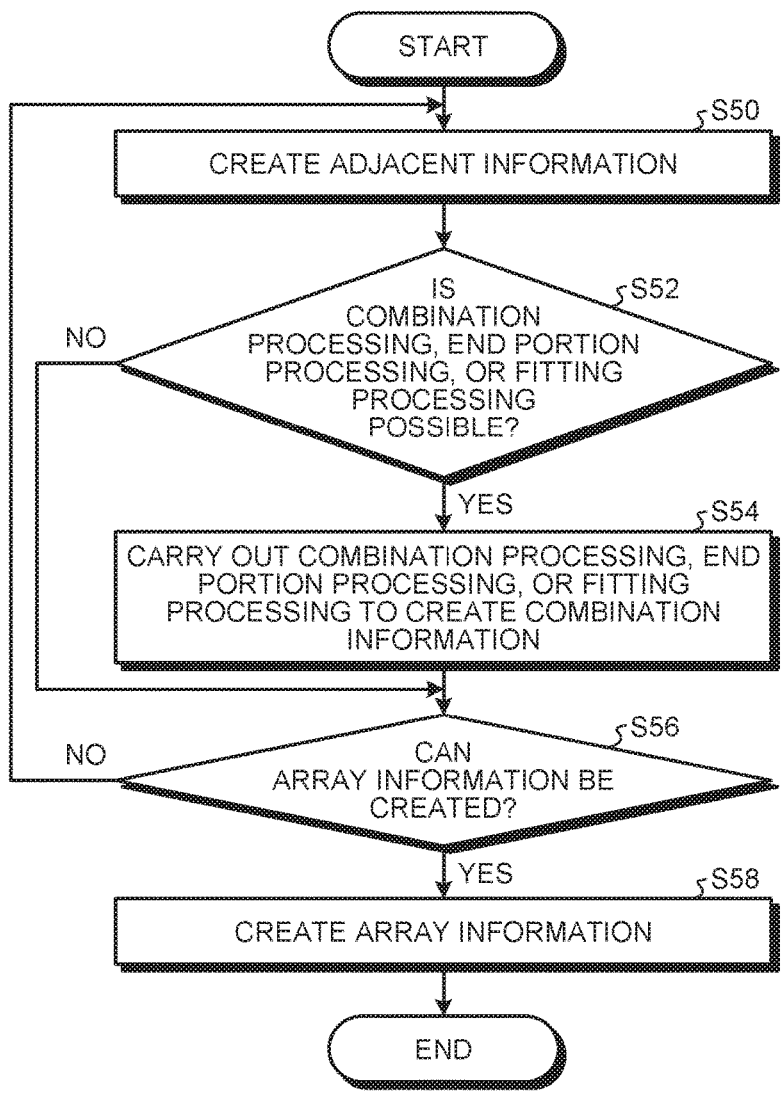
FIG. 21 is a flowchart illustrating a processing flow of the method for creating the array information according to the second embodiment.

As described above, the controller 20 according to the second embodiment carries out the combination processing, the end portion processing, and the fitting processing to create the array information C. In this case, the total number of the image display panels 32 selected as the application image display panel (five) is smaller than the number of all of the image display panels 32 (16). As a result, the controller 20 according to the second embodiment can create the array information C without selecting all of the image display panels 32 as the application image display panel. Hereinafter, a processing flow therefor will be described with reference to a flowchart. FIG. 21 is a flowchart illustrating a processing flow of the creation processing for the array information according to the second embodiment.

As illustrated in FIG. 21, in the controller 20, the adjacent information creation unit 74 creates the adjacent information B (step S50). After creating the adjacent information B, in the controller 20, the array information creation unit 76 determines whether the combination processing, the end portion processing, or the fitting processing can be carried out based on the adjacent information B (step S52). When the combination processing, the end portion processing, or the fitting processing can be carried out (step S52: Yes), in the controller 20, the array information creation unit 76 carries out the combination processing, the end portion processing, or the fitting processing, thereby creating combination information Y (step S54). After creating the combination information Y, the controller 20 determines whether the array information C can be created based on the combination information Y (step S56). When the combination processing, the end portion processing, or the fitting processing cannot be carried out (step S52: No), the controller 20 also proceeds to step S56 to determine whether the array information C can be created based on the combination information Y. When the array information C cannot be created (step S56: No), the controller 20 returns to step S50 to create the adjacent information B in which another image display panel 32 is set as the application image display panel. When the array information C can be created (step S56: Yes), the controller 20 uses the array information creation unit 76 to create the array information C (step S58) and then terminates the selection of the application image display panel. In other words, the controller 20 cancels the selection of the next application image display panel once the array information C has been created.

As described above, in a case where the same image display panel 32 is determined as being adjacent repeatedly, the controller 20 according to the second embodiment combines information regarding the image display panel adjacent to the overlapping same image display panel 32 to detect the array pattern (create the array information C). The controller 20 cancels the selection of the next application image display panel at a time point when the detection of the adjacent image display panels 32 has been completed for all of the image display panels 32. With this, the controller 20 makes the total number of the image display panels to be selected as the application image display panel smaller than the total number of all of the image display panels. This controller 20 makes the total number of the image display panels 32 to be selected as the application image display panel smaller than the total number of all of the image display panels 32. As a result, the controller 20 according to the second embodiment is not necessarily required to select all of the image display panels 32 as the application image display panel, whereby a load necessary for the detection processing can be suppressed. Although all of the combination processing, the end portion processing, and the fitting processing have been carried out in the above description, at least the combination processing needs to be carried out.

Third Embodiment

Next, a third embodiment will be described. An image display panel 32a according to the third embodiment is different from the image display panel 32 according to the first embodiment in that the image display panel 32a is a self-capacitance sensing type touch panel in which a drive electrode unit 38 and a detection electrode unit 39 serve as a common single electrode. In the third embodiment, description of portions of configuration common to those of the first embodiment will be omitted.

Figure 22:
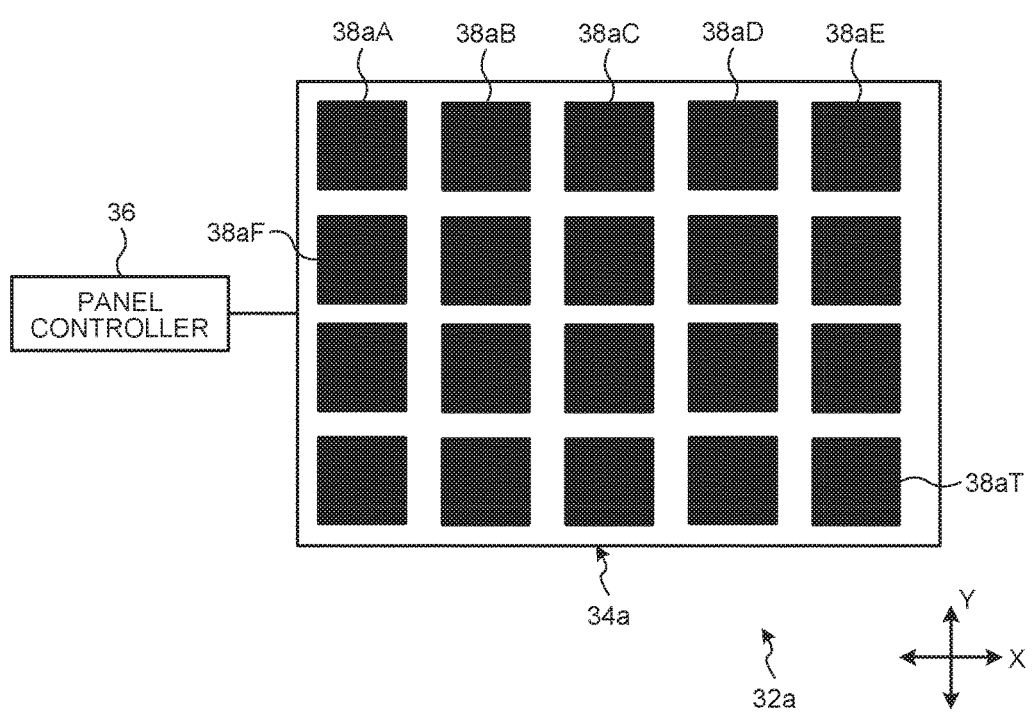
FIG. 22 is an explanatory diagram for explaining a configuration of an image display panel according to a third embodiment.

FIG. 22 is an explanatory diagram for explaining a configuration of the image display panel according to the third embodiment. As illustrated in FIG. 22, a panel unit 34a of the image display panel 32a according to the third embodiment includes drive detection electrode units 38aA, 38aB, 38aC, 38aD, 38aE, . . . and 38aT. Hereinafter, the drive detection electrode units 38aA, 38aB, 38aC, 38aD, 38aE, . . . and 38aT are noted as the drive detection electrode units 38a when these drive detection electrode units are not distinguished from one another.

The drive detection electrode units 38a, each of which is a plate-shaped electrode, are arrayed within the panel unit 34a in four rows and five columns, specifically, five columns along the X direction and four rows along the Y direction. However, the number of the drive detection electrode units 38a and the array order thereof are arbitrary.

Figure 23A:
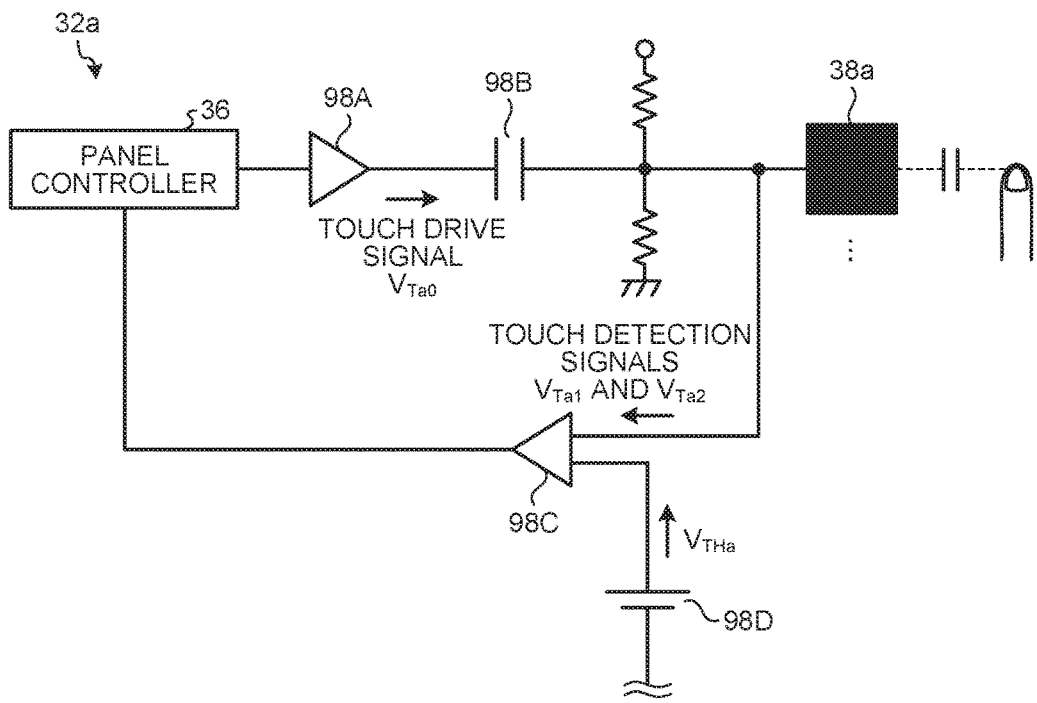
FIG. 23A is a schematic circuit diagram of a drive detection electrode unit according to the third embodiment.

The drive detection electrode unit 38a has a function as the drive electrode unit 38 and a function as the detection electrode unit 39 in the touch detection. Specifically, the image display panel 32a according to the third embodiment is a capacitance type touch panel, in more detail, a self-capacitance sensing type touch panel in which the drive detection electrode unit 38a senses a change in a self-capacitance. FIG. 23A is a schematic circuit diagram of the drive detection electrode unit according to the third embodiment. In the image display panel 32a, as illustrated in FIG. 23A, a panel controller 36, a buffer unit 98A, a capacitor unit 98B, the drive detection electrode unit 38a, a comparator 98C, and a power supply unit 98D are electrically connected. Specifically, the panel controller 36 is electrically connected to one electrode of the capacitor unit 98B through the buffer 98A. Another electrode of the capacitor unit 98B is connected to the drive detection electrode unit 38a and one input unit of the comparator 98C. The drive detection electrode unit 38a is connected to the another electrode of the capacitor unit 98B in parallel to the comparator 98C. Although illustration is omitted in FIG. 23A, each of the plurality of drive detection electrode units 38a is connected to the another electrode of the capacitor unit 98B in parallel to one another.

The panel controller 36 applies a touch drive signal $V_{Ta0}$ to the one electrode of the capacitor unit 98B when the touch detection is carried out. A power supply is additionally connected to the another electrode of the capacitor unit 98. Accordingly, a touch detection signal corresponding to the touch drive signal $V_{Ta0}$ output to the one electrode of the capacitor unit 98B is output to the one input unit of the comparator 98C. Specifically, when the proximity object is not in the proximity to the image display panel 32a, a touch detection signal $V_{Ta1}$ having a voltage amplitude substantially equivalent to that of the touch drive signal $V_{Ta0}$ is input to the one input unit of the comparator 98C. On the other hand, when the proximity object is in the proximity to the image display panel 32a, the drive detection electrode unit 38a and that proximity object form a capacitance. Accordingly, a touch detection signal $V_{Ta2}$ having a voltage amplitude smaller than that of the touch drive signal $V_{Ta0}$ is input to the one input unit of the comparator 98C.

The power supply unit 98D is connected to another input unit of the comparator 98C. The power supply unit 98D outputs a touch voltage threshold signal $V_{THa}$ to the another input unit of the comparator 98C. The comparator 98C compares voltage values of the touch detection signal input to the one input unit and the touch voltage threshold signal $V_{THa}$. The comparator 98C then outputs a signal containing information regarding a comparison result to the panel controller 36. The panel controller 36 determines whether the proximity object is in the proximity to the image display panel 32a based on this signal from the comparator 98C.

Figure 23B:
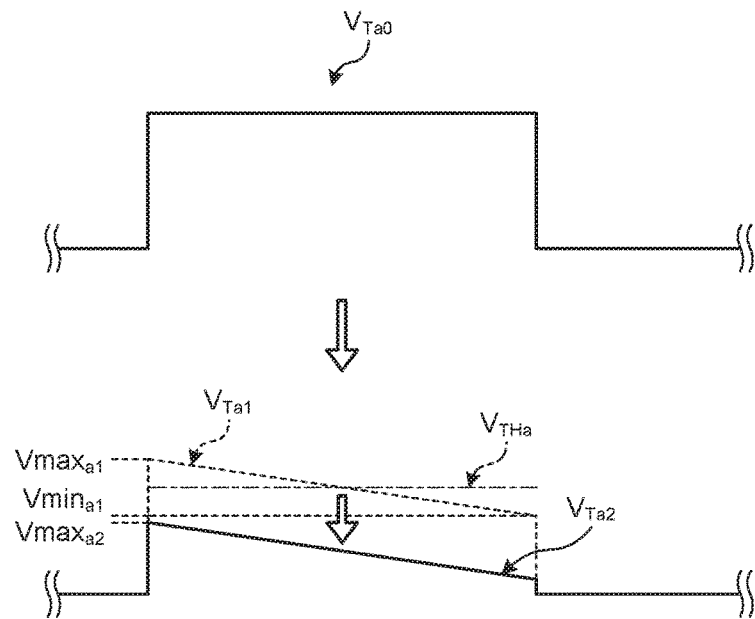
FIG. 23B is an explanatory diagram for explaining touch detection according to the third embodiment.

FIG. 23B is an explanatory diagram for explaining the touch detection according to the third embodiment. When the touch detection is carried out, the panel controller 36 applies, to the one electrode of the capacitor unit 98B, the touch drive signal $V_{Ta0}$, namely, an alternating current signal at a predetermined frequency as illustrated in FIG. 23B.

When the proximity object is not in the proximity to the image display panel 32a, the touch detection signal $V_{Ta1}$ is input to the one input unit of the comparator 98C. As illustrated in FIG. 23B, the touch detection signal $V_{Ta1}$ is a voltage signal having a maximum voltage value $Vmax_{a1}$ and a frequency substantially the same as those of the touch drive signal $V_{Ta0}$, but the voltage value thereof gradually decreases from the maximum voltage value $Vmax_{a1}$ to a minimum voltage value $Vmin_{a1}$. The touch voltage threshold signal $V_{THa}$ is input to the another input unit of the comparator 98C. The touch voltage threshold signal $V_{THa}$ is a signal having a constant voltage value. The voltage value of the touch voltage threshold signal $V_{THa}$ is set to a value between the maximum voltage value $Vmax_{a1}$ and the minimum voltage value $Vmin_{a1}$ of the touch detection signal $V_{Ta1}$.

On the other hand, when the proximity object is in the proximity to the image display panel 32a, the touch detection signal $V_{Ta2}$ having a voltage value smaller than that of the touch detection signal $V_{Ta1}$ is input to the one input unit of the comparator 98C. The voltage value of the touch voltage threshold signal $V_{THa}$ is set so as to be larger than a maximum voltage value $Vmax_{a2}$ of the touch detection signal $V_{Ta2}$. When the voltage value of the touch voltage threshold signal $V_{THa}$ is between the maximum voltage value $Vmax_{a1}$ and the minimum voltage value $Vmin_{a1}$, the comparator 98C outputs, to the panel controller 36, a signal containing information indicating that the proximity object is not in the proximity to the image display panel 32a. When the voltage value of the touch voltage threshold signal $V_{THa}$ is larger than the maximum voltage value $Vmax_{a2}$, the comparator 98C outputs, to the panel controller 36, a signal containing information indicating that the proximity object is in the proximity to the image display panel 32a. The image display panel 32a carries out the touch detection in this manner. However, the image display panel 32a is not limited to the configuration described above as long as the image display panel 32a is a self-capacitance sensing type touch panel that senses a change in the self-capacitance of the drive detection electrode unit 38a.

An application voltage $V_A$ is applied to the drive detection electrode unit 38a at respective timings when the array pattern is confirmed. A detection voltage $V_D$ is generated at the drive detection electrode unit 38a in accordance with the application voltage $V_A$ at another image display panel 32. In other words, the drive detection electrode unit 38a is configured to have both of the function of the drive electrode unit 38 and the function of the detection electrode unit 39 according to the first embodiment.

Figure 24:
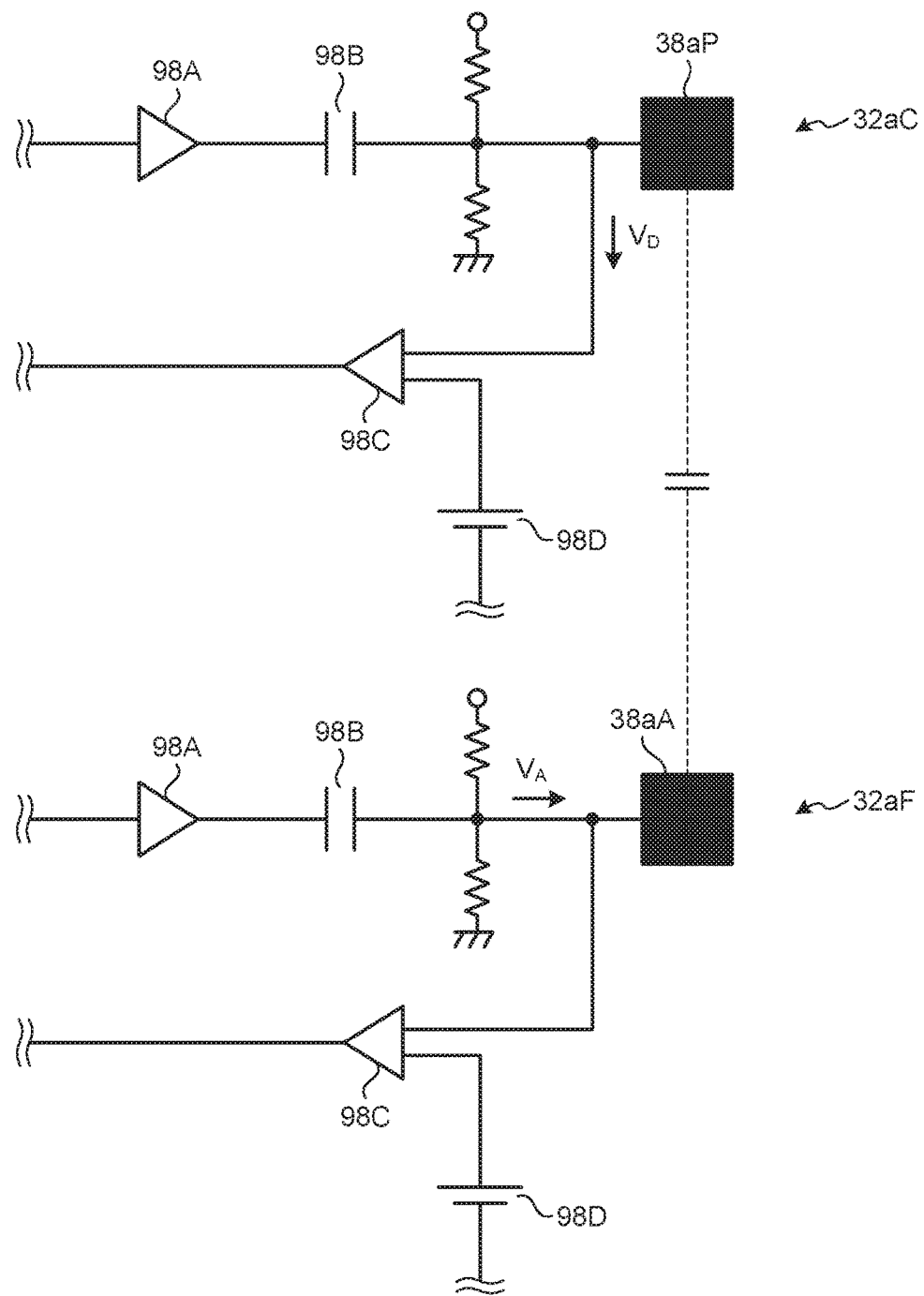
FIG. 24 is an explanatory diagram for explaining the generation of the detection voltage according to the third embodiment.

FIG. 24 is an explanatory diagram for explaining the generation of the detection voltage according to the third embodiment. FIG. 24 illustrates an exemplary case where the application voltage $V_A$ is applied to the drive detection electrode unit 38aA of an image display panel 32aF serving as the application image display panel. In the example in FIG. 24, an image display panel 32aC is adjacent to the image display panel 32aF. In more detail, the drive electrode detection unit 38aP of the image display panel 32aC is adjacent to the drive detection electrode unit 38aA of the image display panel 32aF. As illustrated in FIG. 24, the drive detection electrode unit 38aA of the image display panel 32aF and the drive electrode detection unit 38aP of the image display panel 32aC form a capacitor as a pair of electrodes. Accordingly, when the application voltage $V_A$ is applied to the drive detection electrode unit 38aA of the image display panel 32aF, the detection voltage $V_D$ is generated at the drive electrode detection unit 38aP of the image display panel 32aC adjacent thereto. In the third embodiment, in accordance with such a principle, the detection voltage $V_D$ is generated at the drive electrode detection unit 38a adjacent to the drive electrode detection unit 38a to which the application voltage $V_A$ is applied.

Hereinafter, the generation of the detection voltage $V_D$ when the application voltage $V_A$ is sequentially applied to the drive detection electrode units 38a of the image display panel 32aF serving as the application image display panel in the third embodiment will be described.

FIG. 25A to FIG. 25D are explanatory diagrams for explaining the generation of the detection voltage when the application voltage is applied in the third embodiment. The application image display panel according to the third embodiment applies the application voltage $V_A$ to the drive detection electrode units 38a on the periphery. Specifically, the application image display panel according to the third embodiment (image display panel 32aF) applies the application voltage $V_A$ to the drive detection electrode units 38aA, 38aB, 38aC, 38aD, 38aE, 38aJ, 38aO, 38aT, 38aS, 38aR, 38aQ, 38aP, 38aK, and 38aF in this order. However, the order is not limited thereto.

FIG. 25A illustrates a case where the application voltage $V_A$ is applied to the drive detection electrode units 38aA, 38aB, 38aC, and 38aD of the image display panel 32aF in this order. When the application voltage $V_A$ is applied to the drive detection electrode unit 38aA of the image display panel 32aF, as indicated by a dashed line area 95A in FIG. 25A, the detection voltages $V_D$ are generated at the drive detection electrode unit 38aP of the image display panel 32aC and the drive detection electrode unit 38aE of an image display panel 32aA. When the application voltage $V_A$ is applied to the drive detection electrode unit 38aB of the image display panel 32aF, as indicated by a dashed line area 95B, the detection voltage $V_D$ is generated at the drive detection electrode unit 38aQ of the image display panel 32aC. When the application voltage $V_A$ is applied to the drive detection electrode unit 38aC of the image display panel 32aF, as indicated by a dashed line area 95C, the detection voltage $V_D$ is generated at the drive detection electrode unit 38aR of the image display panel 32aC. When the application voltage $V_A$ is applied to the drive detection electrode unit 38aD of the image display panel 32aF, as indicated by a dashed line area 95D, the detection voltage $V_D$ is generated at the drive detection electrode unit 38aS of the image display panel 32aC.

FIG. 25B illustrates a case where the application voltage $V_A$ is applied to the drive detection electrode units 38aE, 38aJ, and 38aO of the image display panel 32aF in this order. When the application voltage $V_A$ is applied to the drive detection electrode unit 38aE of the image display panel 32aF, as indicated by a dashed line area 95E in FIG. 25B, the detection voltages $V_D$ are generated at the drive detection electrode unit 38aA of the image display panel 32aI and the drive detection electrode unit 38aT of the image display panel 32aC. When the application voltage $V_A$ is applied to the drive detection electrode unit 38aJ of the image display panel 32aF, as indicated by a dashed line area 95J, the detection voltage $V_D$ is generated at the drive detection electrode unit 38aF of the image display panel 32aI. When the application voltage $V_A$ is applied to the drive detection electrode unit 38aO of the image display panel 32aF, as indicated by a dashed line area 95O, the detection voltage $V_D$ is generated at the drive detection electrode unit 38aK of the image display panel 32aI.

FIG. 25C illustrates a case where the application voltage $V_A$ is applied to the drive detection electrode units 38aT, 38aS, 38aR, and 38aQ of the image display panel 32aF in this order. When the application voltage $V_A$ is applied to the drive detection electrode unit 38aT of the image display panel 32aF, as indicated by a dashed line area 95T in FIG. 25C, the detection voltages $V_D$ are generated at the drive detection electrode unit 38aE of an image display panel 32aB and the drive detection electrode unit 38aP of the image display panel 32aI. When the application voltage $V_A$ is applied to the drive detection electrode unit 38aS of the image display panel 32aF, as indicated by a dashed line area 95S, the detection voltage $V_D$ is generated at the drive detection electrode unit 38aD of the image display panel 32aB. When the application voltage $V_A$ is applied to the drive detection electrode unit 38aR of the image display panel 32aF, as indicated by a dashed line area 95R, the detection voltage $V_D$ is generated at the drive detection electrode unit 38aC of the image display panel 32aB. When the application voltage $V_A$ is applied to the drive detection electrode unit 38aQ of the image display panel 32aF, as indicated by a dashed line area 95Q, the detection voltage $V_D$ is generated at the drive detection electrode unit 38aB of the image display panel 32aB.

FIG. 25D illustrates a case where the application voltage $V_A$ is applied to the drive detection electrode units 38aP, 38aK, and 38aF of the image display panel 32aF in this order. When the application voltage $V_A$ is applied to the drive detection electrode unit 38aP of the image display panel 32aF, as indicated by a dashed line area 95P in FIG. 25D, the detection voltages $V_D$ are generated at the drive detection electrode unit 38aT of the image display panel 32aA and the drive detection electrode unit 38aA of the image display panel 32aB. When the application voltage $V_A$ is applied to the drive detection electrode unit 38aK of the image display panel 32aF, as indicated by a dashed line area 95K, the detection voltage $V_D$ is generated at the drive detection electrode unit 38aO of the image display panel 32aA. When the application voltage $V_A$ is applied to the drive detection electrode unit 38aF of the image display panel 32aF, as indicated by a dashed line area 95F, the detection voltage $V_D$ is generated at the drive detection electrode unit 38aJ of the image display panel 32aA.

In the third embodiment, as described above in FIG. 25A to FIG. 25D, the detection voltage $V_D$ is generated at the drive detection electrode unit 38a included in the standby image display panel adjacent to the application image display panel in the X direction or the Y direction as long as that drive detection electrode unit 38a is positioned on the application image display panel side. In other words, the detection voltage $V_D$ is generated at the drive detection electrode unit 38a adjacent to, in the X direction or the Y direction, the drive detection electrode unit 38a to which the application voltage $V_A$ is applied. Accordingly, a controller 20 according to the third embodiment can create adjacent information B based on detection voltage information A1 as in the first embodiment.

Specifically, when applying the application voltage $V_A$ to the drive detection electrode units 38aA, 38aB, 38aC, and 38aD (the drive detection electrode units 38a on the upper side in the Y direction) of the image display panel 32aF in this order, as illustrated in FIG. 25A, the detection voltages $V_D$ have been generated at the drive detection electrode units 38aP, 38aQ, 38aR, and 38aS in the image display panel 32aC (the drive detection electrode units 38a on the lower side in the Y direction). The controller 20 according to the third embodiment recognizes the image display panel 32aC as being adjacent to the image display panel 32aF on the upper side in the Y direction.

When applying the application voltage $V_A$ to the drive detection electrode units 38aE, 38aJ, and 38aO (the drive detection electrode units 38a on the right side in the X direction) of the image display panel 32aF in this order, as illustrated in FIG. 25B, the detection voltages $V_D$ have been generated at the drive detection electrode units 38aA, 38aF, and 38aK in the image display panel 32aI (the drive detection electrode units 38a on the left side in the X direction). The controller 20 according to the third embodiment recognizes the image display panel 32aI as being adjacent to the image display panel 32aF on the right side in the X direction.

When applying the application voltage $V_A$ to the drive detection electrode units 38aT, 38aS, 38aR, and 38aQ (the drive detection electrode units 38a on the lower side in the Y direction) of the image display panel 32aF in this order, as illustrated in FIG. 25C, the detection voltages $V_D$ have been generated at the drive detection electrode units 38aE, 38aD, 38aC, and 38aB in the image display panel 32aB (the drive detection electrode units 38a on the upper side in the Y direction). The controller 20 according to the third embodiment recognizes the image display panel 32aB as being adjacent to the image display panel 32aF on the lower side in the Y direction.

When applying the application voltage $V_A$ to the drive detection electrode units 38aP, 38aK, and 38aF (the drive detection electrode units 38a on the left side in the X direction) of the image display panel 32aF in this order, as illustrated in FIG. 25D, the detection voltages $V_D$ have been generated at the drive detection electrode units 38aT, 38aO, and 38aJ in the image display panel 32aA (the drive detection electrode units 38a on the right side in the X direction). The controller 20 according to the third embodiment recognizes the image display panel 32aA as being adjacent to the image display panel 32aF on the left side in the X direction.

However, instead of applying the application voltage $V_A$ to all of the drive detection electrode units 38a on the periphery, the image display panel 32aF serving as the application image display panel may be configured to apply the application voltage $V_A$ solely to part of the drive detection electrode units 38a on the periphery. For example, the image display panel 32aF may simply apply the application voltage $V_A$ in sequence solely to the drive detection electrode units 38a positioned at four corners (four vertices) among the drive detection electrode units 38a on the periphery. The drive detection electrode units 38a positioned at four corners are the drive detection electrode unit 38aA, the drive detection electrode unit 38aE, the drive detection electrode unit 38aP, and the drive detection electrode unit 38aT. Alternatively, the image display panel 32aF may simply apply the application voltage $V_A$ in sequence solely to two opposing drive detection electrode units 38a on a diagonal line among the drive detection electrode units 38a positioned at four corners on the periphery. The two opposing drive detection electrode units 38a are the drive detection electrode unit 38aA and the drive detection electrode unit 38aT, or the drive detection electrode unit 38aE and the drive detection electrode unit 38aP. For example, when applying the application voltage $V_A$ to the drive detection electrode unit 38aA of the image display panel 32aF, the controller 20 recognizes the image display panel 32aA in which the detection voltage $V_D$ has been generated at the drive detection electrode unit 38aE (the drive detection electrode unit 38a at the upper right) as being adjacent to the image display panel 32aF on the left side in the X direction. In this case, the controller 20 recognizes the image display panel 32aC in which the detection voltage $V_D$ has been generated at the drive detection electrode unit 38aP (the drive detection electrode unit 38a at the lower left) as being adjacent to the image display panel 32aF on the upper side in the Y direction.

As described above, the intensity of the detection voltage $V_D$ decreases as a distance from the drive detection electrode unit 38a to which the application voltage $V_A$ is applied becomes larger. Accordingly, in a case where the application voltage $V_A$ is applied solely to part of the drive detection electrode units 38a on the periphery, the intensity of the detection voltages $V_D$ from the drive detection electrode units 38a adjacent to the part of drive detection electrode units 38a may be obtained in advance. In addition, the voltage value of the touch voltage threshold signal $V_{THa}$ can be set in advance such that the voltage values smaller than those obtained detection voltages $V_D$ are not detected. With the setting described above, for example, when the application voltage $V_A$ is applied to the drive detection electrode unit 38aA of the image display panel 32aF, the detection voltage $V_D$ from the drive detection electrode unit 38aP of the image display panel 32aC adjacent thereto is exclusively detected. Accordingly, the image display panel 32aC can be determined as being adjacent.

Meanwhile, when applying the application voltage $V_A$ to the drive detection electrode unit 38aT of the image display panel 32aF, the detection voltage $V_D$ has been generated at the drive detection electrode unit 38aP in the image display panel 32aI (the drive detection electrode unit 38a at the lower left). The controller 20 recognizes the image display panel 32aI as being adjacent to the image display panel 32aF on the right side in the X direction. In this case, the controller 20 recognizes the image display panel 32aB in which the detection voltage $V_D$ has been generated at the drive detection electrode unit 38aE (the drive detection electrode unit 38a at the upper right) as being adjacent to the image display panel 32aF on the lower side in the Y direction. A similar principle applies to a case where the application voltage $V_A$ is applied to the drive detection electrode unit 38aE and the drive detection electrode unit 38aP of the image display panel 32aF.

As described above, the image display panel 32a according to the third embodiment includes the drive detection electrode unit 38a provided with the functions of the drive electrode unit 38 and the detection electrode unit 39. Also in this case, the array pattern among the image display panels 32 can be recognized with ease as in the first embodiment.

Fourth Embodiment

Next, a fourth embodiment will be described. A display device unit 10b according to the fourth embodiment is different from the display device unit 10 according to the first embodiment in that a control image display panel has a function of the controller 20. In the display device unit 10b according to the fourth embodiment, description of portions of configuration common to those of the first embodiment will be omitted.

Figure 26:
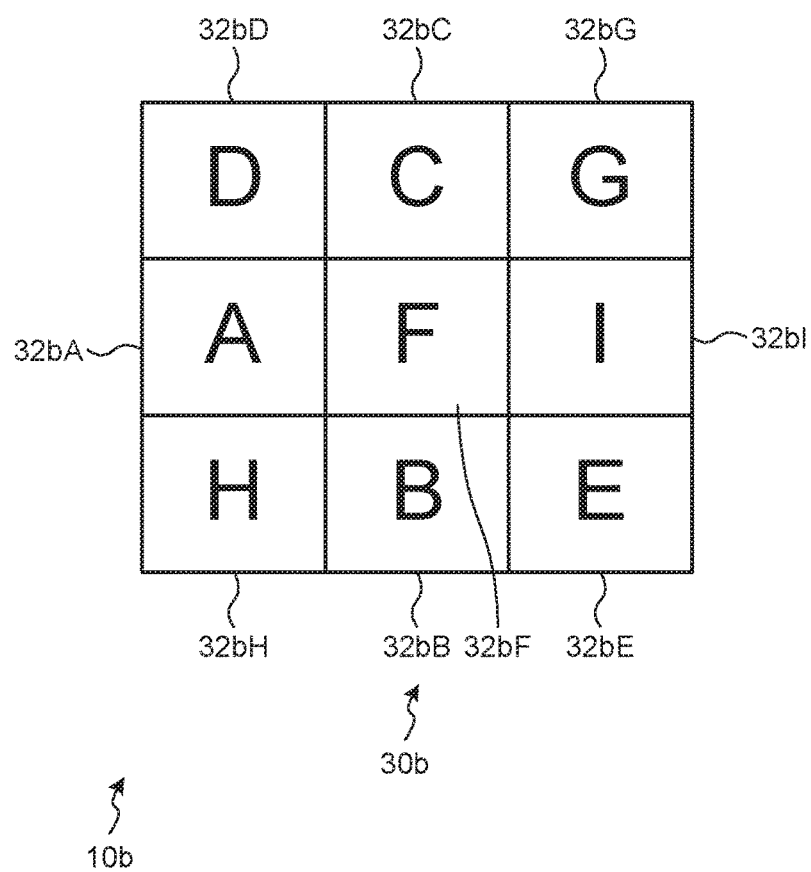
FIG. 26 is a block diagram illustrating a configuration of a display device unit according to a fourth embodiment.

FIG. 26 is a block diagram illustrating a configuration of the display device unit according to the fourth embodiment. As illustrated in FIG. 26, the display device unit 10b according to the fourth embodiment includes an image display panel unit 30b. The image display panel unit 30b includes image display panels 32bA, 32bB, 32bC, 32bD, 32bE, 32bG, 32bH, and 32bI (image display panels 32b) and a control image display panel 32bF which are arrayed in a flat surface shape. The number of the control image display panels 32bF is arbitrary as long as the image display panel unit 30b has at least one control image display panel 32bF.

The array order of the respective image display panels 32b and the control image display panel 32bF is also arbitrary. Accordingly, the control image display panel 32bF may not be arranged at a center position (second row and second column) as illustrated in FIG. 26.

The image display panel 32b is different from the image display panel 32 according to the first embodiment in that the image display panel 32b creates adjacent information B. The control image display panel 32bF is configured to display a partial image and carry out the touch detection as in the image display panel 32. Additionally, the control image display panel 32bF has a function for controlling itself and the respective image display panels 32b. The display device unit 10b displays an image based on the control of the respective image display panels 32b by the control image display panel 32bF.

(Configuration of Panel Controller)

Figure 27A:
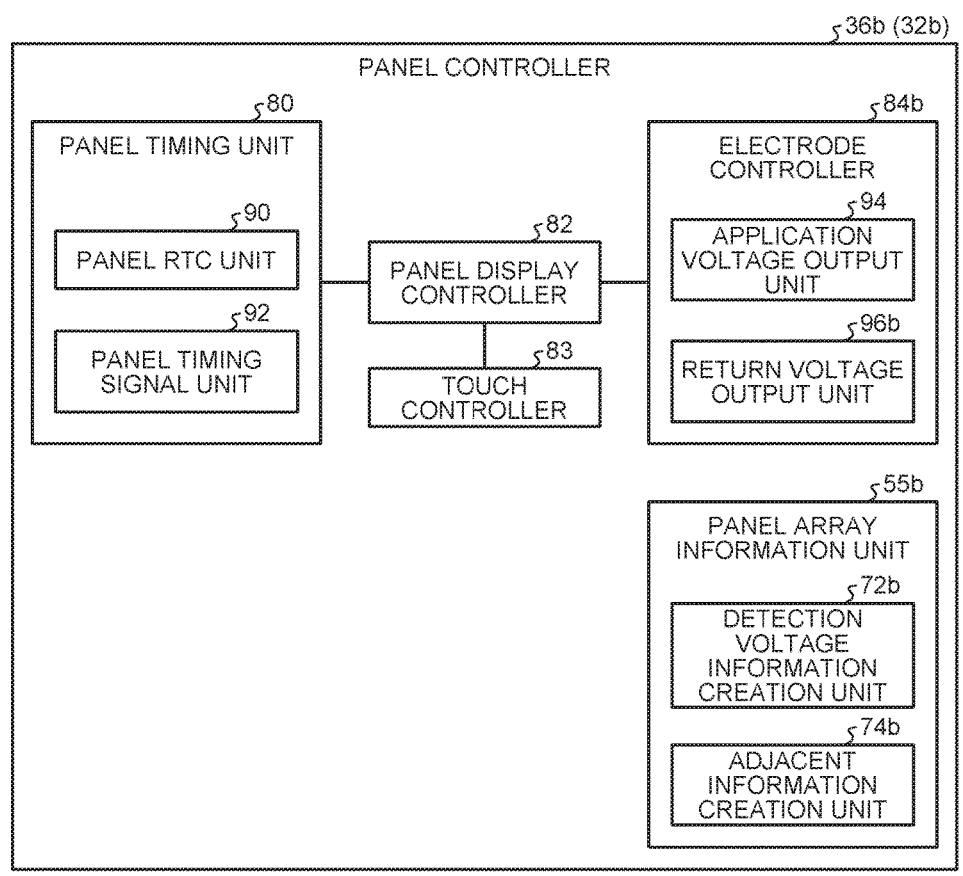
FIG. 27A is a block diagram illustrating a configuration of a panel controller according to the fourth embodiment.

The image display panel 32b includes a panel controller 36b. FIG. 27A is a block diagram illustrating a configuration of the panel controller according to the fourth embodiment. As illustrated in FIG. 27A, the panel controller 36b includes an electrode controller 84b and a panel array information unit 55b.

The electrode controller 84b includes an application voltage output unit 94 and a return voltage output unit 96b. The application voltage output unit 94 is configured to apply an application voltage $V_A$ to a drive electrode unit 38 of its own. The return voltage output unit 96b is configured to apply a return voltage $V_R$ to the drive electrode unit 38 of its own based on a detection voltage $V_D$ generated at a detection electrode unit 39 of its own. The return voltage $V_R$ will be described later.

The panel array information unit 55b includes a detection voltage information creation unit 72b and an adjacent information creation unit 74b. The detection voltage information creation unit 72b is configured to create detection voltage information A1b based on a return detection voltage $V_{RD}$. The return detection voltage $V_{RD}$ is generated at the detection electrode unit 39 of its own due to the return voltage $V_R$ applied to the image display panel 32b (or the control image display panel 32bF) other than the image display panel 32b of its own. The adjacent information creation unit 74 is configured to create the adjacent information B serving as information regarding the image display panel 32b (or the control image display panel 32bF) adjacent thereto.

(Configuration of Control Panel Controller)

Figure 27B:
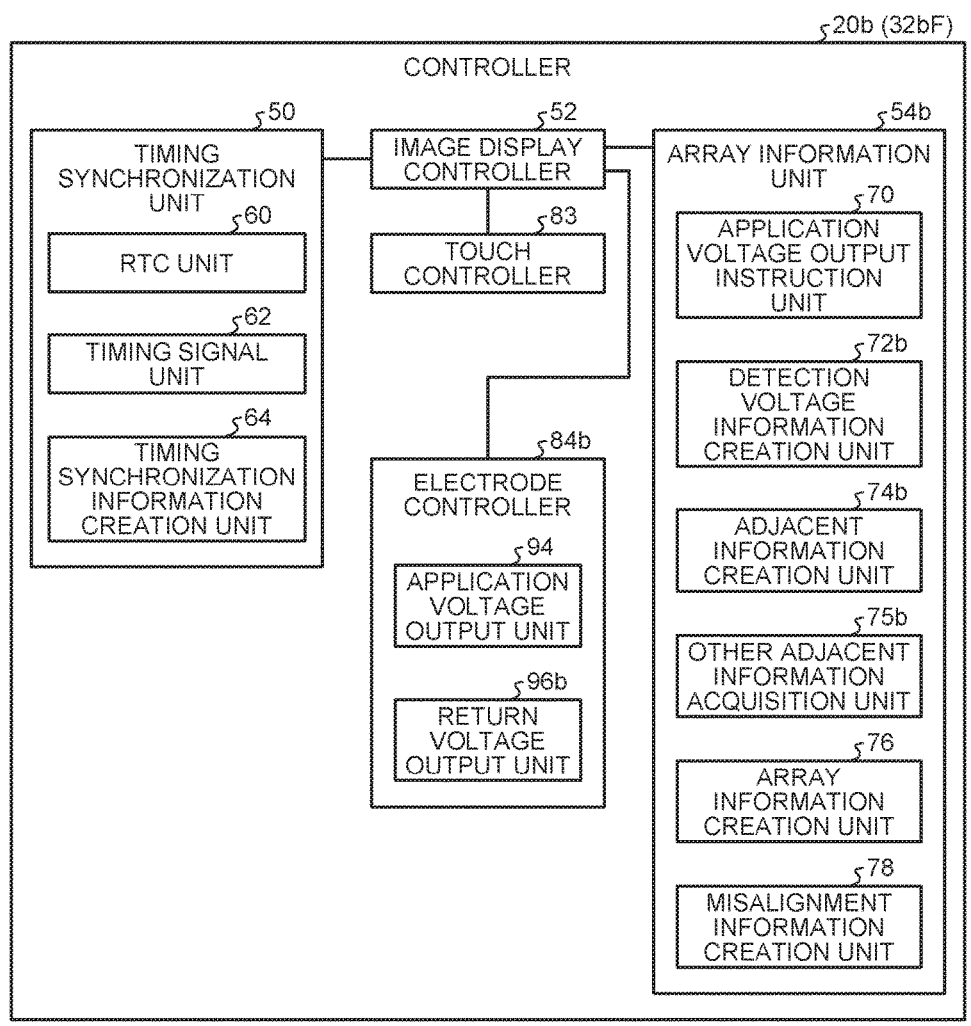
FIG. 27B is a block diagram illustrating a configuration of a controller according to the fourth embodiment.

The control image display panel 32bF includes a controller 20b. FIG. 27B is a block diagram illustrating a configuration of the controller according to the fourth embodiment. The controller 20b is configured to control the respective image display panels 32b as in the controller 20 according to the first embodiment. The controller 20b also controls itself (i.e., the control image display panel 32bF). In other words, the control image display panel 32bF according to the fourth embodiment is configured to have the controller built therein. As illustrated in FIG. 27B, the controller 20b includes a timing synchronization unit 50, an image display controller 52, an array information unit 54b, a touch controller 83, and the electrode controller 84b.

The timing synchronization unit 50 carries out the timing synchronization processing using a method similar to that of the controller 20 according to the first embodiment to create the timing synchronization information between the control image display panel 32bF and the respective image display panels 32.

Based on the timing synchronization information from the timing synchronization unit 50, the array information from the array information unit 54b, and the like, the image display controller 52 transmits, to itself (i.e., the control image display panel 32bF) and each of the image display panels 32b, the image signals. The image signals is for causing these respective image display panels 32b to display predetermined partial images.

The array information unit 54b includes an application voltage output instruction unit 70, the detection voltage information creation unit 72b, the adjacent information creation unit 74b, an other adjacent information acquisition unit 75b, an array information creation unit 76, and a misalignment information creation unit 78. The array information unit 54b is configured to create array information C and misalignment information D as in the first embodiment.

The detection voltage information creation unit 72b is configured to create the detection voltage information A1b based on the return detection voltage $V_{RD}$. The return detection voltage $V_{RD}$ is generated at the detection electrode unit 39 of its own due to the return voltage $V_R$ applied to the image display panel 32b other than the image display panel 32b of its own. The adjacent information creation unit 74b is configured to create the adjacent information B serving as information regarding the image display panel 32b adjacent thereto. The other adjacent information acquisition unit 75b is configured to acquire the adjacent information B created by other image display panels 32b. The array information creation unit 76 creates the array information C based on these sets of the adjacent information B. Details of processing by the respective units will be described later.

The electrode controller 84b has a configuration similar to that of the electrode controller 84b included in the panel controller 36b and thus, description thereof will be omitted.

(Return Detection Voltage)

Figure 28:
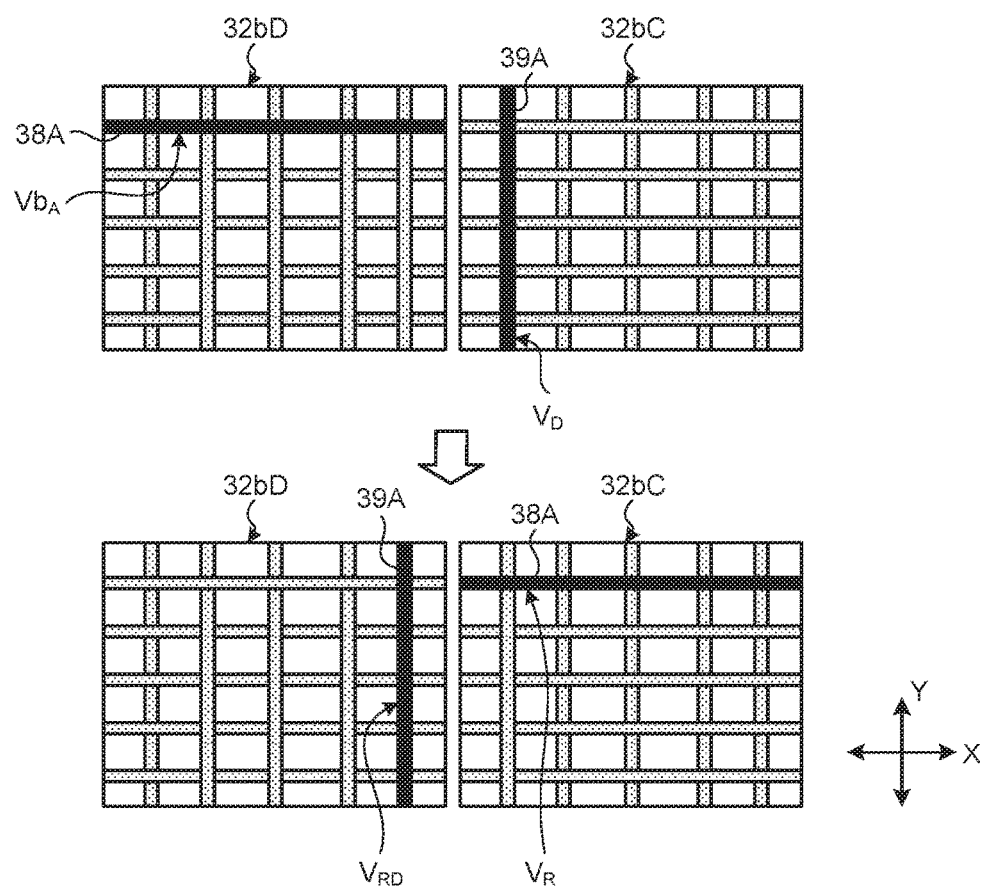
FIG. 28 is an explanatory diagram for explaining a return detection voltage.

Next, the return detection voltage $V_{RD}$ will be described. The return detection voltage $V_{RD}$ is a voltage signal that generates at the detection electrode unit 39 of the application image display panel. The return detection voltage $V_{RD}$ is used to create the detection voltage information A1b. FIG. 28 is an explanatory diagram for explaining the return detection voltage. FIG. 28 illustrates, as an example, a case where the image display panel 32bD is set as the application image display panel and the return detection voltage $V_{RD}$ is generated at the detection electrode unit 39 thereof. As illustrated in FIG. 28, the image display panel 32bD applies an application voltage $Vb_A$ to a drive electrode unit 38A. In this case, the detection voltage $V_D$ is generated at a detection electrode unit 39A in the image display panel 32bC. The image display panel 32bC in which the detection voltage $V_D$ has been generated uses the return voltage output unit 96b to apply the return voltage $V_R$ to the drive electrode unit 38A (the drive electrode unit 38 on the application image display panel side) of its own. In this case, the return detection voltage $V_{RD}$ is generated at the detection electrode unit 39A in the image display panel 32bD based on the return voltage $V_R$.

The return voltage $V_R$ is a voltage signal output based on the detection voltage $V_D$, serving as a voltage signal coded for the identification of the respective image display panels 32. Accordingly, the return voltage $V_R$ is configured to have a different amplitude waveform for each of the image display panels 32b (including the control image display panel 32bF). For example, each of the image display panels 32b (including the control image display panel 32bF) generates the return voltage $V_R$ as an alternating current signal having a plurality of peaks. At this point, each of the image display panels 32b (including the control image display panel 32bF) makes the number of those peaks or a peak value (maximum voltage value) unique to itself. In this case, the return voltage $V_R$ from each of the image display panels 32b (including the control image display panel 32bF) is configured to have the number of peaks or the peak value different from one another.

The return detection voltage $V_{RD}$ is a voltage signal generated based on the return voltage $V_R$ and has an amplitude waveform common to the return voltage $V_R$. Accordingly, the amplitude waveform of the return detection voltage $V_{RD}$ is configured to be different for each of the image display panels 32b (including the control image display panel 32bF) to which the return voltage $V_R$ is applied. The detection voltage information creation unit 72b of the application image display panel stores a characteristic (the number of peaks or the peak value) of each of these return voltages $V_R$ from the image display panels 32b (including the control image display panel 32bF). Thus, it is made possible for the detection voltage information creation unit 72b of the application image display panel to acquire, based on the amplitude waveform of the return detection voltage $V_{RD}$ having a characteristic corresponding to the return voltage $V_R$, information regarding which image display panel 32b has output the return voltage $V_R$. The acquired information is panel type information A2b indicating in which image display panel 32b the detection voltage $V_D$ has been generated.

The application image display panel also acquires, based on the return detection voltage $V_{RD}$, detection electrode type information A3b serving as information regarding which of the detection electrode units 39 of its own is the detection electrode unit 39 at which the return detection voltage $V_{RD}$ has been generated. Subsequently, the application image display panel acquires detection electrode timing information A4b serving as information regarding at which timing the return detection voltage $V_{RD}$ has been generated at that detection electrode unit 39 among the timings when the application voltage $V_A$ has been sequentially applied. The detection voltage information creation unit 72b included in the application image display panel creates the detection voltage information A1b based on the panel type information A2b, the detection electrode type information A3b, and the detection electrode timing information A4b described above. In other words, accordingly, the detection voltage information A1b is information regarding to which drive electrode unit 38 the application voltage $V_A$ has been applied among the plurality of drive electrode units 38 and at that time, at which detection electrode unit 39 the return detection voltage $V_{RD}$ has been generated.

Hereinafter, the application of the application voltage $V_A$ and the generation of the return detection voltage $V_{RD}$ will be described along the time series. FIG. 29 to FIG. 31 are explanatory diagrams for explaining the application of the application voltage and the generation of the return detection voltage. FIG. 29 to FIG. 31 illustrate an exemplary case where the control image display panel 32bF is set as the application image display panel.

FIG. 29 illustrates the detection electrode units 39 at which the return detection voltages $V_{RD}$ are generated at a timing when the application voltage $V_A$ is applied to the drive electrode unit 38A of the control image display panel 32bF. As illustrated in FIG. 29, when the application voltage $V_A$ is applied to the drive electrode unit 38A of the control image display panel 32bF, the detection voltage $V_D$ is generated at a detection electrode unit 39E in the image display panel 32bA. In the image display panel 32bI, the detection voltage $V_D$ is generated at the detection electrode unit 39A. In the image display panel 32bC, the detection voltages $V_D$ are generated at detection electrode units 39A, 39B, 39C, 39D, and 39E.

The image display panel 32bA in which the detection voltage $V_D$ has been generated applies a return voltage $V_RA$ to the drive electrode unit 38A. In the control image display panel 32bF, as indicated by a dashed line area 97A, a return detection voltage $V_{RD}A$ is generated at the detection electrode unit 39A due to this return voltage $V_RA$. The image display panel 32bI in which the detection voltage $V_D$ has been generated applies a return voltage $V_RI$ to the drive electrode unit 38A. In the control image display panel 32bF, as indicated by a dashed line area 97I, a return detection voltage $V_{RD}I$ is generated at the detection electrode unit 39E due to this return voltage $V_RI$. The image display panel 32bC in which the detection voltages $V_D$ have been generated applies a return voltage $V_RC$ to a drive electrode unit 38E. In the control image display panel 32bF, as indicated by a dashed line area 97C, return detection voltages $V_{RD}C$ are generated at detection electrode units 39A, 39B, 39C, 39D, and 39E due to this return voltage $V_RC$.

FIG. 30 illustrates the detection electrode units 39 at which the return detection voltages $V_{RD}$ are generated at a timing when the application voltage $V_A$ is applied to drive electrode units 38B, 38C, and 38D of the control image display panel 32bF. As illustrated in FIG. 30, when the application voltage $V_A$ is applied to the drive electrode units 38B, 38C, and 38D of the control image display panel 32bF in this order, the detection voltage $V_D$ is generated at the detection electrode unit 39E in the image display panel 32bA. In the image display panel 32bI, the detection voltage $V_D$ is generated at the detection electrode unit 39A.

The image display panel 32bA in which the detection voltage $V_D$ has been generated applies the return voltage $V_RA$ to the drive electrode unit 38A. In the control image display panel 32bF, as indicated by the dashed line area 97A, the return detection voltage $V_{RD}A$ is generated at the detection electrode unit 39A due to this return voltage $V_RA$. The image display panel 32bI in which the detection voltage $V_D$ has been generated applies the return voltage $V_RI$ to the drive electrode unit 38A. In the control image display panel 32bF, as indicated by the dashed line area 97I, the return detection voltage $V_{RD}I$ is generated at the detection electrode unit 39E due to this return voltage $V_RI$.

FIG. 31 illustrates the detection electrode units 39 at which the return detection voltages $V_{RD}$ are generated at a timing when the application voltage $V_A$ is applied to the drive electrode unit 38E of the control image display panel 32bF. As illustrated in FIG. 31, when the application voltage $V_A$ is applied to the drive electrode unit 38E of the control image display panel 32bF, the detection voltage $V_D$ is generated at the detection electrode unit 39E in the image display panel 32bA. In the image display panel 32bI, the detection voltage $V_D$ is generated at the detection electrode unit 39A. In the image display panel 32bB, the detection voltages $V_D$ are generated at the detection electrode units 39A, 39B, 39C, 39D, and 39E.

The image display panel 32bA in which the detection voltage $V_D$ has been generated applies a return voltage $V_RA$ to the drive electrode unit 38A. In the control image display panel 32bF, as indicated by a dashed line area 97A, a return detection voltage $V_{RD}A$ is generated at the detection electrode unit 39A due to this return voltage $V_RA$. The image display panel 32bI in which the detection voltage $V_D$ has been generated applies a return voltage $V_RI$ to the drive electrode unit 38A. In the control image display panel 32bF, as indicated by a dashed line area 97I, a return detection voltage $V_{RD}I$ is generated at the detection electrode unit 39E due to this return voltage $V_RI$. The image display panel 32bB in which the detection voltages $V_D$ have been generated applies a return voltage $V_RB$ to the drive electrode unit 38E. In the control image display panel 32bF, as indicated by a dashed line area 97B, return detection voltages $V_{RD}B$ are generated at the detection electrode units 39A, 39B, 39C, 39D, and 39E due to this return voltage $V_RB$.

In the control image display panel 32bF, the same detection electrode unit 39 acquires the return voltages $V_R$ from the plurality of image display panels 32b in some cases. In such a case, the return detection voltage $V_{RD}$ at that detection electrode unit 39 has a combination of frequencies of the plurality of return voltages $V_R$. For example, at the timing illustrated in FIG. 30, the return detection voltage $V_{RD}A$ and the return detection voltage $V_{RD}C$ are generated at the detection electrode unit 39A in the control image display panel 32bF and thus, a signal having a combination of frequencies of these return detection voltages is detected. Accordingly, the adjacent information creation unit 74b according to the embodiment identifies the image display panels 32b adjacent in the X direction and the Y direction using the following methods to create the adjacent information B.

First, a method for detecting the image display panel 32b adjacent in the X direction will be described. In the control image display panel 32bF, as illustrated in FIG. 30, the return detection voltage $V_{RD}A$ alone is generated at the detection electrode unit 39A at a timing when the application voltage $V_A$ is applied to one of the drive electrode units 38B, 38C, and 38D. At the same timing, the return detection voltage $V_{RD}I$ alone is generated at the detection electrode unit 39E. Accordingly, based on the return detection voltage $V_{RD}A$ at the detection electrode unit 39A at a timing when the application voltage $V_A$ is applied to one of the drive electrode units 38B, 38C, and 38D, the adjacent information creation unit 74b of the control image display panel 32bF identifies the image display panel 32bA on the left side in the X direction. Likewise, based on the return detection voltage $V_{RD}I$ at the detection electrode unit 39E at the same timing, the adjacent information creation unit 74b of the control image display panel 32bF identifies the image display panel 32bI on the right side in the X direction.

Next, a method for detecting the image display panel 32b adjacent in the Y direction will be described. In the control image display panel 32bF, as illustrated in FIG. 29, the return detection voltages $V_{RD}C$ alone are generated at the detection electrode units 39B, 39C, and 39D at a timing when the application voltage $V_A$ is applied to the drive electrode unit 38A. In the control image display panel 32bF, as illustrated in FIG. 31, the return detection voltages $V_{RD}B$ alone are generated at the detection electrode units 39B, 39C, and 39D at a timing when the application voltage $V_A$ is applied to the drive electrode unit 38E. Accordingly, based on the return detection voltage $V_{RD}C$ at one of the detection electrode units 39B, 39C, and 39D at a timing when the application voltage $V_A$ is applied to the drive electrode unit 38A, the adjacent information creation unit 74b of the control image display panel 32bF identifies the image display panel 32bC on the upper side in the Y direction. Based on the return detection voltage $V_{RD}B$ at one of the detection electrode units 39B, 39C, and 39D at a timing when the application voltage $V_A$ is applied to the drive electrode unit 38E, the adjacent information creation unit 74b of the control image display panel 32bF identifies the image display panel 32bB on the lower side in the Y direction.

The above description has used a case where the control image display panel 32*b*F is set as the application image display panel. However, also in a case where another image display panel 32*b* is set as the application image display panel, the adjacent information creation unit 74*b* included in that image display panel 32*b* creates the adjacent information B using a similar method.

After all of the image display panels 32*b* or the control image display panel 32*b*F is set as the application image display panel to create the adjacent information B, the other adjacent information acquisition unit 75*b* of the control image display panel 32*b*F acquires information regarding the adjacent information B from the other image display panels 32*b*. The array information creation unit 76 of the control image display panel 32*b*F creates the array information C based on these sets of the adjacent information B.

As described above, in the display device unit 10*b* according to the fourth embodiment, the control image display panel 32*b*F includes the controller 20*b* to create the array information C. When the controller is built into the image display panel, as described in the fourth embodiment, the display device unit 10*b* can recognize the array pattern of the image display panels with ease while the controller does not need to be provided separately. In the fourth embodiment, the application voltage $V_A$ may also be a voltage signal coded for the identification of the respective image display panels 32. Accordingly, the application voltage $V_A$ may be configured to have a different amplitude waveform for each of the image display panels 32*b* (including the control image display panel 32*b*F). In this case, it is possible for the standby image display panel as well to recognize which image display panel 32*b* (or whether the control image display panel 32*b*F) is the application image display panel.

Although the embodiments according to the invention have been described thus far, the content of these embodiments is not construed to limit these embodiments. The components described above include one that can be easily assumed by those skilled in the art and substantially the same one, that is, ones within the so-called scope of the equivalents thereof. Additionally, the components described above can be combined as appropriate. Furthermore, various types of omissions, replacements, or modifications of the components can be made without departing from the gist of the aforementioned embodiments. For example, the respective embodiments have described the capacitance type touch panel. However, the embodiments are not limited thereto. In the display device unit 10, each of the drive electrode unit 38 and the detection electrode unit 39 may be constituted by, for example, a coil. In this case, the array pattern among the image display panels 32 can be also confirmed by detecting magnetic fields generated among the coils.

What is claimed is:

1. A display device unit comprising a controller and a plurality of image display panels in such a manner that display surfaces of the plurality of image display panels are orderly arranged on a flat surface, and configured to display an image using the plurality of display surfaces as a single screen, wherein an application image display panel which is a part of the image display panels and a standby image display panel which is the image display panel other than the application image display panel includes a plurality of drive electrode units to which an application voltage is applied and a plurality of detection electrode units at which a detection voltage is generated in accordance with the application voltage, wherein, the application voltage is applied solely to the drive electrode unit included in the application image display panel, in a standby image display panel, the detection voltage is generated at the detection electrode unit in accordance with the application voltage to the application image display panel, and the controller applies the application voltage to the drive electrode unit of the application image display panel, and detects the detection voltage of the detection electrode unit of the standby image display panel adjacent to the application image display panel, the detection voltage is generated by the application voltage to the drive electrode unit of the application image display panel, wherein, the controller stops applying the application voltage to the drive electrode unit of the standby image display panel, and puts the detection electrode unit of the application image display panel into a state in which the detection voltage is not generated, wherein the controller detects the array pattern among the plurality of image display panels based on the detection voltage, wherein the controller detects a positional relationship between the application image display panel and the standby image display panel in which the detection voltage has been generated and detects the array pattern among the plurality of image display panels based on the positional relationship, wherein the controller determines the application image display panel and the standby image display panel in which the detection voltage has been generated as the image display panels adjacent to each other, wherein the controller sequentially switches the application image display panel to another image display panel and sequentially detects the adjacent image display panels so as to detect the array pattern among the plurality of image display panels, and wherein, in a case where the same image display panel is determined as the adjacent image display panel repeatedly, the controller combines information regarding the image display panels adjacent to the same image display panel to detect the array pattern among the plurality of image display panels, and when the detection of the adjacent image display panels has been completed for all of the image display panels, the controller cancels the selection of the next application image display panel such that the controller makes a total number of the image display panels selected as the application image display panel smaller than the total number of all of the image display panels.

2. The display device unit according to claim 1, wherein the controller applies the application voltage to the drive electrode unit of the application image display panel in order to confirm an array pattern among the plurality of image display panels.

3. The display device unit according to claim 1, wherein the detection voltage is generated in the standby image display panel by applying the application voltage to the application image display panel adjacent to the standby image display panel.

4. The display device unit according to claim 1, wherein the application image display panel applies the application voltage to the plurality of drive electrode units in sequence.

5. The display device unit according to claim 4, wherein, in the standby image display panel, the detection voltage is generated at the detection electrode unit arranged adjacent to the application image display panel.

6. The display device unit according to claim 1, wherein the standby image display panel converts the detection voltage to a signal having an amplitude waveform different for each of the image display panels to output.

7. The display device unit according to claim 1, wherein, in the detection electrode unit, a capacitance of the detection electrode unit varies depending on an object in the proximity to the image display panel.

8. The display device unit according to claim 1, wherein the controller selects all of the image display panels as the application image display panel to detect the array pattern among the plurality of image display panels.

9. The display device unit according to claim 1, wherein the controller detects misalignment between the adjacent image display panels based on the detection voltage.

* * * * *